(12) United States Patent
Ogiwara et al.

(10) Patent No.: US 7,525,531 B2
(45) Date of Patent: Apr. 28, 2009

(54) METHOD FOR MANUFACTURING LIGHTING DEVICE, IMAGE DISPLAY, LIQUID CRYSTAL MONITOR, LIQUID CRYSTAL TELEVISION, LIQUID CRYSTAL INFORMATION TERMINAL, AND LIGHT GUIDE PLATE

(75) Inventors: Akifumi Ogiwara, Kida-gun (JP); Kazunori Komori, Sanda (JP); Junko Asayama, Suita (JP); Yasunori Kuratomi, Sanda (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 505 days.

(21) Appl. No.: 10/343,463

(22) PCT Filed: Jul. 25, 2001

(86) PCT No.: PCT/JP01/06396

§ 371 (c)(1),
(2), (4) Date: May 6, 2003

(87) PCT Pub. No.: WO02/14740

PCT Pub. Date: Feb. 21, 2002

(65) Prior Publication Data

US 2003/0210222 A1 Nov. 13, 2003

(30) Foreign Application Priority Data

| Jul. 31, 2000 | (JP) | 2000-230450 |
| Oct. 13, 2000 | (JP) | 2000-313157 |
| Oct. 13, 2000 | (JP) | 2000-313161 |
| Nov. 10, 2000 | (JP) | 2000-343267 |

(51) Int. Cl.
*G09G 3/36* (2006.01)

(52) U.S. Cl. .................. 345/103; 345/102

(58) Field of Classification Search ............... 345/102, 345/103; 349/64
See application file for complete search history.

(56) References Cited

U.S. PATENT DOCUMENTS 5,712,694 A 1/1998 Taira et al. ............. 349/9

(Continued)

FOREIGN PATENT DOCUMENTS

JP 1-245223 A 9/1989

(Continued)

*Primary Examiner*—Kevin M Nguyen
(74) *Attorney, Agent, or Firm*—McDermott Will & Emery LLP

(57) ABSTRACT

The present invention is directed to provide, for example, a lighting device and an image display, with which higher luminance and others can be achieved. In order to achieve this object, an image display of the present invention is formed in a lighting device (100) including a light source (102), a light guiding plate (103) that is disposed in such a manner that the light from the light source (102) is allowed to enter it through an end face (103*a*) thereof, and a reflecting surface (105) that is opposed to one major surface (103*c*) of the light guiding plate (103), wherein the one major surface (103*c*) of the light guiding plate (103) has a constant scattering layer (121) formed thereon which is adapted to transmit the incident light to scatter it at a predetermined rate, and the constant scattering layer (121) has a distribution and scattering structure (114) formed there on which is adapted to transmit the incident light to scatter it at a percentage that varies according to the distance from the above-mentioned light source (102).

4 Claims, 34 Drawing Sheets

U.S. PATENT DOCUMENTS

| | | | | |
|---|---|---|---|---|
| 5,816,677 A | * | 10/1998 | Kurematsu et al. | 362/609 |
| 5,931,555 A | * | 8/1999 | Akahane et al. | 349/64 |
| 6,603,452 B1 | * | 8/2003 | Serita | 345/103 |

FOREIGN PATENT DOCUMENTS

| | | |
|---|---|---|
| JP | 3-256090 A | 11/1991 |
| JP | 4-140783 A | 5/1992 |
| JP | 6-174931 A | 6/1994 |
| JP | 7-110408 A | 4/1995 |
| JP | 7-294914 A | 11/1995 |
| JP | 8-87011 A | 4/1996 |
| JP | 3025769 U | 4/1996 |
| JP | 8-146231 A | 6/1996 |
| JP | 8-201807 A | 8/1996 |
| JP | 08-241051 | 9/1996 |
| JP | 8-271892 A | 10/1996 |
| JP | 10-301110 A | 11/1998 |
| JP | 11-38207 A | 2/1999 |
| JP | 11-162234 A | 6/1999 |
| JP | 11-212088 A | 8/1999 |
| JP | 2000-98372 A | 4/2000 |
| JP | 2001-66569 A | 3/2001 |
| TW | 284853 | 1/1998 |

\* cited by examiner of light emitters 1001 to uniformly irradiate the entire area of a liquid

METHOD FOR MANUFACTURING LIGHTING DEVICE, IMAGE DISPLAY, LIQUID CRYSTAL MONITOR, LIQUID CRYSTAL TELEVISION, LIQUID CRYSTAL INFORMATION TERMINAL, AND LIGHT GUIDE PLATE

TECHNICAL FIELD

The present invention relates to a method for manufacturing a lighting device, an image display, a liquid crystal monitor, a liquid crystal television, a liquid crystal information terminal, and a light guiding plate.

BACKGROUND ART

Liquid crystal displays, as an example of conventional image displays, comprise a liquid crystal display panel, a backlight that is disposed beneath the liquid crystal display panel to supply light to the liquid crystal display panel, and a circuit board used to drive the liquid crystal display panel. The liquid crystal display panel has two transparent glass substrates on which electrodes made of a transparent conductive thin film, an alignment layer, and others are laminated. The transparent glass substrates are assembled at a predetermined distance with their lamination surfaces opposing to each other. Liquid crystal is filled and sealed between these glass substrates. A polarizer is provided outside the glass substrates.

FIG. 32(a) shows a conventional liquid crystal display and a backlight used for it. FIGS. 33 and 34 show other conventional backlights.

As shown in FIGS. 32(a), 33, and 34, the backlight comprises, for example, a light guiding plate 1003 which is formed of a transparent synthetic resin plate for guiding the light emitted from light emitters 1001 away from the light emitters 1001 to uniformly irradiate the entire area of a liquid crystal display panel 1006, fluorescent tubes which are disposed in the vicinity of the end faces of the light guiding plate 1003 along the end faces generally in parallel to the end faces, each fluorescent tube serving as the light emitter 1001, and reflectors 1002 each of which covers the corresponding fluorescent tube to form a light source in cooperation with the latter. The backlight 1000 also comprises a diffusing sheet (not shown) that is disposed on the light guiding plate 1003 to diffuse the beams of light from the light guiding plate 1003, and a reflecting plate 1005 that is disposed under the light guiding plate 1003 to reflect the beams of light leaving the light guiding plate 1003 towards the light guiding plate 1003.

The light guiding plate 1003 has so-called scattering dots 1004 arranged in a predetermined pattern on the lower surface of the light guiding plate. The surface of the scattering dots 1004 serves as a scattering surface. An example of a pattern of the scattering dots 1004 is shown in FIG. 32(b). Thus, the beams of light directed to the scattering dots 1004 are scattered therefrom. Some beams of scattered light leave the light guiding plate 1003 through the upper surface thereof. In addition, the beams of light that enter other areas than the scattering dots 1004 on the lower surface of the light guiding plate 1003 propagate through the light guiding plate 1003 by a series of multiple scatterings caused by internal reflection according to the angle of incidence.

Changing the distribution of the scattering dots 1004 results in varied luminance distribution on the light exit surface (upper surface) of the light guiding plate 1003. The beams of light that are directed from the light source to the light guiding plate 1003 propagate through the light guiding plate 1003 by a series of internal reflections, with a percentage of light transmitted to the outside. The amount of the light is larger at a position near the light source and becomes smaller when it travels away from the light source. Taking this into consideration, as shown in Japanese Utility Model Laid-Open No. 60-76387, the area ratio for the scattering dots 1004 on the lower surface of the light guiding plate 1003 may be made low on the side of the light source. This decreases the percentage of light directed towards the lower surface of the light guiding plate 1003, that is scattered by the scattering dots 1004 and that leaves the light guiding plate 1003 through the upper surface thereof. The area ratio may be increased according to the distance away from the light source. The percentage of light that is scattered by the scattering dots 1004 and that leaves the light guiding plate 1003 through the upper surface there of increases at a location distant from the light source. Consequently, the ratio of the amount of light that comes out at any point to the amount of light that comes out from the whole light guiding plate 1003 through the upper surface thereof (hereinafter, referred to as a "light intensity distribution") becomes equal, which improves uniformity of the luminance.

The liquid crystal display with the above-mentioned backlight 1000 can improve uniformity of the luminance on a display screen of the liquid crystal display panel 1006.

Transmissive liquid crystal displays that are in the current mainstream require illumination from behind using a backlight, as described above. However, the beams of incident light are random beams that are polarized in various directions. Almost half of the beams is absorbed by the polarizer on the incident side. This results in a low light utilization efficiency. In view of this, a prism sheet is used that effectively condenses the beams of the diffused light from the backlight within a viewing angle to enhance face-up luminance.

FIG. 35 shows a liquid crystal display with such a prism sheet. In FIG. 35, the beams of light from upper and lower light sources 1002 enter the light guiding plate 1003. A reflecting sheet 1005 is used to return the beams of light that leak from the light guiding plate 1003 into the light guiding plate 1003 for effective use. The beams of light that are scattered by a diffusing sheet 1031 are condensed via a prism sheet 1033 and then enter a liquid crystal element 1035. Polarizers 1034 and 1035 are disposed in front of and behind the liquid crystal element 1035 with their polarizing axes perpendicular to each other. The prism sheet 1033 provides a different transmittance depending on the polarization direction of the incident light. This is determined according to the relation between the angle of a concave/convex portion on the surface of the prism sheet 1033 and the direction of oscillation of the incident light. A characteristic curve of it is as shown in FIG. 26. FIG. 26(a) shows a change in transmittance as a function of an angle of incidence in the up-and-down direction relative to the prism sheet 1033, i.e., in the direction perpendicular to an edge line direction 1045 of the prism sheet 1033. On the other hand, FIG. 26(b) shows transmittance as a function of an angle of incidence in the edge line direction 1045 of the prism sheet 1033. The results given in FIG. 26 indicate that the transmittance varies between p-polarized light and s-polarized light. The transmittance for p-polarized light is high in either directions on the face-up direction, that is, in the direction of a viewing angle range between −10 and +10 degrees. Therefore, when the face-up luminance is an important factor, the luminance can be enhanced by predominantly using p-polarized light. Japanese Patent Laid-Open No. 2000-122046 discloses such an attempt to fix a transmission axis of the polarizer on the incident side according to the light in a given oscillation direction that passes through the prism sheet, thereby improving the light utilization efficiency of a liquid crystal panel.

However, in the above-mentioned conventional backlight, some beams of light that come out of the light source 1002 do not hit the scattering dots 1004 and leave through an opposite end face instead, as depicted by dotted line in FIG. 34. The beams of light become lost beams that leak outside the light guiding plate 1003. In this case, a reflection tape may be provided on the opposite end face to return the light to the light guiding plate 1003. Recent light sources 1002 are, however, often disposed on both ends of the light guiding plate 1003 for higher luminance, as shown in FIGS. 32 and 33. In this case, no reflection tape can be provided. Some beams of light that reach the opposite end face are reflected by the fluorescent tube 1001 and the reflector 1002 and re-enter the light guiding plate 1003 for subsequent use, while other beams do not re-enter it. They are lost. According to the results of experiments and simulations that the present inventors have made, almost half of the beams of light that reaches the opposite end face of the light guiding plate 1003 is lost. Approximately 18% of the light that leaves the fluorescent tube 1001 goes through to the opposite side, about half of which is lost. In order to reduce the penetration of the beams of light through the light guiding plate, the scattering dots 1004 may be arranged more densely. The scattering dots 1004 are typically formed by printing. However, the density of the scattering dots 1004 has an upper limit by safety considerations in manufacturing. More specifically, an attempt to provide denser scattering dots 1004 cannot result in printing of the dots having a designated area because adjacent scattering dots 1004 are coalesced into one. The degree of coalescence varies each time of printing, which interferes stable fabrication. Thus, a certain spacing should be required between the adjacent scattering dots 1004. This can be expressed by the ratio of the total area of the scattering dots 1004 to the area available for the scattering dots 1004 (hereinafter, referred to as an "area ratio"). The upper limit of it was 80%. The scattering dots 1004 that can be printed in a stable manner has a lower limit as well. The lower limit was 20% in terms of the area ratio. Thus, the above-mentioned backlight 1000 has the upper limitation of the area ratio for the scattering dots 1004. This causes the above-mentioned penetration of beams of light through the light guiding plate 1003. The beams of light from the light source 1002 cannot be fully utilized.

To cope with such problems, Japanese Patent Laid-Open No. 8-146231 discloses a configuration in which a diffusing material is incorporated into a light guiding plate to scatter the beams of light for display use. However, the approach of incorporating the diffusing material into the light guiding plate to scatter the beams of light can only improve the scattering efficiency within the light guiding plate. It is difficult to control, at the same time, the luminance distribution on the light exit surface of the light guiding plate.

Recent liquid crystal displays have been in widespread use as a display monitor for PCs (personal computers). In addition, they have found applications as a liquid crystal television on which people can watch, for example, films with motion pictures. Liquid crystal displays for use in display monitors have been developed with higher resolution and higher luminance. Display monitors are mainly used for displaying text strings and drawing pictures. Accordingly, uniform luminance is required over the entire area of the display screen. In fact, as to the luminance distribution over the entire area of the display screen, the luminance at peripheral portions is at least 80% of the luminance at the central portion.

On the other hand, conventional televisions using a CRT (hereinafter, referred to as a "TV") typically have a higher luminance at the central portion of the display screen. The luminance at peripheral portions may be on the order of 50% of it. People usually look at the central portion of a motion picture such as a film. A large difference in luminance of the luminance distribution on the display screen seldom makes unnatural impression. Rather, the screen appears brighter when the luminance is higher at the central portion even though the luminance at peripheral portions is reduced.

As apparent from the above, displays have their suitable settings of display characteristics such as the luminance distribution according to specific applications such as a display monitor or a TV. In the field of the liquid crystal display, those available for AVPCs (audio video personal computers) have been developed recently that can function as both the display monitor and the TV. The liquid crystal display uses the illumination from the backlight for displaying images. Accordingly, it is necessary to distribute the luminance by varying the light output characteristic of the backlight in order to provide varied luminance distributions.

In typical edge-light type backlight systems using a light guiding plate, the distribution of the luminance is controlled by using the scattering dots that are provided on the lower surface of the light guiding plate, as described above. However, the scattering dots are formed by printing into a fixed pattern. Random variations cannot be achieved for settings of the luminance distribution of the backlight. Thus, no liquid crystal display with a conventional backlight can change the settings of the luminance distribution according to the utility of it.

The above-mentioned conventional liquid crystal displays are typically lower in luminance than CRTs. A higher luminance is desired accordingly. In order to provide a higher luminance, the output of a light source should be increased. In this event, the half of the beams of light from the light source 1002 is absorbed by polarizer on the incident side 1034 in the conventional liquid crystal panel 1006 having the configuration as shown in FIG. 35. The larger amount is absorbed with a larger output of the light source 1002. The uniformity is deteriorated due to thermal contraction of the polarizer 1034 by absorbed light. This may cause a problem of irregularities in black display.

In addition, an ratio of beams of light absorbed that has a low transmittance for p-polarized light and s-polarized light cannot be neglected because the non-polarized random light enters the prism sheet 1033. Consequently, deterioration of light condensing characteristic caused by deformation of the prism sheet 1033 due to heat would be a problem.

Furthermore, in FIG. 35, the polarizing axis of the polarizer is tilted about 45 degrees to the liquid crystal element 1035 for the following reason. TN liquid crystals that are widely used for the liquid crystal display panel 1006 have varied contrast viewing angle characteristics. It is wider in the horizontal direction and narrower in the vertical direction. The transmission axis of the polarizer is tilted 45 degrees to adjust the contrast viewing angle characteristics. Accordingly, the contrast viewing angle characteristics would be deteriorated when the transmission axis of the polarizer on the incident side is determined to suit to the light in a particular oscillation direction that passes through the prism sheet.

SUMMARY OF THE INVENTION

The present invention was made in order to overcome the above-mentioned problems. A first object thereof is to provide a method for manufacturing a lighting device, an image display, a liquid crystal monitor, a liquid crystal television, a liquid crystal information terminal, and a light guiding plate used for them, with which higher luminance can be achieved.

A second object of the present invention is to provide a method for manufacturing a lighting device, an image display, a liquid crystal monitor, a liquid crystal television, a liquid crystal information terminal, and a light guiding plate used for them, which allow for reduction in amount of beams of light penetrating through the light guiding plate and for control of luminance distribution.

In addition, a third object of the present invention is to provide a lighting device, an image display, a liquid crystal monitor, a liquid crystal television, and a liquid crystal information terminal, of which luminance distribution can be varied.

A fourth object of the present invention is to provide a lighting device, an image display, a liquid crystal monitor, a liquid crystal television, and a liquid crystal information terminal, in which loss of light in condensing means can be reduced.

A fifth object of the present invention is to provide an image display, a liquid crystal monitor, a liquid crystal television, and a liquid crystal information terminal, in which loss of light in a polarizer of a liquid crystal display panel can be reduced.

In order to achieve the above-mentioned objects, a lighting device according to the present invention comprises a light source; a light guiding plate that is disposed in such a manner that the light from said light source is allowed to enter the light guiding plate through an end face thereof; and a reflecting surface that is opposed to one major surface of said light guiding plate. The one major surface of the above-mentioned light guiding plate has a constant scattering layer formed thereon. The constant scattering layer is adapted to transmit the incident light to scatter it at a predetermined rate. The constant scattering layer has a distribution and scattering structure formed thereon. The distribution and scattering structure is adapted to transmit the incident light to scatter it at a percentage that varies according to the distance from the above-mentioned light source.

With this configuration, the beams of light entering the light guiding plate propagate by total reflection when they are not scattered within said light guiding plate. The amount of beams of light to be scattered by the constant scattering layer increases, which reduces the amount of light penetrating through the light guiding plate. This increases the light utilization rate, allowing for higher luminance. In addition, the luminance distribution on the other major surface of the light guiding plate which serves as the light exit surface may be controlled using a scattering effect of the distribution and scattering structure.

In this case, the above-mentioned constant scattering layer may be formed over the entire surface of the one major surface of the above-mentioned light guiding plate.

This configuration can reduce the amount of penetrating light more effectively.

In addition, the above-mentioned distribution and scattering structure may be a scattering region that is formed on the surface of the above-mentioned constant scattering layer in such a manner that an area ratio varies according to the distance from the above-mentioned light source.

In this case, the above-mentioned scattering region may be a scattering dot that is formed on the surface of the above-mentioned constant scattering layer.

This configuration makes it possible to form the scattering dots by printing, allowing for easier formation of a scattering region.

Furthermore, the above-mentioned scattering region may be formed of a region having concave/convex portions on the above-mentioned constant scattering layer.

A lighting device according to the present invention comprises a light source; a light guiding plate that is disposed in such a manner that the light from said light source is allowed to enter the light guiding plate through an end face thereof; and a reflecting surface that is opposed to one major surface of said light guiding plate. The above-mentioned light guiding plate is adapted to scatter, at a certain rate, the light propagating through the light guiding plate. The one major surface of the above-mentioned light guiding plate has a distribution and scattering structure formed thereon. The distribution and scattering structure is adapted to transmit the incident light to scatter it at a percentage that varies according to the distance from the above-mentioned light source.

With this configuration, the light that penetrates through the light guiding plate from the light source to the opposite end face is reduced by the scattering effect of the light guiding plate. The luminance distribution on the other major surface of the light guiding plate which serves as the light exit surface may be controlled using a scattering effect of the distribution and scattering structure. This increases the light utilization rate, allowing for higher luminance.

In this case, the scattering effect of the above-mentioned distribution and scattering structure may be larger in contribution to the amount of light that leaves the above-mentioned light guiding plate through the other major surface thereof, than the scattering effect of the above-mentioned light guiding plate.

With this configuration, the light that penetrates through the light guiding plate can be reduced without badly affecting the control of the luminance distribution on the light exit surface.

In this case, the scattering effect of the above-mentioned distribution and scattering structure may be substantially more than twice the scattering effect of the above-mentioned light guiding plate.

This configuration can control the luminance distribution on the light exit surface in a more preferable manner.

In addition, in the above-mentioned case, the above-mentioned distribution and scattering structure may be a scattering region that is formed on the one major surface of the above-mentioned light guiding plate in such a manner that the area ratio varies according to the distance from the above-mentioned light source.

This configuration provides the distribution and scattering structure easily.

In this case, the above-mentioned scattering region may be a scattering dot.

This configuration provides the distribution and scattering structure more easily.

Furthermore, in the above-mentioned case, the above-mentioned light guiding plate may be adapted to scatter the light by means of scattering members that are dispersed in said light guiding plate.

This configuration provides a light guiding plate having scattering capabilities easily.

In addition, the above-mentioned distribution and scattering structure may be adapted to scatter the above-mentioned incident light at a lower percentage when located closer to the light source.

With this configuration, it is possible to correct the luminance distribution on the light exit surface of which luminance is otherwise higher when located closer to the light source.

A lighting device according to the present invention comprises a light source; a light guiding plate that is disposed in such a manner that the light from said light source is allowed to enter the light guiding plate through an end face thereof; and a reflecting surface that is opposed to one major surface of said light guiding plate. The above-mentioned light guiding plate is adapted to scatter the light propagating therethrough at a percentage that varies according to the distance from the above-mentioned light source.

This configuration can vary the scattering rate at the light guiding plate according to the distance from the light source. Thus, it reduces the light that penetrates through the light guiding plate, and it permits to control the luminance distribution on the light exit surface. As a result, the light utilization rate is increased, allowing for higher luminance.

In such a case, the above-mentioned light guiding plate may be made up of a plurality of unit light guiding members having different scattering rates. The plurality of unit light guiding members is disposed in such a manner that the scattering rate of the whole light guiding plate varies according to the distance from the above-mentioned light source.

This configuration can eliminate the necessity of varying the scattering rate among the unit light guiding members, which facilitates manufacturing of the light guiding plate.

In this case, the above-mentioned plurality of unit light guiding members may comprise those having no scattering capability.

With this configuration, some unit light guiding members may be formed in a similar manner to common light guiding plates. This further facilitates the manufacturing.

A junction between the above-mentioned unit light guiding members may be adapted to reflect or scatter the incident light.

With this configuration, the light propagating through the light guiding plate has a greater chance of being scattered. The light that penetrates through the light guiding plate can thus be reduced more.

In this case, the above-mentioned reflection or scattering may be at least one of total reflection, scattering reflection, and scattering transmission.

In addition, in the above-mentioned case, the above-mentioned plurality of unit light guiding members may be joined to each other, with the refractive index of a unit light guiding member being consistent with that of others.

With this configuration, an optically light guiding plate can be functioned as same as a single one.

In this case, the above-mentioned plurality of unit light guiding members may be joined to each other via a member having a refractive index of approximately 1.5 in order to provide consistency of the refractive indices of the unit light guiding members.

With this configuration, the unit light guiding member may be formed of a common acrylic resin. A light guiding plate that is similar to an optically single one can easily be obtained.

In the above-mentioned case, the above-mentioned light guiding plate may be adapted to scatter the light by means of scattering members that are dispersed in said light guiding plate. The scattering members may be dispersed with the density that varies according to the distance from the above-mentioned light source.

This configuration easily provides a light guiding plate of which scattering rate varies depending on the sites.

In addition, the above-mentioned light guiding plate may be adapted to scatter the light propagating therethrough at a lower percentage when located closer to the light source.

With this configuration, it is possible to correct the luminance distribution on the light exit surface of which luminance is otherwise higher when located closer to the light source.

The above-mentioned plurality of light sources may be disposed in such a manner that the output light from each light source is directed to the end faces of the above-mentioned light guiding plate.

This configuration improves the luminance.

Furthermore, in the above-mentioned case, the above-mentioned scattering member may be adapted to reflect or scatter the incident light.

In addition, the above-mentioned scattering member may generally be larger in size than the wavelength of visible light.

With this configuration, the scattering member can suitably scatter the incident light in a lighting device for visible light.

In addition, the above-mentioned scattering member may generally be equal to submicrometers to several millimeters in size.

The above-mentioned scattering member may be formed of beads $SiO_2$, or gas bubbles.

Furthermore, a lighting device according to the present invention comprises a light source; a light guiding plate that is disposed in such a manner that the light from said light source is allowed to enter the light guiding plate through an end face thereof; and a reflecting surface that is opposed to one major surface of said light guiding plate. One major surface of the above-mentioned light guiding plate has a plurality of scattering regions that are adapted to scatter the incident light, each scattering region having an area ratio that varies according to the distance from the above-mentioned light source. Said plurality of scattering regions are made up of various kinds of things that are different in scattering capacity from each other.

With this configuration, by appropriately selecting the scattering capacity for the plurality of scattering regions, it is possible to prevent the uniformity of the luminance distribution on the light exit surface from being deteriorated. In addition, selection of the scattering capacity provides light luminance.

In this case, the above-mentioned various kinds of scattering regions may have different scattering properties because of difference in material that forms said scattering regions.

The above-mentioned various scattering regions may be configured by dispersing scattering members in a base member that transmits the incident light, the scattering members being different in refractive index from the base member. The scattering regions may have different scattering properties because of difference in distribution density thereof.

An image display according to the present invention comprises a lighting device as claimed in any one of claims 1, 6, 13, and 27, the light that comes out of said lighting device being used as light for displaying an image.

This configuration reduces the light that penetrates through the light guiding plate, and provides an image display in which luminance distribution on a display screen can be controlled or provides a image display with which deterioration of uniformity of the screen luminance distribution can be avoided. As a result, an image display can be obtained with higher luminance.

In addition, a method for manufacturing a light guiding plate according to the present invention is a method for manufacturing a light guiding plate having a transparent base member and scattering members that are dispersed in the transparent base member, the scattering members being adapted to scatter the incident light, wherein the above-mentioned scattering members are dispersed in the above-mentioned base member with different densities at different sites.

This configuration provides a light guiding plate of which scattering rate varies at different sites easily.

In this case, it may comprise the steps of heating and melting a material of the above-mentioned base member; mixing the above-mentioned scattering members with the molten material for the base member; and heating said molten material for the base member while keeping it in the form of a plate, the material being heated with different temperatures at different sites, and then curing it.

This configuration makes it possible to vary the viscosity of the molten material for the base member depending on the temperature, and the density of the scattering members varies accordingly. Such light guiding plate can be manufactured easily that the distribution density of the scattering members varies.

Air bubbles that serve as the above-mentioned scattering members may be formed in the above-mentioned base member with different densities at different sites.

In this case, the above-mentioned gas bubbles may be formed using a foaming agent.

With this configuration, by irradiating the molten base member material admixed with the foaming agent with a distribution in intensity within irradiation plane, bubbles can be made with different densities at different sites. A light guiding plate can be manufactured easily in which the distribution density of the scattering members varies at different sites.

A lighting device according to the present invention is a lighting device comprising a light source; and a light exit surface through which the light from said light source comes out. The lighting device comprises luminance distribution alteration means that alters the luminance distribution on the above-mentioned light exit surface.

This configuration makes it possible to vary the luminance distribution on the light exit surface according to specific applications. This in turn provides higher luminance.

In this case, the lighting device may further comprise a light guiding plate for use in directing the light from the above-mentioned light source to the above-mentioned light exit surface. The above-mentioned luminance distribution alteration means may be configured with scattering rate distribution alteration means that alters the distribution of a scattering rate of the light that is directed by the above-mentioned light guiding plate in terms of the above-mentioned light exit surface.

With this configuration, changing the distribution of the scattering rate varies the luminance distribution on the light exit surface. Thus, in edge-light type lighting devices, a desired luminance distribution on the light exit surface may be selected for each specific application.

In this case, the above-mentioned light guiding plate may be positioned in such a manner that the light from the above-mentioned light source is received through an end face. A reflecting surface may be formed so that the light that comes out through one major surface of said light guiding plate returns to said one major surface, thereby the other major surface of said light guiding plate forms the above-mentioned light exit surface. A light distributing structure may be disposed as the above-mentioned scattering rate distribution alteration means between the one major surface of the above-mentioned light guiding plate and the above-mentioned reflecting surface. The light distributing structure may be adapted to change the distribution of the scattering rate of the incident light in a plane that is parallel to the above-mentioned light exit surface.

This configuration makes it possible to vary the distribution of the scattering rate only by means of the light distributing structure. The scattering rate distribution alteration means can thus be configured easily.

In this case, the above-mentioned light distributing structure may comprise a liquid crystal element that is disposed between the one major surface of the above-mentioned light guiding plate and the above-mentioned reflecting surface, the liquid crystal element being adapted to change orientation of said liquid crystal in order to transmit or scatter the incident light according to the position of a liquid crystal in an extending plane, and control means adapted to change the orientation of the liquid crystal in said liquid crystal element according to the above-mentioned position.

This configuration provides a liquid crystal element having a structure that is similar to the one of common liquid crystal elements. Therefore, the light distributing structure can be formed easily.

In this case, the above-mentioned light distributing structure may be for generating a region where the above-mentioned incident light is scattered in the above-mentioned liquid crystal element in such a manner that an area ratio of said region varies according to the distance from the light source.

This configuration makes it possible to vary the distance from the light source at different positions on the light exit surface. By appropriately selecting the area ratio of the scattering region of the light distributing structure, variations in distance from the light source at different positions on the light exit surface can be balanced out to provide a desired luminance distribution on the light exit surface.

In addition, the liquid crystal in the above-mentioned liquid crystal element may comprise a dispersed polymer liquid crystal.

With this configuration, the liquid crystal element can be configured in a suitable manner.

In the above-mentioned case, the light guiding plate may be positioned in such a manner that the light from the light source is received through an end face, a reflecting surface being formed so that the light that comes out through one major surface of said light guiding plate returns to said one major surface, thereby the other major surface of said light guiding plate forming the light exit surface. The above-mentioned scattering rate distribution alteration means may comprise a first scattering region that is formed to be distributed on the one major surface of the above-mentioned light guiding plate; a scattering control structure for selectively scattering or transmitting the light that passes between the one major surface of the above-mentioned light guiding plate and the above-mentioned reflecting surface; and a second scattering region that is formed to be distributed on the above-mentioned reflecting surface.

This configuration makes it possible to form the first and second scattering regions by, for example, printing the dots. The scattering control structure requires only a simple structure because it merely changes the modes to scatter or transmit the incident light without variation. The scattering rate distribution alteration means can be formed easily at low costs accordingly.

In addition, the above-mentioned luminance distribution varying means may be formed of light intensity distribution alteration means that alters the light intensity distribution of the light directed towards the above-mentioned light exit surface in said light exit surface.

With this configuration, the present invention may be applied to an array-type lighting device.

In this case, the above-mentioned light intensity distribution alteration means may alter the above-mentioned light intensity distribution by transmitting or scattering the above-mentioned light according to the position in a plane parallel to the above-mentioned light exit surface.

This configuration eliminates absorption by the light intensity distribution alteration means. Therefore, the light intensity distribution can be altered with little if anything causing any losses.

In the above-mentioned case, the above-mentioned luminance distribution alteration means may alter the luminance distribution on the light exit surface of the light source.

In this case, the light source may be made up of a plurality of light emitters and the luminance distribution alteration means may alter the amount of light to be emitted from each light emitter according to the position of said light emitter.

This configuration makes it possible to alter the amount of light to be emitted from the light emitter. This allows for efficient alteration of the luminance distribution on the light exit surface.

In this case, the above-mentioned luminance distribution alteration means may alter the amount of light to be emitted from said light emitter by altering the electric power to be supplied to the above-mentioned light emitter.

Furthermore, the above-mentioned light emitter may be made up of an LED.

This configuration provides the light emitter easily.

Moreover, in the above-mentioned case, the above-mentioned light source may be made up of a surface-light emitter, and the above-mentioned luminance distribution alteration means may alter the distribution of luminance on the light exit surface of said surface-light emitter.

This configuration provides a light source easily of which distribution of luminance on the light exit surface can be altered.

Furthermore, a lighting device according to the present invention is a lighting device comprising a light source; and a light exit surface through which the light from said light source comes out. The above-mentioned light source is made up of a plurality of light emitters. Said plurality of light emitters are arranged in such a manner that the density thereof varies.

This configuration simplifies the structure because the light emitters are arranged with different densities.

In this case, the above-mentioned light emitter may be made up of an LED.

This configuration provides the light emitter easily.

An image display according to the present invention is a image display comprising a lighting device; a liquid crystal display panel that is adapted to cause the light that comes out of said light device to travel through a liquid crystal layer forming a display screen with varied transmittance; and driving means that is adapted to alter the transmittance of said liquid crystal display panel to display an image according to a video signal. The above-mentioned lighting device includes a light source; a light exit surface through which the light from said light source comes out; and luminance distribution alteration means that alters the luminance distribution on said light exit surface.

With this configuration, the luminance distribution on the display screen is made to be fitted into the luminance distribution on the light exit surface of the lighting device. Changing the luminance distribution on the light exit surface of the lighting device results in varied luminance distribution on the display screen according to specific applications. This provides higher luminance.

In this case, the above-mentioned luminance distribution alteration means comprises luminance distribution setting means with which a plurality of luminance distributions can be set on the light exit surface; and selection means for selecting one of the set luminance distributions on the light exit surface.

With this configuration, a desired luminance distribution can be achieved easily only by means of selecting a predetermined luminance distribution.

In this case, the above-mentioned luminance distribution alteration means may alter the above-mentioned luminance distribution on the light exit surface according to the above-mentioned video signal.

With this configuration, the luminance distribution on the light exit surface can appropriately be associated with the video signal, there by to provide a suitable luminance distribution on the display screen for a screen where images are displayed.

In addition, the above-mentioned luminance distribution alteration means may determine a panoramic luminance distribution of the above-mentioned video signal on a screen and alter the above-mentioned luminance distribution on the light exit surface according to said determined panoramic luminance distribution.

This configuration can improve an apparent brightness by determining a peak of the luminance from, for example, the above-mentioned panoramic luminance distribution and increasing the luminance at or around t he peak on the display screen.

Furthermore, the above-mentioned luminance distribution alteration means may determine a luminance histogram of a pixel in the above-mentioned video signal and alter the above-mentioned luminance distribution on the light exit surface according to said determined histogram.

With this configuration, it is easy to calculate the above-mentioned histogram and determine the brightness of a screen based on the calculation result. Therefore, the above-mentioned luminance distribution on the light exit surface can easily be associated with the video signal.

In addition, an image display according to the present invention is an image display comprising a lighting device; a liquid crystal display panel that is adapted to cause the light that comes out of said light device to travel through a liquid crystal layer forming a display screen with varied transmittance; and driving means that is adapted to alter the transmittance of said liquid crystal display panel to display an image according to a video signal. The above-mentioned lighting device includes a light source; a light exit surface through which the light from said light source comes out; and luminance distribution alteration means that alters the luminance distribution on said light exit surface. The image display further comprises video signal composition means that merges a plurality of video signals received thereby in order to display images corresponding to said plurality of video signals on a plurality of regions in a single screen. The video signal composition means is adapted to supply the merged signal to the above-mentioned driving means as the above-mentioned video signal.

With this configuration, display can be made on a plurality of regions in a single screen, i.e., in a multi-screen mode. Besides, the luminance distribution alteration means can determine the luminance distribution on the display screen so that a preferable luminance distribution is provided for each region forming the display screen in the multi-screen mode. This provides a multi-screen of higher luminance.

In addition, an image display according to the present invention is an image display comprising a lighting device; a liquid crystal display panel that is adapted to cause the light that comes out of said light device to travel through a liquid crystal layer forming a display screen with varied transmittance; and driving means that is adapted to alter the transmittance of said liquid crystal display panel to display an image according to a video signal. The above-mentioned lighting device includes a light source; and a light exit surface through which the light from said light source comes out. Said light source is made up of a plurality of light emitters. Said plurality of light emitters are arranged in such a manner that the density thereof varies.

This configuration simplifies the structure of the lighting device because the light emitters are arranged with different densities.

A lighting device according to the present invention is a lighting device comprising a light source; and condensing means for condensing the light that comes out of said light source. It further comprises polarization means for polarizing the light that comes out of the above-mentioned light source into p-polarized light and directing it to the above-mentioned condensing means.

With this configuration, the condensing means has a higher transmittance for p-polarized light than for s-polarized light. The transmittance of the condensing means is improved. This allows for higher luminance. In addition, loss of light in the condensing means is reduced.

In this case, the above-mentioned condensing means may be formed of a prism sheet.

With this configuration, the prism sheet has a higher transmittance for p-polarized light than for s-polarized light. This provides a particularly remarkable effect.

The above-mentioned polarization means may be made of a reflective polarizer that transmits the beams of incident light of p-polarized light and reflects those of s-polarized light.

This configuration reduces or even eliminates absorption in polarizing the beams of incident light, which reduces the loss.

In this case, the above-mentioned reflective polarizer may have a multi-layered film structure including a plurality of films with a different refractive index from each other.

This configuration allows for easy formation of a structure that polarize the incident light into p-polarized light.

Furthermore, the above-mentioned reflective polarizer may include a cholesteric liquid crystal.

In addition, a phase plate may be disposed in front of the above-mentioned reflective polarizer.

This configuration makes it possible to change the polarization direction of the s-polarized light reflected by the reflective polarizer.

In the above-mentioned case, the above-mentioned light source may include a plurality of dot-shaped light emitters.

The above-mentioned light source may include a linear light emitter.

The above-mentioned light source may also include a planar light emitter.

Furthermore, the above-mentioned light source may include a combination of two or more of a dot-shaped light emitter, a linear light emitter, and a planar light emitter.

An image display according to the present invention is an image display that users the light that comes out of a lighting device as the light to display images, in which the above-mentioned lighting device comprises a light source; condensing means for condensing the beams of incident light; and polarization means for polarizing the light that comes out of the above-mentioned light source into p-polarized light and directing it to said condensing means.

With this configuration, the transmittance is improved when the condensing means has a higher transmittance for p-polarized light than for s-polarized light. This provides an image display for higher luminance. The loss of light in the condensing means can be reduced.

In this case, the image display may further comprise a polarizer on the incident side, a liquid crystal element, and a polarizer on the outgoing side, which are arranged in this order on an optical path of the light leaving from the above-mentioned condensing means. The polarizing axis of the above-mentioned polarizer on the incident side and the polarizing axis of the polarizer on the outgoing side may be generally parallel and generally perpendicular, respectively, to the polarizing axis of the above-mentioned p-polarized light.

With this configuration, the polarizer on the incident side receives the light having a polarizing axis that generally matches with the polarizing axis thereof. This results in reduced loss by absorption in said polarizer on the incident side.

In this case, the polarizing axis of the above-mentioned p-polarized light may be tilted by 45 degrees relative to the longitudinal direction of the display screen of the above-mentioned liquid crystal element.

With this configuration, the present invention may be applied to a common TN-type liquid crystal display.

In this case, a pair of the above-mentioned condensing means may be arranged in such a manner that a direction that is perpendicular to the plane including a condensing direction of one condensing means is perpendicular to that of the other, and the direction that is perpendicular to the plane including said condensing direction of one condensing means may generally be in parallel to the polarizing axis of said polarizer on the incident side.

This configuration makes it possible to provide a symmetric contrast viewing angle characteristic of the display screen in the longitudinal direction in common TN-type liquid crystal displays.

In this case, the direction that is perpendicular to the plane including said condensing direction of the condensing means that is located closer to the above-mentioned polarizer on the incident side may generally be in parallel to the polarizing axis of said polarizer on the incident side.

This configuration improves face-up luminance of the display screen as compared with a case where the condensing means are arranged in a reverse order.

In the above-mentioned case, liquid crystals within a region forming each pixel or a picture element of the above-mentioned liquid crystal element may be aligned in different directions between both sides of a plane that is generally perpendicular to a substrate of said liquid crystal element.

The above-mentioned liquid crystals may be aligned in a generally symmetrical manner with respect to the above-mentioned plane.

With this configuration, the display screen has generally symmetric contrast viewing angle characteristics. This eliminates the necessity of placing the polarization axes of the polarizers that are disposed in front of and behind the liquid crystal element to be on the diagonal lines of the display screen.

In addition, the polarizing axis of the above-mentioned p-polarized light may generally be perpendicular to the longitudinal direction of the display screen of the above-mentioned liquid crystal element.

With this configuration, the condensing direction of the condensing means becomes generally perpendicular to the longitudinal direction of the display screen of the liquid crystal element. Therefore, only a single condensing means is required, simplifying the structure.

A liquid crystal monitor according to the present invention uses an image display as claimed in any one of Claims 51, 56, and 57, as a display unit.

This configuration provides a liquid crystal monitor of which luminance distribution can be controlled, a liquid crystal monitor available for multi-screen display with a desired luminance distribution, or a liquid crystal monitor with a simplified lighting device.

A liquid crystal television according to the present invention uses an image display as claimed in any one of Claims 51, 56, and 57, as a display unit.

This configuration provides a liquid crystal television of which luminance distribution can be controlled, a liquid crystal television available for multi-screen display with a desired luminance distribution, or a liquid crystal television with a simplified lighting device.

A liquid crystal information terminal according to the present invention uses an image display as claimed in any one of Claims 51, 56, and 57, as a display unit.

This configuration provides a liquid crystal information terminal of which luminance distribution can be controlled, a liquid crystal information terminal available for multi-screen display with a desired luminance distribution, or a liquid crystal information terminal with a simplified lighting device.

The above-mentioned objects and other objects, features, and advantages of the present invention will be apparent from the following description of the preferred embodiments thereof that is made with reference to the accompanying drawings. The above and further objects and features of the invention will be more fully apparent from the following detailed description with accompanying drawings.

BEST MODES FOR CARRYING OUT THE INVENTION

Embodiments of the present invention are described below with reference to the drawings Embodiment 1

The Embodiment 1 of the present invention shows a configuration example of a lighting device of which luminance distribution may be determined arbitrarily.

Figure 1:
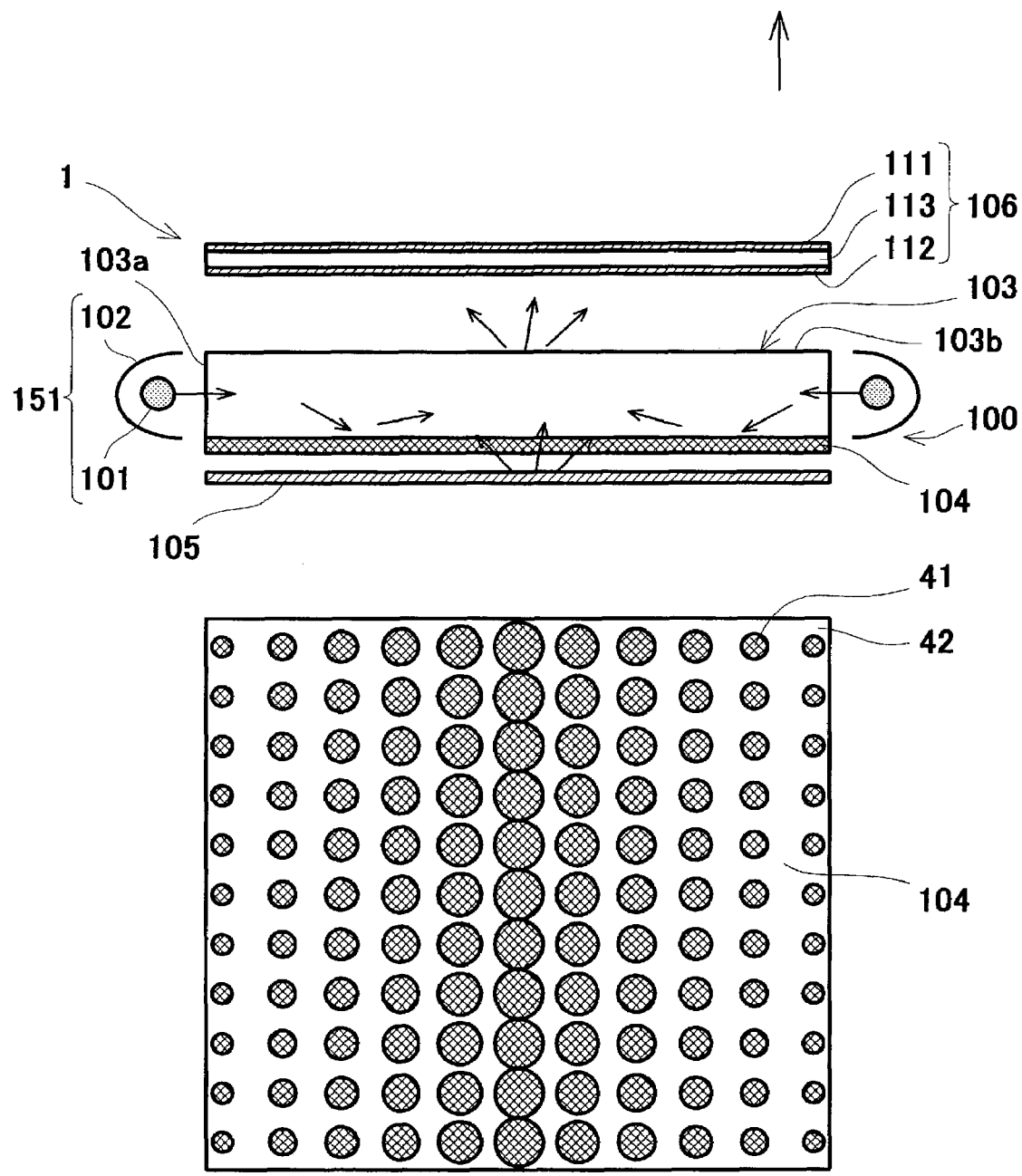
FIG. 1 is a view that schematically illustrates configurations of a lighting device and of an image display in which it is used, according to the Embodiment 1 of the present invention, wherein (a) is a cross-sectional view, and (b) is a plan view showing a dot pattern of a dispersed liquid crystal element shown in (a)
Figure 2:
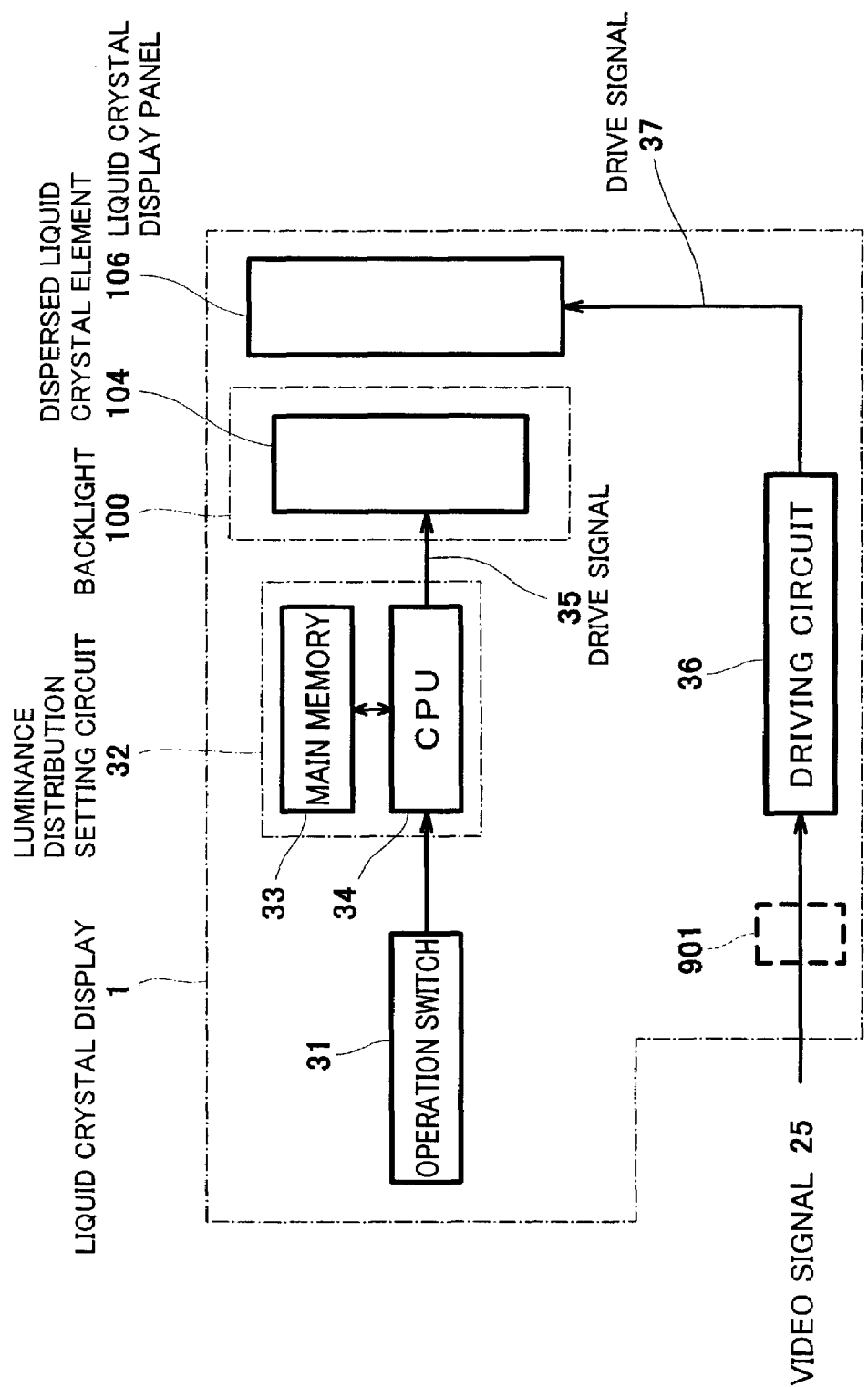
FIG. 2 is a block diagram showing a configuration of a control system used in the image display shown in FIG. 1(*a*)

FIG. 1 is a view that schematically illustrates configurations of a lighting device and of an image display in which the device is used, according to this embodiment. In the figure, (a) is a cross-sectional view, and (b) is a plan view showing a dot pattern of a dispersed liquid crystal element shown in (a). FIG. 2 is a block diagram showing a configuration of a control system used in the image display shown in FIG. 1(a). In FIG. 1(a), the upper direction of an image display is considered as an X-direction, as a matter of convenience.

In FIG. 1(a), this embodiment illustrates a liquid crystal display as an image display, and a backlight 100 for liquid crystal displays as a lighting device.

The backlight 100 is placed beneath a liquid crystal panel (hereinafter, referred to as a "liquid crystal display element") 106 which forms a liquid crystal display in cooperation with the liquid crystal element. The backlight 100 comprises a light guiding plate 103 which is formed of a transparent rectangular synthetic resin plate, cold cathode tubes 101 which are a pair of light emitters disposed near a pair of end faces 103a of said light guiding plate 103 along said end faces 103a generally in parallel to said end faces 103a, a pair of reflectors 102 that cover their corresponding cold cathode tubes 101 along the length thereof, a dispersed liquid crystal element 104 that is disposed on the lower surface of the light guiding plate 103, and a reflecting plate 105 that is disposed beneath the dispersed liquid crystal element 104. A light source 151 is made up of the cold cathode tubes 101 and the reflectors 102. In FIG. 1(a), the reflecting plate 105 is illustrated as being away from the dispersed liquid crystal element 104, as a matter of description convenience. However, it is typically disposed in contact with the lower surface of the dispersed liquid crystal element 104.

The dispersed liquid crystal element 104 includes electrodes of a dot matrix. A drive signal which is used to generate a predetermined dot pattern as shown in FIG. 1(b) is supplied to this electrode. More specifically, the dispersed liquid crystal element 104 is similar in configuration to a liquid crystal cell. It includes a substrate having a common electrode formed on the inner surface thereof, and another substrate having a pixel electrode formed on the inner surface thereof. These substrates are opposed to each other with liquid crystal interposed between them. As shown in FIG. 2, the dispersed liquid crystal element 104 is supplied with a drive signal 35 from a luminance distribution setting circuit 32. The luminance distribution setting circuit 32 has, for example, a CPU 34 and a main memory 33. A plurality of dot patterns are previously stored on said main memory 33. The CPU 34 is connected to an operation switch 31. In response to a dot pattern selection command supplied from the operation switch 31, the CPU 34 reads a selected dot pattern from the main memory 33. Then, it generates a drive signal 35 corresponding to the read dot pattern and supplies it to the dispersed liquid crystal element 104. A voltage is applied to the liquid crystal of each pixel corresponding to the supplied drive signal 35. The orientation of liquid crystal molecules in each pixel changes corresponding to the applied voltage. As a result, the selected dot pattern appears on the dispersed liquid crystal element 104.

This dot pattern is made up of circular dots 41 and a remaining portion 42, as shown in FIG. 1(b). The dots 41 of the dispersed liquid crystal element 104 correspond to where no voltage is applied. In this state, the liquid crystal molecules in the dots 41 are arranged in a loosely ordered fashion in each pixel. On the contrary, the portion 42 other than the dots 41 of the dispersed liquid crystal element 104 corresponds to where voltage is applied, and the liquid crystal molecules rearrange themselves in the same direction, which is transparent for the light that passes straight through. The light that enters the dots 41 is scattered. The scattered light is then scattering-reflected by the reflecting plate 105. Some beams of the scattering-reflected light pass through the light guiding plate 103 and leave it through the upper surface thereof. On the other hand, the beams of light that enter the portion 42 other than the dots 41 pass straight through. They are reflected by the reflecting plate 105 according to the angle of incidence and returned to the light guiding plate 103. The above-mentioned dot pattern has such an area ratio, relative to the major surface of the dispersed liquid crystal element 104 (corresponding to the display screen of the liquid crystal display panel), that is low at positions on said major surface near a light source 151, and it becomes higher as it approaches the central portion. Using this dot pattern, the ratio of the amount of light that leaves at each site relative to the amount of light that comes out from the entire upper surface of the light guiding plate 103 (light intensity distribution) is high at the central portion. The central portion has higher luminance accordingly. The dispersed liquid crystal element 104 has almost no light absorption characteristic. It does not reduce the amount of light leaving the light guiding plate, and has a similar scattering function to that of scattering dots in a conventional light guiding plate.

A plurality of dot patterns that are stored on the main memory 33 in the above-mentioned luminance distribution setting circuit 32 are determined in order to allow the backlight 100 to have a suitable luminance distribution for its use, according to predetermined various applications of the liquid crystal display 1. In this embodiment, for example, the main memory 33 stores a dot pattern for display monitors that requires a luminance distribution with a relatively small difference in luminance between the peripheral portion and the central portion of the display screen, and a dot pattern for TVs that requires a luminance distribution with a relatively large difference in luminance between the peripheral portion and the central portion of the display screen.

Next, operations of the backlight 100 having the above-mentioned configuration are described.

In FIGS. 1 and 2, the operation switch 31 is manipulated to select a desired dot pattern. Here, it is assumed that the dot pattern for display monitors is selected. The luminance distribution setting circuit 32 produces the drive signal 35 corresponding to the selected dot pattern for display monitors. The dispersed liquid crystal element 104 generates the dot pattern for display monitors corresponding to the produced drive signal 35. On the other hand, the light that comes out of the cold cathode tubes 101 enters, directly or after being reflected by the reflectors 102, to the light guiding plate 103 through the end face 103a. Some beams of incident light that enter the dots 41 of the dispersed liquid crystal element 104 are scattered. Some beams of the scattered light leave the light guiding plate 103 through the upper surface thereof. On the other hand, other beams of the above-mentioned incident light that enter the portion 42 other than the dots 41 of the dispersed liquid crystal element 104 pass straight through. Then they are reflected by the reflecting plate 105 according to the angle of incidence and returned to the light guiding plate 103. The light intensity distribution of the light that comes out of the light guiding plate 103 through the upper surface thereof is made to be fitted into the dot pattern for display monitors. As a result, the backlight 100 has a luminance distribution with a relatively small difference in luminance between the peripheral portion and the central portion of a light exit surface 103b. When the dot pattern for TVs is selected with the operation switch 31, the backlight 100 has a luminance distribution with a relatively large difference in luminance between the peripheral portion and the central portion of a light exit surface 103b, as a result of similar operations.

As apparent from the above, in the lighting device according to this embodiment, the dispersed liquid crystal element 104 is placed on the lower surface of the light guiding plate 103, and the dot pattern determined and selected by the luminance distribution setting circuit 32 can be generated on the dispersed liquid crystal element 104. An arbitrary luminance distribution can be obtained according to specific applications. For example, the luminance distribution may be increased for displaying motion pictures on a TV. Alternatively, the luminance distribution may be made uniform for a display monitor on which text strings are to be displayed.

EXAMPLE 1

In FIGS. 1(a) and (b), the dot pattern was generated on the dispersed liquid crystal element 104 as follows. More specifically, the dots 41 were arranged into an array. Where y represents the diameter of a dot 41, said diameter y was made to vary according to the linear function of "y=a×r" (a: proportional coefficient), said function being in proportion to the distance r from the light emitters 101 disposed on the right and left sides of the light guiding plate 103. The proportional coefficient a was determined in such a manner that the central dot 41 which was the largest diameter had a diameter of approximately 2 mm, and the pitch between the dots 41 was set to be approximately 1.5 to 3 mm.

The light guiding plate 103 used was rectangular in shape with a diagonal of 7 inches (hereinafter, what the diagonal is x inch(es) is referred to as an "x-inch size") and a thickness of approximately 10 mm. A cold cathode tube that is designed to provide approximately 100 W output was used as the light emitter 101.

Then, the luminance distribution was measured on the upper surface of the light guiding plate 103 serving as the light exit surface 103b. This measurement gave a uniform luminance distribution over the entire surface, with the luminance of about 4500 to 5000 candelas.

EXAMPLE 2

In this example, the diameter of a dot 41 was made to vary in proportion to the square of the distance r from the light emitters 101 disposed on the right and left sides of the light guiding plate 103, according to the linear function of "y=a×r×r". Other factors are similar to those in the Example 1. Then, the luminance distribution was measured on the upper surface of the light guiding plate 103. The luminance at the center thereof was about 6000 candelas. The luminance at a position 0.9 inches away from the edge along the diagonal line was about 3000 candelas. The luminance around the periphery was about 50% of the luminance at the center. Thus, the luminance distribution with a large difference in luminance between the periphery and the center was obtained.

The Examples 1 and 2 revealed that the luminance distribution may be varied arbitrarily by forming a certain scattering pattern using electric fields applied to the dispersed liquid crystal element 104. The dot patterns in the Examples 1 and 2 are suitable for display monitors and TVs, respectively.

Next, a modification of this embodiment is described. In the above-mentioned configuration example, the dot matrix was formed on the dispersed liquid crystal element 104 to generate a dot pattern. As an alternative configuration, in the backlight 100 shown in FIGS. 1 and 2, ITO (Indium Tin Oxide) electrodes of the dispersed liquid crystal element 104 may be formed into a predetermined dot pattern to turn ON/OFF the voltage to be applied to said dispersed liquid crystal element 104. In this case, the ITO electrodes are provided on the portion 42 other than the dots 41 in FIG. 1(b). Then, scattering dots having a pattern corresponding to the luminance distribution that is required for the lower surface of the light guiding plate 103 are previously formed by printing.

With this configuration, the light entering said dispersed liquid crystal element 104 is scattered uniformly over the entire surface of it when no voltage is applied to the dispersed liquid crystal element 104. The scattered light is reflected by the reflecting plate 105 and returned to the light guiding plate 103. It is then scattered by the printed scattering dots and leaves the light guiding plate 103 through the upper surface thereof. On the other hand, in response to the application of voltage to the dispersed liquid crystal element 104, a predetermined dot pattern appears on said dispersed liquid crystal element 104. The light that enters the light guiding plate 103 eventually leaves said light guiding plate 103 through the upper surface thereof, with the predetermined dot pattern multiplied by a diffusion characteristic due to the printed scattering dots.

Accordingly, by changing ON and OFF of the voltage to be applied to the dispersed liquid crystal element 104, two luminance distributions can be selected. The dispersed liquid crystal element 104 is only required to form the ITO in association with the predetermined dot pattern. Application of the voltage may be achieved only by changing ON and OFF. This makes it possible to manufacture the dispersed liquid crystal element 104 at a lower cost, as compared with the formation of the dot matrix electrode.

It is preferable to provide optical matching between the dispersed liquid crystal element 104 and the light guiding plate 103, or between the dispersed liquid crystal element 104 and the reflecting plate 105, by sealing liquid or others having the same refractive index.

Alternatively, the reflecting plate 105 maybe eliminated. Instead, a metal reflection film made of, for example, aluminum maybe formed on the lower substrate of the dispersed liquid crystal element 104 to achieve the function as the reflecting surface.

In the above-mentioned configuration example, the dispersed polymer liquid crystal is used as the liquid crystal for the dispersed liquid crystal element 104. However, nematic liquid crystal, ferroelectric liquid crystal, or anti-ferroelectric liquid crystal may be used instead.

While the dispersed liquid crystal element 104 is used as switching means for changing the diffusion characteristic of the light that enters the light guiding plate 103 in the above-mentioned configuration example, lithium niobate or BSO crystals with which the light transmittance can be altered electrically may also be used.

Embodiment 2

The Embodiment 2 of the present invention shows another configuration example of a lighting device of which luminance distribution may be determined arbitrarily.

Figure 3:
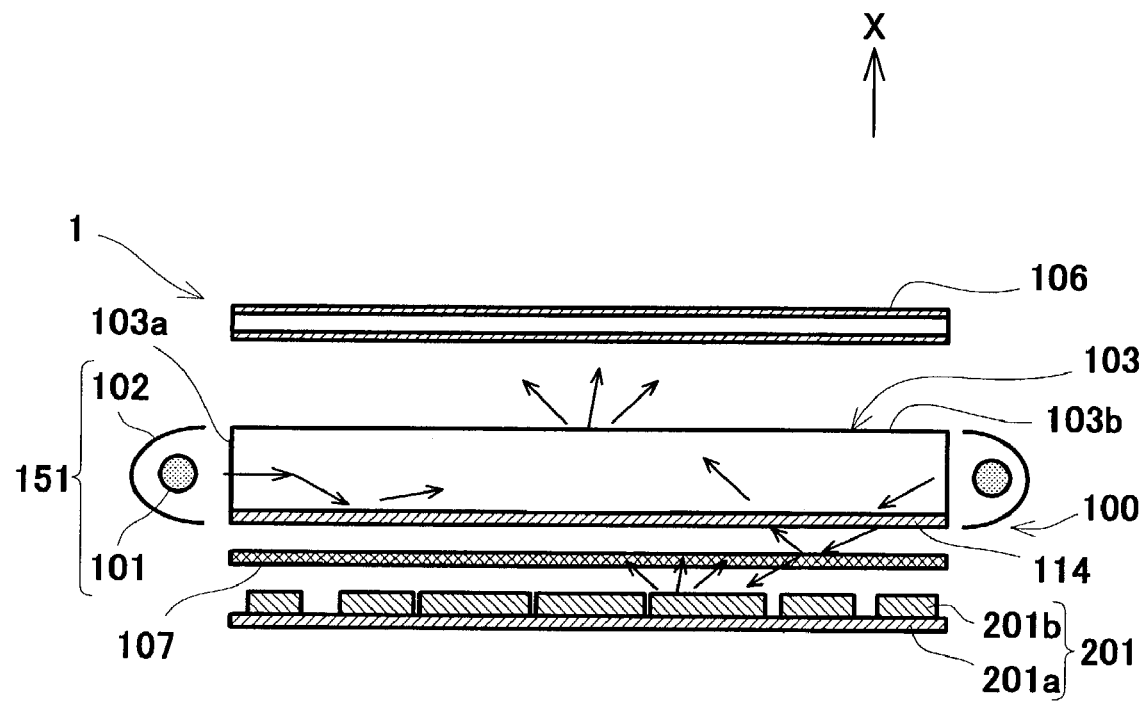
FIG. 3 is a cross-sectional view that schematically shows configurations of a lighting device and of an image display in which it is used, according to the Embodiment 2 of the present invention.

FIG. 3 is a cross-sectional view that schematically illustrates configurations of a lighting device and of an image display in which it is used, according to this embodiment. In FIG. 3, the same reference numeral depicts the same or equivalent part as or to those in FIG. 1.

As shown in FIG. 3, this embodiment is different from the Embodiment 1. Scattering dots 114 are formed by printing on the lower surface of the light guiding plate 103. A scattering control board 107 is placed beneath said scattering dots 114. A scattering reflecting plate 201 is placed beneath said scattering control board 107. Other components and parts are similar to those described in the Embodiment 1. In FIG. 3, the light guiding plate 103, a control board 107, and the scattering reflecting plate 201 are illustrated as being away from each other, as a matter of description convenience. However, they are typically contacted with each other.

More specifically, the scattering control board 107 is configured with an oppositely aligned pair of glass substrates with an ITO electrodes formed on the inner surface thereof. A dispersed polymer liquid crystal is filled and sealed between these glass substrates. The scattering control board 107 is connected to a driving circuit (not shown) for applying a voltage of about 10 to 30 V between the above-mentioned ITO electrodes to drive them. Then, by changing ON and OFF of the voltage, the alignment state of liquid crystal molecules of the scattering control board 107 is changed between "lined-up" and "loosely ordered" arrangements.

The dot pattern as shown in FIG. 1(b) is formed on the lower surface of the light guiding plate 103.

The scattering reflecting plate 201 has scattering dots 201b as shown in FIG. 3 on the reflecting surface of a reflecting plate 201a. The pattern of the scattering dots 201b is different from the pattern of the scattering dots 114 formed on the light guiding plate 103.

With the above-mentioned configuration, the light that comes out of the light emitter 101 enters, directly or after being reflected by the reflectors 102, the light guiding plate 103. The incident light propagates through the light guiding plate 103 with a series of multiple scatterings while being scattered by the scattering dots 114 on the lower surface of the light guiding plate 103.

The liquid crystal molecules in the scattering control board 107 are arranged in a loosely ordered fashion when no voltage is applied to the scattering control board 107 by the above-mentioned voltage application circuit. In this case the light that travels from the lower surface of the light guiding plate 103 to the scattering control board 107 and enter the scattering control board 107 is scattered over the entire surface thereof. Then, the light is reflected by said scattering reflecting plate 107 and returned to the light guiding plate 103, without being affected by the scattering dots 201b formed on the reflecting surface of the scattering reflecting plate 201. Consequently, the light exit surface 103b of the light guiding plate 103 has the luminance distribution that fits to the pattern of the scattering dots 114 formed on said lower surface of the light guiding plate 103.

On the other hand, when voltage is applied to the scattering control board 107 by the above-mentioned voltage application circuit, the liquid crystal molecules in the scattering control board 107 are lined up. In this case, the light that enters the scattering control board 107 from the lower surface of the light guiding plate 103 passes straight through. Then, the light is reflected by said scattering reflecting plate 107 in a mode according the pattern of the scattering dots 201b formed on the reflecting surface of the scattering reflecting plate 201. Then, the light returns to the light guiding plate 103. As a result, the luminance distribution on the light exit surface 103b of the light guiding plate 103 is affected by both patterns of the scattering dots 114 formed on said lower surface of the light guiding plate 103 and the scattering dots 201b on the scattering reflecting plate 201. It has a multiplied characteristic of said both patterns.

As apparent from the above, according to this embodiment, the luminance distribution on the light exit surface 103b of the light guiding plate 103 can be changed between two patterns by changing the scattering and transmission of the incident light in the scattering control board 107. For example, when one of the two patterns may be associated with a highly uniform luminance distribution. This pattern may be used when the liquid crystal display 1 is used as a display monitor. When the other may be associated with a luminance distribution with a large difference in luminance between the peripheral portion and the central portion, this pattern may be used when the liquid crystal display 1 is used as a TV.

In addition, since the scattering control board 107 can be formed of the glass substrates between which the dispersed polymer liquid crystal is filled and sealed, further more, the driving circuit thereof may be configured with a simple circuit of changing ON and OFF of a predetermined voltage, the switching structure for the two luminance distributions can be achieved with significantly low costs.

EXAMPLE 3

As in the Example 1 in the Embodiment 1, the light guiding plate 103 used was of a 7-inch size with a thickness of approximately 10 mm. A cold cathode tube that is designed to provide approximately 100 W output was used as the light emitter 101. The scattering reflecting plate 201 used was the one having a significantly high area ratio of the scattering dots 201b at the central portion and a low one at the peripheral portion. By changing ON and OFF of the voltage to be applied to the scattering control board 107, the luminance distribution was measured on the light exit surface 103b of the light guiding plate 103. As a result, a uniform luminance distribution with a luminance of about 4000 to 5000 candelas was obtained over the entire surface of said light exit surface 103b when no voltage is applied. On the other hand, when electric fields were applied to the scattering control board 107, the luminance was 6000 to 6500 candelas at the center of the above-mentioned light exit surface 103b, while the luminance was about 3000 to 3500 candelas at the peripheral portion thereof. This means that the present case resulted in the luminance distribution with high luminance at the central portion and low luminance at the peripheral portion, affected by the fact that the area ratio of the scattering dots 201b is significantly high at the central portion of the scattering reflecting plate 201.

As apparent from the above, according to this example, it was revealed that a lighting device can be achieved with which two luminance distributions are obtained by changing the optical characteristics of the scattering control board 107.

In the above-mentioned configuration example, the dispersed polymer liquid crystal is used as an optical characteristic varying member for the scattering control board 107. However, it is not limited to the liquid crystal. Any material may be used as long as it can change the transmittance for light. When the liquid crystal is used, it is not limited to the dispersed polymer liquid crystal. Other types of liquid crystal may equally be used such as the twist nematic liquid crystal as described in the Embodiment 1.

Embodiment 3

Figure 4:
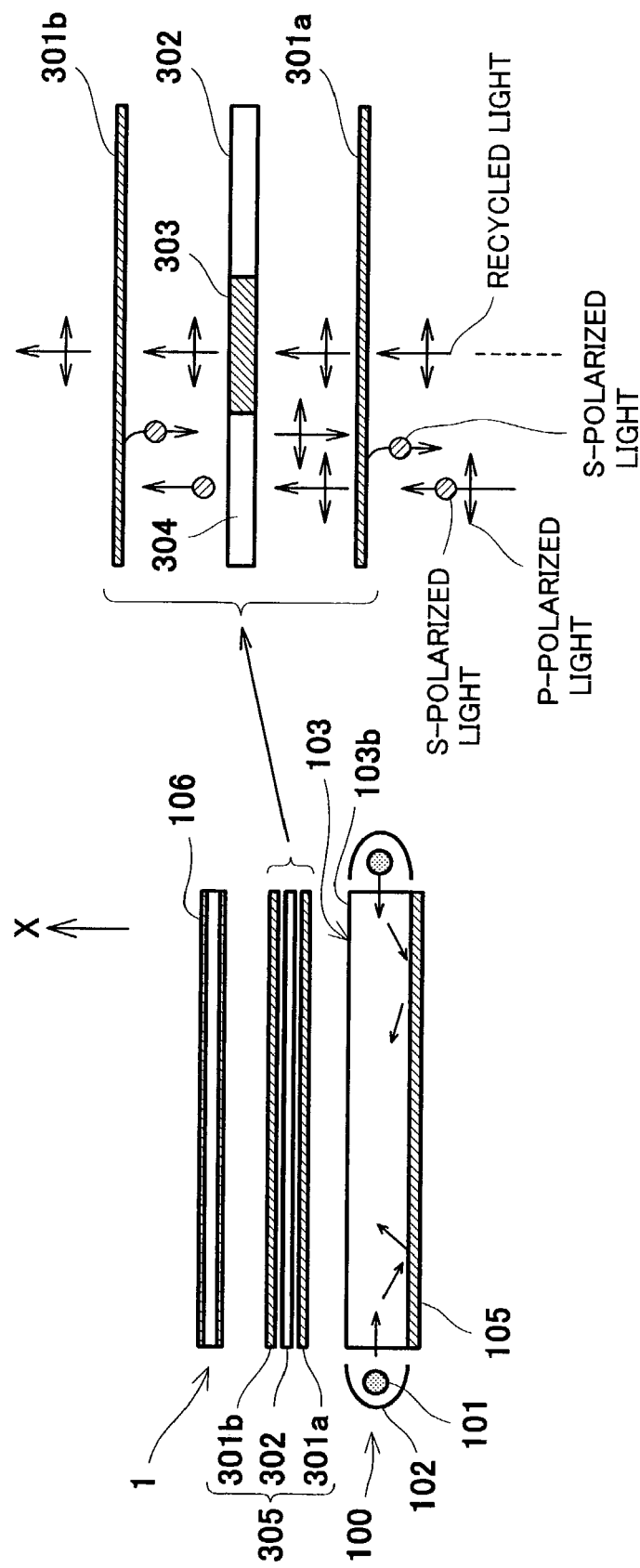
FIG. 4 is a cross-sectional view that schematically shows configurations of a lighting device and of an image display in which it is used, according to the Embodiment 3 of the present invention.

FIG. 4 is a cross-sectional view that schematically shows configurations of a lighting device and of an image display in which the device is used, according to the Embodiment 3 of the present invention. In FIG. 4, the same reference numeral depicts the same or equivalent part as or to those in FIG. 1.

As shown in FIG. 4, this embodiment is different from the Embodiment 1. A first reflective polarizer 301a, a polarization modulating element 302, and a second reflective polarizer 301b are arranged in this order above the light exit surface 103b of the light guiding plate 103. The first and second reflective polarizers 301a and 301b and the polarization modulating element 302 together form a light amount modulating structure 305. Scattering dots (not shown) are formed by printing on the lower surface of the light guiding plate 103. The reflecting plate 105 is disposed in contact with said lower surface. The dot pattern of the scattering dots is as shown in FIG. 1(b). Other components and parts are similar to those described in the Embodiment 1.

More specifically, the first and second reflective polarizers 301a and 301b are made of chiral liquid crystal with a characteristic of transmitting or reflecting the incident light along the polarization direction thereof, depending on a spiral pitch of said liquid crystal. Here, the first reflective polarizer 301a transmits only the p-polarized light and reflects the s-polarized light, that the p-polarized and s-polarized light leave the light guiding plate 103. The first and second reflective polarizers 301a and 301b are arranged with their polarizing axes aligned with each other.

The polarization modulating element 302 is configured with, for example, twist nematic liquid crystal in place of the dispersed polymer liquid crystal used in the dispersed liquid crystal element 104 in the Embodiment 1. A drive signal is supplied to the polarization modulating element 302 by the luminance setting circuit 32 and the operation switch 31 shown in FIG. 2 in order to apply voltage to a predetermined region. Here, as shown in an enlarged view of the light amount modulating structure in FIG. 4, such a drive signal is produced that allows for the application of voltage to a central portion 303 of the polarization modulating element 302 and does not allow for the application of voltage to the remaining portion, i.e., a peripheral portion 304.

In the backlight 100 having the above-mentioned configuration, the light that is reflected and scattered by the lower surface of the light guiding plate 103 and that leaves said light guiding plate 103 through the upper surface 103b thereof is modulated in amount of light by the light amount modulating structure 305. In other words, as shown in the enlarged view of the light amount modulating structure 305 in FIG. 4, the first reflective polarizer 301a transmits only the p-polarized beams of light leaving the light guiding plate 103 through the upper surface 103b thereof, otherwise, it reflects the s-polarized beams of light. Here, in the polarization modulating element 302, it is assumed that the above-mentioned drive signal is supplied, the voltage is applied to the central portion 303, and no voltage is applied to the peripheral portion 304. Then, some beams of the above-mentioned transmitted p-polarized light that enter the central portion 303 passe through it while keeping the polarization direction. They then pass through the second reflective polarizer 301b and enter the liquid crystal display panel 106. On the other hand, other beams of light that enter the peripheral portion 304 leave with their polarization direction twists approximately 90 degrees. Therefore, they are reflected by the second reflective polarizer 301b. The reflected beams of light again pass through the polarization modulating element 302, and the polarization direction of them again twists 90 degrees. They then pass through the first reflective polarizer 301a and return to the light guiding plate 103. The returned beams of light are subjected to the scattering reflection in the light guiding plate 103. The polarization direction thereof is modulated. They leave the light guiding plate 103 through the upper surface 103b thereof as recycled light shown in FIG. 4.

When the recycled light passes through the first reflective polarizer 301a and enters the portion 303 of the polarization modulating element 302 where the voltage is applied, as shown in, for example, FIG. 4, it passes through the polarization modulating element 302 and the second reflective polarizer 301b in this order and enters the liquid crystal display panel 106. This means that the light amount modulating structure 305 allows the light leaving the light guiding plate 103 through the upper surface 103b thereof to have such a light intensity distribution that the amount of light at the central portion is large thereof and the amount of light at the peripheral portion is small thereof. Consequently, the backlight 100 has a luminance distribution with high luminance at the central portion thereof and low luminance at the peripheral portion thereof. In addition, the light leaving the light guiding plate 103 can be directed to the liquid crystal display panel 106 without almost any loss of the amount of light, with their polarization directions aligned with each other. Furthermore, since the polarization directions of the light entering the liquid crystal display panel 106 are aligned with each other, a polarizer that is placed on the incident side of a conventional liquid crystal display panel 106 may be eliminated.

When such a drive signal is applied to the polarization modulating element 302 that indicates application of the voltage over the entire region of it, the light leaving the light guiding plate 103 passes through a polarization modulating element 302 and enters the liquid crystal display panel 106. Accordingly, the luminance distribution of the backlight 100 is made to be fitted into the scattering dots printed on the lower surface of the light guiding plate 103. Then a generally uniform luminance distribution is achieved over the entire surface of it. Thus, by changing the drive signal supplied to the polarization modulating element 302, two different luminance distributions can be obtained, as in the Embodiment 1.

EXAMPLE 4

In this example, as in the Example 1 in the Embodiment 1, the light guiding plate 103 used was of a rectangular shape of 7 inches in size with a thickness of approximately 10 mm. A cold cathode tube that is designed to provide approximately 100 W output was used as the light emitter 101. The voltage is applied to the central portion of the polarization modulating element 302 and no voltage is applied to the peripheral portion. The luminance distribution was measured on the light exit surface of the second reflective polarizer 301b. It was about 6000 candelas at the central portion and was about 3000 candelas at the peripheral portion. When the total amount of light was compared with that of the case where no light amount modulating structure 305 is provided, similar results were obtained. This indicated that the presence of the light amount modulating structure 305 hardly causes the loss of amount of light.

As apparent from the above, according to this embodiment, the light amount modulating structure 305 is provided and the voltage is applied to the central portion of the polarization modulating element 302. By this, the luminance distribution with high luminance at the central portion and low luminance at the peripheral portion can be obtained almost without any loss of amount of light.

In the above-mentioned configuration example, the twist nematic liquid crystal as the liquid crystal for the polarization modulating element 302. Instead of this, the ferroelectric liquid crystal or the anti-ferroelectric liquid crystal may also be used. The polarization modulator for the polarization modulating element 302 is not limited to the liquid crystal. Other materials and configurations capable of modulating polarization may also be used instead of the liquid crystal.

Embodiment 4

The above-mentioned Embodiments 1 to 3 is configured to illuminate the liquid crystal display panel from the back of it. However, the configurations described in conjunction with the Embodiments 1 to 3 may be applied to a front light-type liquid crystal display using a reflective liquid crystal display panel to achieve the effects of them. The Embodiment 4 of the present invention has such a configuration to achieve similar effects to those obtained in the Embodiments 1 to 3.

In this embodiment, a reflective liquid crystal display panel of a size of about 5 inches was used. In this liquid crystal display panel, a reflecting plate is placed on the back of (beneath) a liquid crystal element. A light amount modulating structure that is made up of a reflective polarizer and a polarization modulating element as described in the Embodiment 3 is placed between the liquid crystal element and the reflecting plate. A light source is placed on the edge of the front surface (upper surface) of the above-mentioned liquid crystal display panel. As a result, on the display screen of the liquid crystal display panel, two different luminance distributions were obtained: a uniform luminance distribution with the luminance at the peripheral portion being more than 80% of the luminance at the central portion, and a luminance distribution with a large difference between the central portion and peripheral portion with the luminance at the peripheral portion being lowered to about 50% of the luminance at the central portion. Thus, it was revealed that the configuration where the luminance distribution is varied arbitrarily according to the present invention can be applied to the front light-type.

Embodiment 5

Figure 5:
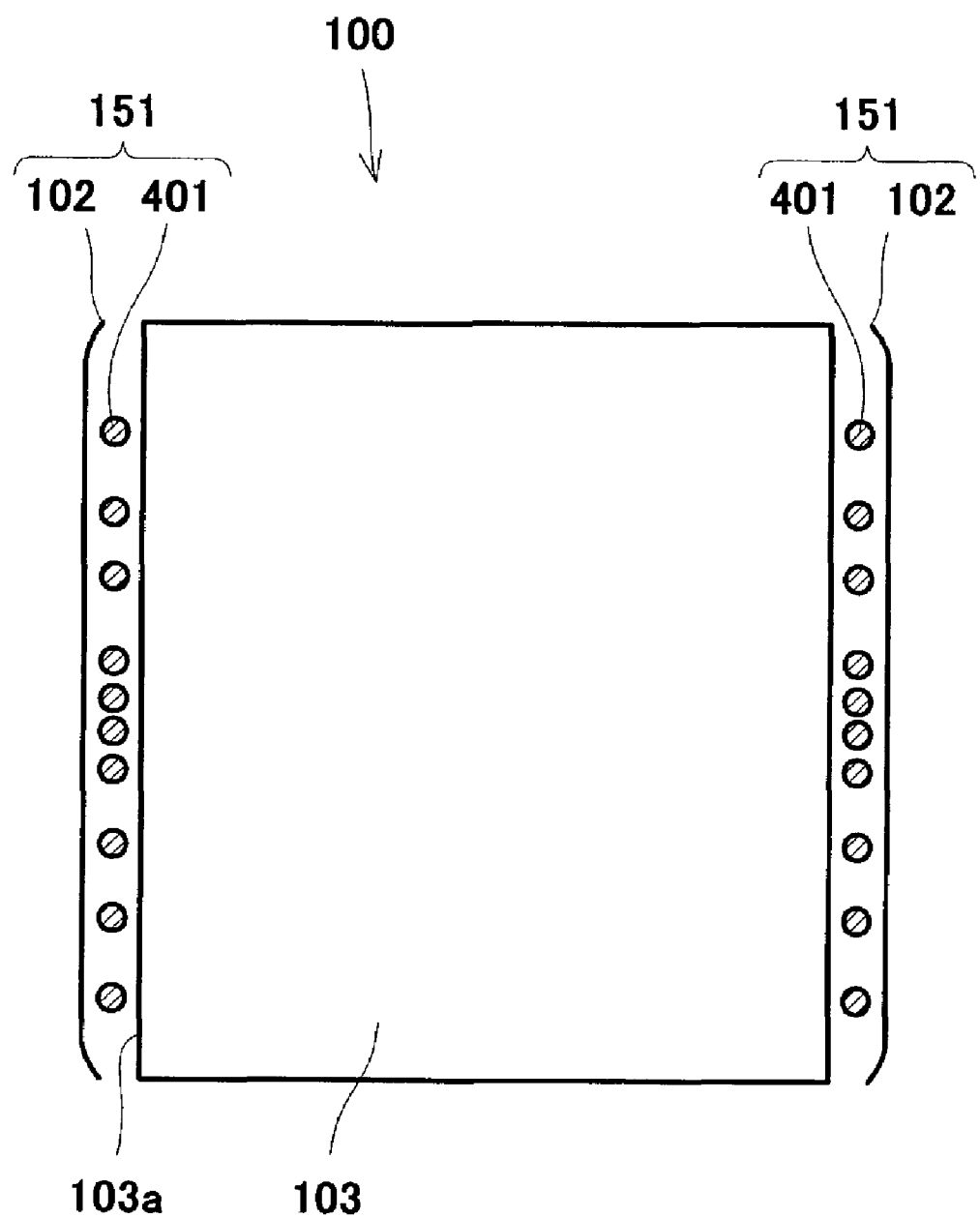
FIG. 5 is a plan view that schematically shows a configuration of a lighting device according to the Embodiment 5 of the present invention.

FIG. 5 is a plan view that schematically shows a configuration of a lighting device according to the Embodiment 5 of the present invention. In FIG. 5, the same reference numeral depicts the same or equivalent part as or to those in FIG. 1.

As shown in FIG. 5, this embodiment uses a plurality of LEDs 401 as the light emitter in place of the cold cathode tubes. Other components and parts are similar to those in the embodiment.

More specifically, when the cold cathode tubes are used as the light emitter, the luminance is generally uniform over the entire length of the incident surface 103a at the edge of the light guiding plate 103. When a plurality of LEDs 401 are used as the light emitter, the luminance over the entire light emitter may be varied by means of changing the density of the LEDs 401 in the longitudinal direction of the above-mentioned incident surface 103a. Thus, in this embodiment, for example, the LEDs 401 are arranged in such a manner that the central portion has a higher density and both sides have a lower density, along the longitudinal direction of the above-mentioned incident surface 103a. Thereby the luminance of the entire light emitter made up of the plurality of LEDs 401 is high at the central portion and is low on both sides, along the longitudinal direction of said incident surface 103a.

With this configuration, the amount of incident light increases at the central portion of the incident surface 103a of the light guiding plate 103, and the amount of incident light decreases on both sides of it. Consequently, the luminance increases at the central portion of the light exit surface of the light guiding plate 103, while the luminance decreases at the peripheral portion of it. Thus, a configuration and operation for changing the luminance of the light emitter itself in the longitudinal direction of incident surface 103a of the light guiding plate 103 is added to the configuration of the Embodiment 1. Thereby the luminance distribution patterns on the light exit surface of the backlight 100 may be determined with an increased degree of freedom.

EXAMPLE 5

In this example, ten white LEDs 401 for each side were used as the light emitter in place of the cold cathode tubes. The white LEDs 401 were used to have a uniform density and a variable density, along the longitudinal direction of the incident surface 103a of the light guiding plate 103, in association with the Examples 1 and 2, respectively, of the Embodiment 1. The luminance distribution of the backlight 100 was then measured. When the white LEDs 401 were arranged with a uniform density, the luminance was about 2000 candelas over the entire surface of them. When the white LEDs 401 were arranged with a variable density, the luminance was 5000 candelas at the central portion and the luminance was about 1000 candelas at the peripheral portion.

This revealed that, by using a plurality of LEDs as the light emitter and varying the density of the LEDs along the longitudinal direction of the incident surface 103a of the light guiding plate 103, the luminance distribution with a larger difference of luminance may be used.

Embodiment 6

The Embodiment 6 of the present invention is a case where an image display is configured using one of the lighting devices described in the Embodiments 1 to 5.

First, description is made in conjunction with a case where the lighting device of the Embodiment 1 is used.

As shown in FIGS. 1 and 2, the liquid crystal display 1 as an image display according to this embodiment comprises the backlight 100 placed beneath the liquid crystal display panel 106. The liquid crystal display panel 106 used here is of a well-known TFT (Thin Film Transistor) type. It includes an opposing substrate 111 having a common electrode (not shown) formed on the inner surface thereof, and a TFT substrate 112 having pixel electrodes, gate lines, source lines and switching devices, which are not shown, formed on the inner surface thereof. These substrates are opposed to each other, sandwiching a liquid crystal 113. Polarizers (not shown) are attached on both sides of the opposing substrate 111 and the TFT substrate 112, which are opposed to each other. The TFT substrate 112 includes the gate lines and the source lines that are arranged into a matrix. In the TFT substrate 112, the pixel electrodes and the switching devices are formed in each pixel defined by the gate lines and the source lines. The source lines and the gate lines of the liquid crystal display panel 106 are driven by a source driver and a gate driver, respectively. The source driver and the gate driver are controlled by a controller. A combination of the source driver, the gate driver, and the controller is collectively referred to as a driving circuit 36 hereinafter.

In the liquid crystal display panel display 1 having the above-mentioned configuration, in the driving circuit 36, the controller supplies control signals to the gate driver and the source driver in response to a video signal 25 that is received from the outside. Then, the gate driver supplies a gate signal to the gate lines to successively activate the switching devices in the pixels. The source driver, on the other hand, successively supplies source signals including video signals to pixel electrodes in the pixels via the source lines, in synchronism with the gate signal. This modulates the liquid crystal and changes the transmittance for the light that comes out of the backlight 100. A video image corresponding to the video signal 25 appears on the eye of an observer who is watching at the liquid crystal display 1. The gate signal and the source signal are collectively referred to as a drive signal 37 hereinafter.

In this event, the luminance distribution on the display screen of the liquid crystal display panel 106 is made to be fitted into the luminance distribution of the backlight 100. Accordingly, by changing the luminance distribution of the backlight 100 according to specific applications of the liquid crystal display 1, as described in conjunction with the Embodiment 1, it is possible to achieve the luminance distribution on the display screen suitable for a particular application. In addition, the use of a desired dot pattern for the second luminance distribution setting circuit 32 results in production of an image corresponding to the video signal 25 supplied to the liquid crystal display panel 106, on a display screen with a desirable luminance distribution.

As depicted by the dotted line in FIG. 2, a video composition circuit 901 may be provided and a plurality of video signals 25 may be supplied to said video composition circuit 901. They may be synthesized to display a plurality of video images that are associated with the video signals 25, on a single screen in a multi-screen mode. The synthesized video signal may be supplied to the driving circuit 36. This configuration allows for the display in the multi-screen mode. In addition, by appropriately determining the dot pattern for the luminance distribution setting circuit 32, the luminance distribution on the display screen can be determined as a preferable luminance distribution for each region forming the display screen in the multi-screen mode.

Next, an example where the lighting devices of the Embodiments 2 to 5 are used is described.

In these cases, the backlight 100 in FIG. 3 (Embodiment 2), the backlight 100 in FIG. 4 (Embodiment 3), a front light (Embodiment 4), or the backlight 100 in FIG. 5 (Embodiment 5) is used in place of the backlight 100 of the Embodiment 1 in the above-mentioned configuration to provide a liquid crystal display as an image display. In either liquid crystal display, by varying the luminance distribution of the lighting device according to specific applications of the liquid crystal display, the luminance distribution that is best suited to the particular application can be obtained on the display screen, as in the above-mentioned configuration.

EXAMPLE 6

In this example, a cold cathode tube that is designed to provide approximately 100 W output was used as the light emitter, as in the Examples 1 and 2 in the Embodiment 1. The liquid crystal display panel used had a size of about 10 inches. The luminance distribution was measured via the liquid crystal display panel 106. As a result, the luminance was about 200 candelas over the entire region of the display screen with the setting to provide a more uniform luminance for the display monitor use.

On the other hand, the luminance at the central portion was about 300 candelas and the luminance at the peripheral portion was about 150 candelas with the setting to provide a large difference in luminance between the central portion and the peripheral portion for the TV use. The total amount of light was generally identical for either setting of the luminance distribution. The total power consumption of the light emitter was generally equal for either setting of the luminance distribution. Images was observed with a large difference in luminance between the central portion and the peripheral portion. As a result, the screen seemed brighter than with a uniform luminance distribution for TV motion pictures. This confirmed the effectiveness of the setting with a bright central portion of the display screen.

With a large difference in luminance between the central portion and the peripheral portion, the power consumption of the light emitter can be reduced by setting the central luminance as same as the case of the uniform luminance distribution.

As apparent from the above, according to this embodiment, it was revealed that the image display can be configured using the lighting device of the present invention and the luminance distribution can be determined arbitrarily according to specific applications.

Embodiment 7

Figure 6:
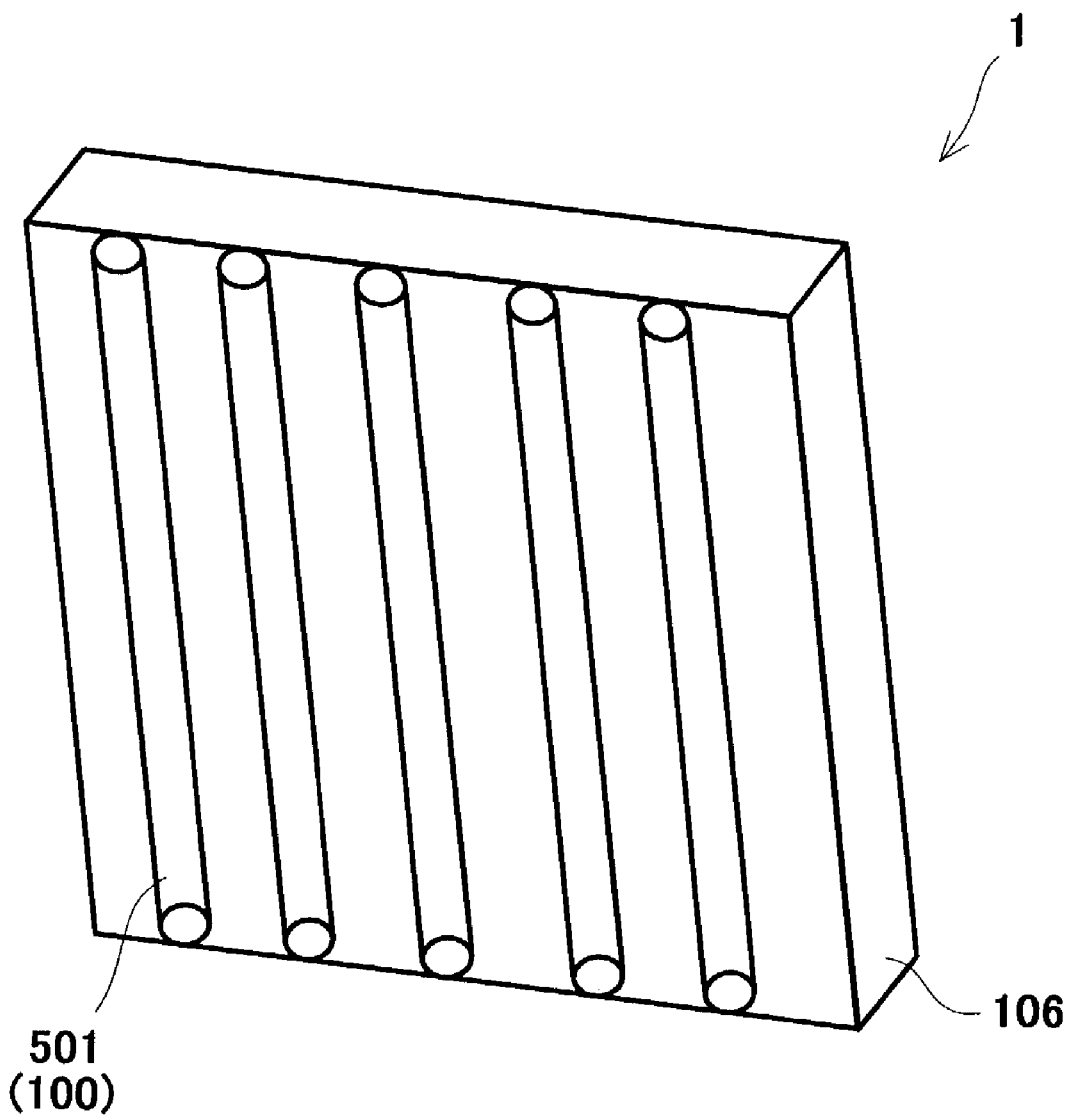
FIG. 6 is a perspective view that schematically shows configurations of a lighting device and of an image display, according to the Embodiment 7 of the present invention.

FIG. 6 is a perspective view that schematically shows configurations of a lighting device and of an image display, according to the Embodiment 7 of the present invention. In FIG. 6, the same reference numeral depicts the same or equivalent part as or to those in FIG. 1.

As shown in FIG. 6, this embodiment employs a so-called array-type backlight configuration. A plurality of light emitters 501 are placed, as the backlight 100 which directly illuminate the liquid crystal display panel 106, on the back (beneath) of said liquid crystal display panel 106. A reflector (not shown) is placed on the back of the plurality of light emitters 501 while surrounding them. Thus, the plurality of light emitters 501 and the reflector form a light source. The back surface of the liquid crystal display panel 106 forms the light exit surface of said light source. A scattering film or others may be placed between the light emitter 501 and the liquid crystal display panel 106 in order to provide uniform luminance. In this embodiment, the light emitter 501 is comprised of a cold cathode tube. The plurality of said cold cathode tubes 501 are arranged on the back surface (lower surface) of the liquid crystal display panel 106 at a fixed pitch in parallel to a predetermined side. As in the Embodiment 1, the luminance distribution setting circuit 32 and the operation switch 31 as shown in FIG. 2 are provided. The luminance distribution setting circuit 32 in this embodiment is allowed to set previously output patterns for a plurality of the cold cathode tubes 501. When an output pattern is selected by the operation switch 31, the voltage that makes the outputs of the plurality of cold cathode tubes 501 to be fitted to the selected output pattern is supplied to each cold cathode tube 501 as the drive signal 35. Here, as in the Embodiment 1, a uniform luminance distribution, and a luminance distribution with a large difference in luminance between the peripheral portion and the central portion on the display screen are set to the luminance distribution setting circuit 32. With this, selection of the uniform luminance distribution results in the same outputs (luminance) for all of the plurality of cold cathode tubes 501. On the other hand, selection of the luminance distribution with a large difference in luminance between the peripheral portion and the central portion on the display screen causes the plurality of cold cathode tubes 501 to produce outputs that are larger near the center and are smaller near the periphery.

EXAMPLE 7

In this example, a cold cathode tube that is designed to provide approximately 100 W output as in the Embodiment 1 was used as the cold cathode tube 501. In addition, a liquid crystal panel having a size of about 10 inches was used as the liquid crystal display panel 106. Measurement was made for the luminance on the display screen of the liquid crystal display panel 106. The luminance was about 200 candelas over the entire region of the display screen when the uniform luminance distribution was selected. On the other hand, the luminance at the central portion was about 300 candelas and the luminance at the peripheral portion was about 150 candelas when the luminance distribution with a large difference in luminance between the peripheral portion and the central portion of the display screen is selected. In this event, the total power consumption of the entire cold cathode tubes 501 was generally identical with that of the case when uniform luminance distribution was selected. Images was observed in this state. As a result, the screen seemed brighter than with a uniform luminance distribution for TV motion pictures. It is expected that the apparent brightness was improved as a result of setting the luminance distribution to make the center brighter.

The power consumption of the cold cathode tubes 501 can be reduced if the luminance at the center of the display screen is set to be as same as the luminance for the uniform luminance distribution.

As apparent from the above, according to this embodiment, in the array-type backlight configuration, the light emitters are varied in luminance depending on the location thereof. This makes it possible to set arbitrarily the luminance distribution on the display screen.

As another configuration example of this embodiment, the light amount modulating structure 305 of the Embodiment 3 may be placed between said cold cathode tubes 501 and the liquid crystal display panel 106, without changing the outputs of the cold cathode tubes 501.

Embodiment 8

Figure 7:
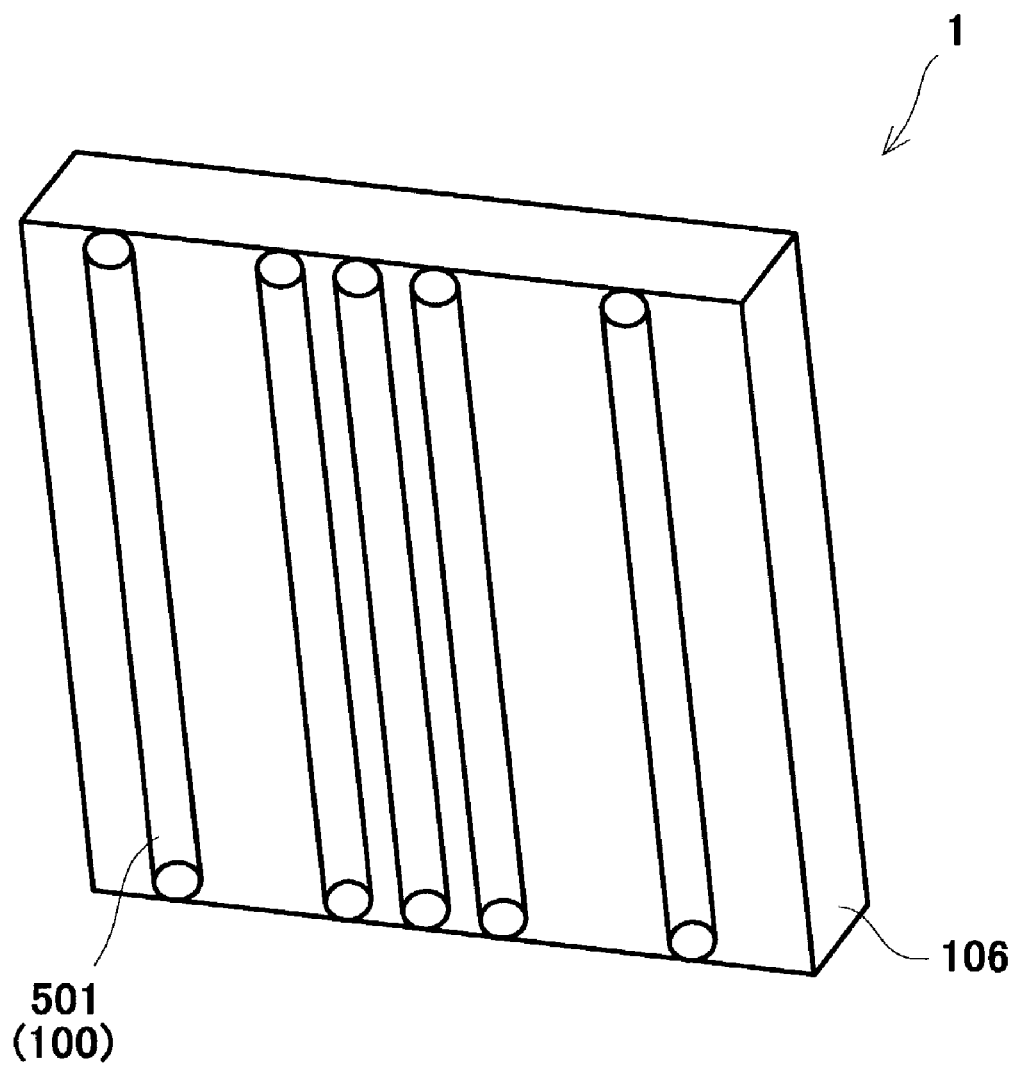
FIG. 7 is a perspective view that schematically shows configurations of a lighting device and of an image display, according to the Embodiment 8 of the present invention.

FIG. 7 is a perspective view that schematically shows configurations of a lighting device and of an image display, according to the Embodiment 8 of the present invention. In FIG. 7, the same reference numeral depicts the same or equivalent part as or to those in FIG. 6.

As shown in FIG. 7, in this embodiment, a plurality of cold cathode tubes 501 are arranged in such a manner that the central portion has a higher density and both sides (peripheral portions) have a lower density along the direction of the alignment. All cold cathode tubes 501 are configured to produce a fixed output. Other components and parts are similar to those described in the Embodiment 7.

With this configuration, in the display screen of the liquid crystal display panel 106, the optical output of the central portion where the cold cathode tubes 501 are arranged densely becomes relatively large, and the luminance becomes high. Conversely, the optical output of the peripheral portion where the cold cathode tubes 501 are arranged sparsely becomes relatively small, and the luminance will become low. That is, it becomes possible to provide the distribution of the luminance of the liquid crystal display by distributing the configuration density of the cold cathode tubes 501.

The luminance was actually measured by using similar cold cathode tubes and a liquid crystal display panel to those used in the Embodiment 7. As a result, generally same results were obtained as the Embodiment 7. Therefore, in the configuration shown in FIG. 7, it was revealed that it is possible to use arbitrary luminance distributions.

In addition, in the configuration of this embodiment, it goes without saying that the output of the light emitter may be changed according to the configuration position as in the Embodiment 7.

Embodiment 9

Figure 8:
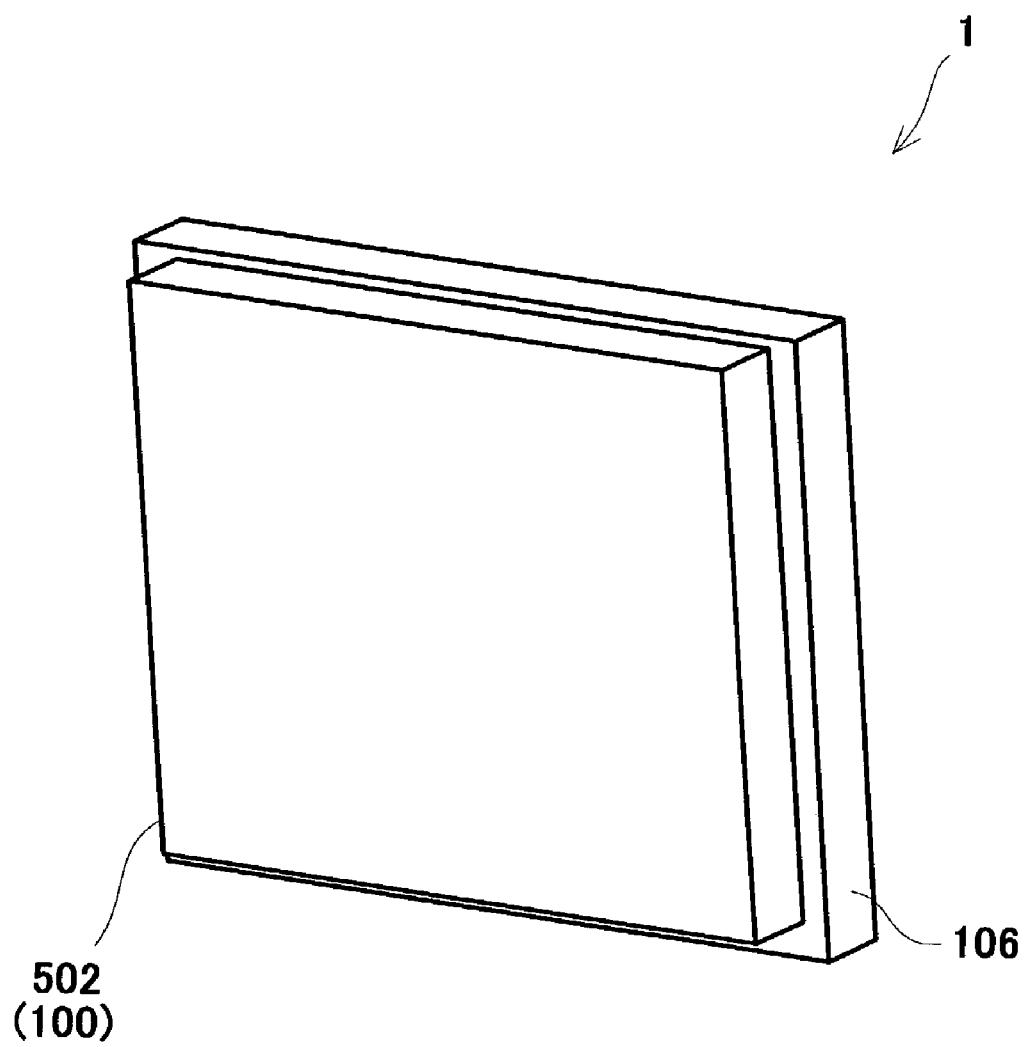
FIG. 8 is a perspective view that schematically shows configurations of a lighting device and of an image display, according to the Embodiment 9 of the present invention.

FIG. 8 is a perspective view that schematically shows configurations of a lighting device and of an image display, according to the Embodiment 9 of the present invention. In FIG. 8, the same reference numeral depicts the same or equivalent part as or to those in FIG. 6.

As shown in FIG. 8, in this embodiment, a planar light source 502 is placed behind the liquid crystal display panel 106 as the array-type backlight 100. As in the Embodiment 6, the luminance distribution setting circuit 32 and the operation switch 31 are provided as shown in FIG. 2. The luminance distribution setting circuit 32 is adapted to predetermine the luminance pattern of the planar light source 501 and is configured to produce, as a drive signal 35, the control signal to the planar light source 501 when the luminance pattern is selected by the operation switch 31. With this signal, the luminance distribution of a planar light source 501 is made to be fitted to the selected luminance pattern,. Here, as in the Embodiment 6, the uniform luminance distribution and the luminance distribution with a large difference in luminance between the peripheral portion and the central portion of the display screen are set to the luminance distribution setting circuit 32. When the uniform luminance distribution is selected, the luminance distribution of the planar light source 501 becomes uniform, and when the luminance distribution with a large difference in luminance between the peripheral portion and the central portion of the display screen is selected, the luminance distribution of the planar light source 501 has high luminance at the central portion and low luminance at the peripheral portion.

Embodiment 10

The Embodiment 10 of the present invention illustrates an image display which controls the luminance distribution of the lighting device according to the screen of the video signals that are supplied from the outside.

Figure 9:
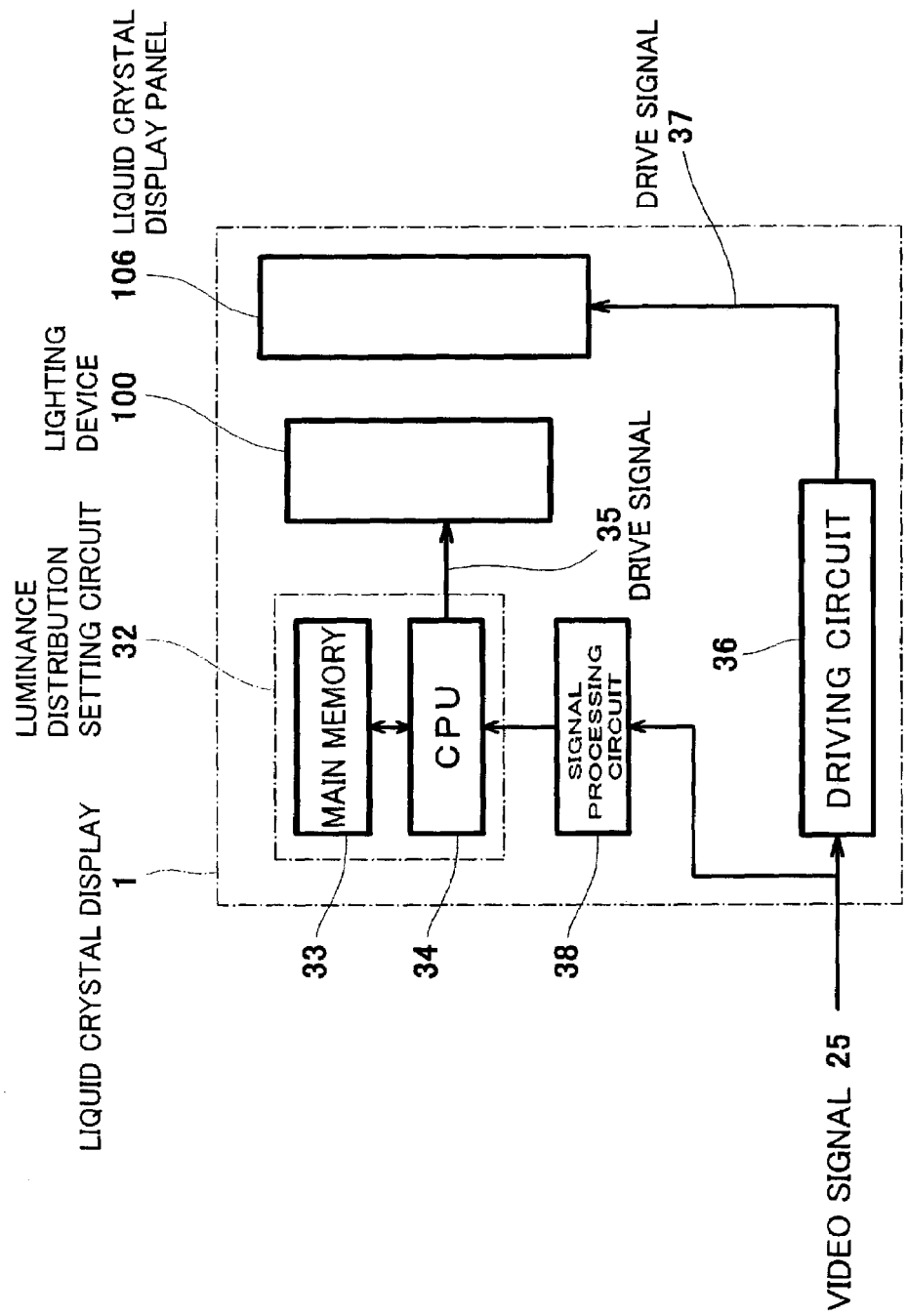
FIG. 9 is a block diagram showing a configuration of a control system used in the image display according to the Embodiment 10 of the present invention.

FIG. 9 is a block diagram showing a configuration of a control system used in the image display according to this embodiment. In FIG. 9, the same reference numeral depicts the same or equivalent part as or to those in FIG. 2.

As shown in FIG. 9, the liquid crystal display 1 which serves as the image display according to this embodiment is different from the Embodiment 1. It comprises a signal processing circuit 38 which determines the brightness of the screen (panel) based on the video signal 25 that is supplied to the driving circuit 36 which drives the liquid crystal display panel 106, and the luminance distribution setting circuit 32 which supplies the drive signal 35 to the lighting device 100 according to the determined brightness of the screen, and controls the luminance distribution of it. Moreover, the lighting device 100 of the Embodiments 1 to 5 and 7 to 9 may be used as a lighting device 100. Other components and parts are similar to those in the Embodiment 1.

In the liquid crystal display 1 configured as mentioned above, in response to the reception of the video signal 25, the signal processing circuit 38 calculates the histogram of the luminance of the pixel in every screen of the video signal 25, and determines from the distribution whether the image is the bright scene (screen) or it is the dark scene, and produces the determination result to the luminance distribution setting circuit 32. The luminance distribution setting circuit 32 operates as follows in response to this determination result. That is, for example in the luminance distribution setting circuit 32, the luminance distribution for usual TVs and the luminance distribution with higher luminance at the central portion are stored on the main memory 33. When a determination result indicating that it is the bright scene is received, the luminance distribution setting circuit 32 selects the luminance distribution with higher luminance at the central portion and produces the drive signal 35 according to it, thereby controls the lighting device 100 to have such a luminance distribution. Accordingly, the display screen of the liquid crystal display panel 106 is made to have the luminance distribution with higher luminance at the central portion. On the other hand, when the determination result indicating that it is the dark scene is received, the drive signal 35 with which the lighting device 100 is made to be the usual luminance distribution is produced to control it. Accordingly, the display screen of the liquid crystal display panel 106 is made to have the luminance distribution for usual TVs.

EXAMPLE 8

When display was actually made using the liquid crystal display configured as mentioned above, it seemed brighter by the effect which raises the luminance at the center of the screen of a movie film on which a person is displayed at the center.

Thus, according to this embodiment, it becomes possible to use the optimal setup according to the scene to be displayed, by controlling the luminance distribution of the lighting device according to the image to be displayed. Consequently, it was revealed that the visibility may be improved.

Embodiment 11

In the liquid crystal display 1 in FIG. 9, the Embodiment 11 of the present invention is configured so that the signal processing circuit 38 and the luminance distribution setting circuit 32 may perform the following operation, and the lighting device 100 comprises the backlights 100 of the Embodiment 1.

Namely, the signal processing circuit 38 divides the screen of the video signal 25 received into a plurality of blocks, and determines the histogram of the luminance of the pixel in each block. Then, the luminance of each block is obtained from the determined histogram to give the panoramic luminance distribution of the screen. Although the histogram of the luminance of the pixel is given in every screen here, it may be obtained over a plurality of successive screens. In this case, the panoramic luminance distribution is a combination result of the plurality of the screens. The block at which the luminance reaches the peak, i.e., the position on the screen where the peak of the luminance exists, is detected from the panoramic luminance distribution, and this is supplied to the luminance distribution setting circuit 32. In response to this output, the luminance distribution setting circuit 32 supplies, to the lighting device 100, a drive signal to make the luminance at near the position corresponding to the detected peak high in the luminance distribution of the light exit surface. Referring also to FIGS. 1 and 2, the lighting device 100 comprises the backlights 100 of the Embodiment 1. Therefore the dot pattern of the dispersed liquid crystal element 104 may be varied to have an arbitrary pattern in time according to the drive signal. When the drive signal 35 is received, the dot pattern of the dispersed liquid crystal element 104 varies according to the drive signal 35. The luminance distribution of the liquid crystal display 1 is made to be fitted to the drive signal 35. Consequently, the luminance distribution of the liquid crystal display 1 exhibits higher luminance near the peak position of the luminance in the screen of the video signal.

EXAMPLE 9

When video images were actually displayed using the liquid crystal display 1 configured as mentioned above, in the screen on which a person's face is displayed, the position where the person's face moves is always displayed brightly. In the screen on which a person is displayed, people tend to gaze at the person's face. In addition, the portion corresponding to this area at which people gazes was always displayed brightly in this example. Consequently, it has been recognized as a very bright image.

As apparent from the above, in this embodiment, the luminance distribution of the lighting device is controlled in association with the luminance distribution on the screen of the video signal. As a result, it was revealed that the outstanding display effect is obtained in, for example, the feeling of brightness for the observer of the liquid crystal display.

Embodiment 12

The Embodiment 12 of the present invention describes about a configuration example of a lighting device with which the amount of light penetrating through the light guiding plate can be reduced.

Figure 10:
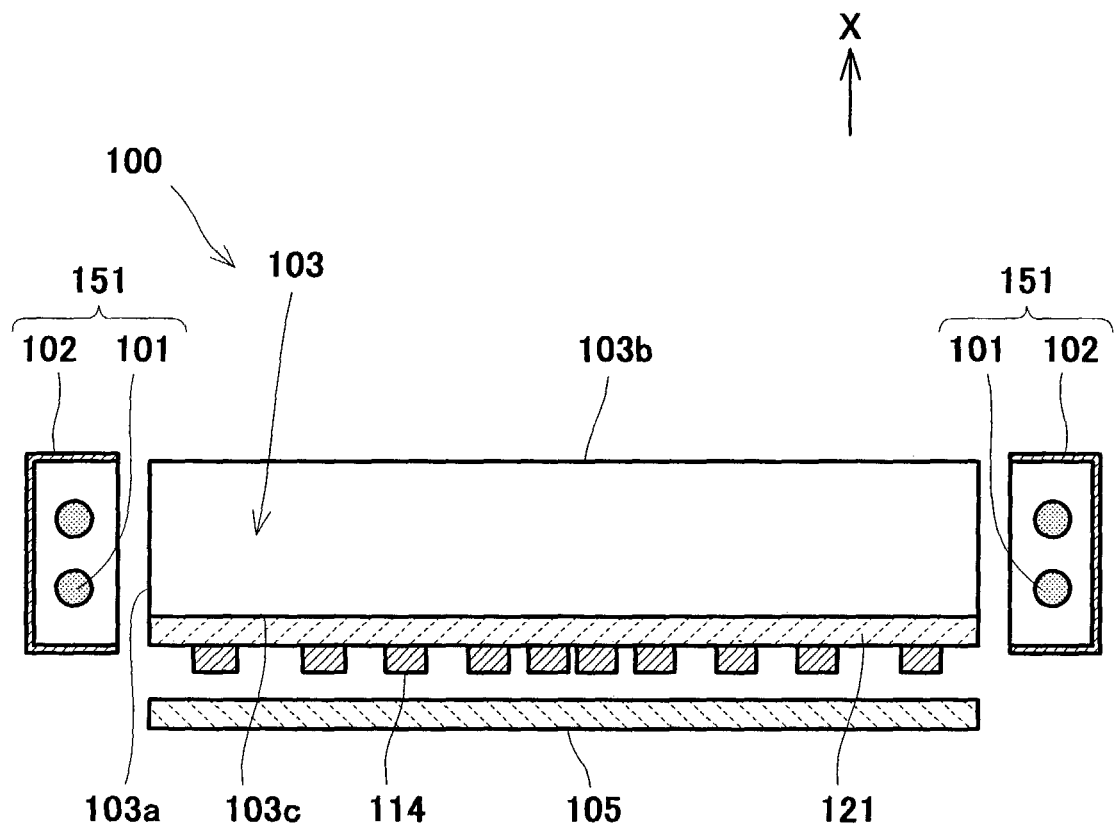
FIG. 10 is a cross-sectional view that schematically shows a configuration of a lighting device according to the Embodiment 12 of the present invention.

FIG. 10 is a cross-sectional view that schematically shows a configuration of a lighting device according to this embodiment. In FIG. 10, the same reference numeral depicts the same or equivalent part as or to those in FIG. 1.

As shown in FIG. 10, in this embodiment, a constant scattering layer (hereinafter, referred to as a "semi-transmissive layer") 121 that transmits the incident light while scattering it at a predetermined rate is formed on the lower surface 103a of the light guiding plate 103. Scattering dots (distribution and scattering structure) 114 are formed on the lower surface of said semi-transmissive layer 121 in a predetermined pattern. The reflecting plate 105 is placed beneath the semi-transmissive layer 121. The semi-transmissive layer 121 has a generally constant transmittance over the entire region. Moreover, the light emitter 101 comprises the cold cathode tubes here, which are arranged so that two tubes are located in a line along the thickness of the light guiding plate 103. Other components and parts are similar to those described in the Embodiment 1.

More specifically, the light guiding plate 103 is formed of, for example, a synthetic resin such as the acrylics.

In the semi-transmissive layer 121, $SiO_2$ fine particles are dispersed in the synthetic resin for example. The synthetic resin of the semi-transmissive layer 121 is required to be different in refractive index from the $SiO_2$ and to be generally identical in refractive index with the material of the light guiding plate 103. In order for the $SiO_2$ fine particles to demonstrate their scattering function in the semi-transmissive layer 121, the refractive index of $SiO_2$ fine particles is required to be different from the refractive index of the synthetic resin of said semi-transmissive layer 121. In order to avoid reflection at the interface between the light guiding plate 13 and the semi-transmissive layer 121, the refractive index of the synthetic resin of the semi-transmissive layer 121 is required to be generally identical to the refractive index of the light guiding plate 103. The semi-transmissive layer 121 is formed by printing the ink which is obtained by mixing the $SiO_2$ fine particles in the synthetic resin on the lower surface 103c of the light guiding plate 103. Moreover, the transmittance of the semi-transmissive layer 121 is adjusted by controlling the thickness of it.

The scattering dots 114 are similar to those of prior arts, and may be formed by, for example, printing a resin containing a pigment, glass, etc. The pattern of the scattering dots 114 is formed in such a manner that, for example, the light leaving the light guiding plate 103 through the upper surface 103b has uniform intensity distribution. The pattern of the scattering dots 114 is formed on the lower surface of the semi-transmissive layer 121 so that the said scattering dots 114 are dense at the central portion and are sparser towards the periphery.

Next, operations of the lighting device having the above-mentioned configuration are described. The light that comes out of the light source 151 enters the light guiding plate 103. The beams of incident light propagate through the light guiding plate 103. When they enter the semi-transmissive layer 121 in this case, some of them are scattered by the $SiO_2$ fine particles and the others penetrate this, according to the transmittance. Of the transmitted beams of light, those entered the scattering dots 114 are scattered by them. The remainders undergo the total reflection at the lower surface (interface with the air) of the semi-transmissive layer 121 and return to the light guiding plate 103. Exactly, some beams of light passing through the semi-transmissive layer 121 do not undergo the total reflection at the lower surface of said semi-transmissive layer 121. They are reflected by the reflecting plate 107 and returned to the light guiding plate 103.

The light scattered by either the semi-transmissive layer 121 and the scattering dots 114 leaves the light guiding plate 103 through the upper surface 103b of it. The beams of light that are not scattered by both the semi-transmissive layer 121 and the scattering dots 114 propagate with a series of total reflection between the upper surface 103b of the light guiding plate 103 and the lower surface of the semi-transmissive layer 121. Some of them reach the opposite light source 151 without being scattered. Taking a particular note to the beams of light that come out of the light source 151 on one side, since more beams of light are scattered by the semi-transmissive layer 121 and the scattering dots 114 as compared with the case where there is no semi-transmissive layer 121, the beams of light which go out of the light exit surface 103b of the light guiding plate increase, while the beams of light which reach even the opposite light source 151 decrease. Therefore, the optical loss near the opposite light source 151 decreases, and the light utilization efficiency becomes high. Consequently, the lighting device with the light exit surface having high luminance can be obtained. Moreover, since the semi-transmissive layer 121 can be formed at once by printing etc., a configuration that improves the light utilization efficiency can be obtained at low costs using a simple method.

Moreover, since the semi-transmissive layer 121 is formed over the entire lower surface 103c of the light guiding plate 103, and the amount of light that enters the scattering dots 114 decreases at any place in this lower surface 103c, loss of light can be reduced further.

In addition, the light that propagates through the light guiding plate 103 is scattered by the scattering dots 114 at a higher percentage as it becomes closer to the central portion, while conversely, a lower percentage of light is subjected to the total reflection between the upper surface 103b of the light guiding plate 103 and the lower surface of the semi-transmissive layer 121. The intensity distribution of the light leaving said light guiding plate 103 through the upper surface 103b of it, i.e., the luminance distribution on said upper surface 103b is corrected.

Next, the relation between the amount of light which penetrates through the light guiding plate (hereinafter, referred to the "amount of light penetrating through the light guiding plate") and the transmittance of the semi-transmissive layer 121 is described.

Figure 11:
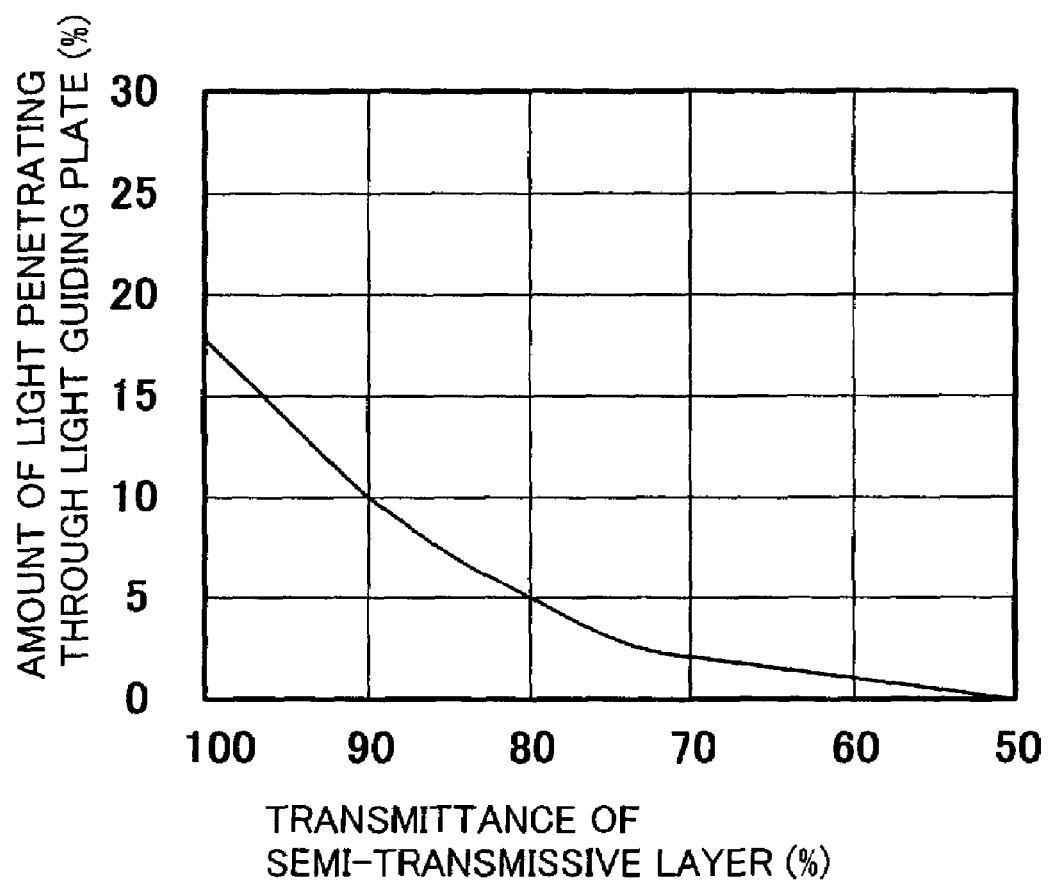
FIG. 11 is a graphical representation of change in amount of light penetrating through the light guiding plate as a function of the transmittance of a semi-transmissive layer shown in FIG. 10.

FIG. 11 is a graphical representation of change in amount of light penetrating through the light guiding plate as the transmittance of a semi-transmissive layer. The graph shown in FIG. 11 was obtained from the simulation by the present inventor to calculate the amount of light penetrating through in changing the transmittance of the semi-transmissive layer. During this simulation, the amount of light penetrating through the light guiding plate is the amount of light that is leaked (lost) to the outside through the end face 103a of the light guiding plate 103 where two light sources 151 are placed. It is expressed with the percentage to the amount of light produced from the two light sources 151. As shown in FIG. 5, the amount of light penetrating through the light guiding plate is about 18% when no semi-transmissive layer is present (transmittance 100%). It becomes zero by lowering the transmittance of the semi-transmissive layer to 50%. That is, no loss of light occurs. Thus, when the semi-transmissive layer has a transmittance lower than a certain limit, in other words, when it has a scattering rate higher than a certain limit, the light that comes out of the opposing two light sources 151, 151 and enters the light guiding plate 103 does not reach the opposing light source. This makes it possible to achieve the 100% light utilization efficiency.

In the above-mentioned configuration example, the semi-transmissive layer 121 and the scattering dots 114 are formed in this order on the lower surface of the light guiding plate 103. Alternatively, they may be placed in the reverse order.

Those dispersed in the semi-transmissive layer 121 are not limited to the $SiO_2$ fine particles. Other pigments such as $TiO_2$ may be used. A combination of two or more materials may also apply.

Moreover, what is necessary for the semi-transmissive layer 121 is just to have the function to reflect the beams of incident light partially. It may be formed of, for example, a diffraction grating, a hologram film, a scattering anisotropy film or the like.

In addition, the semi-transmissive layer 121 may comprise a plurality of layers, and may be partially placed on the lower surface of the light guiding plate 103.

Embodiment 13

Figure 12:
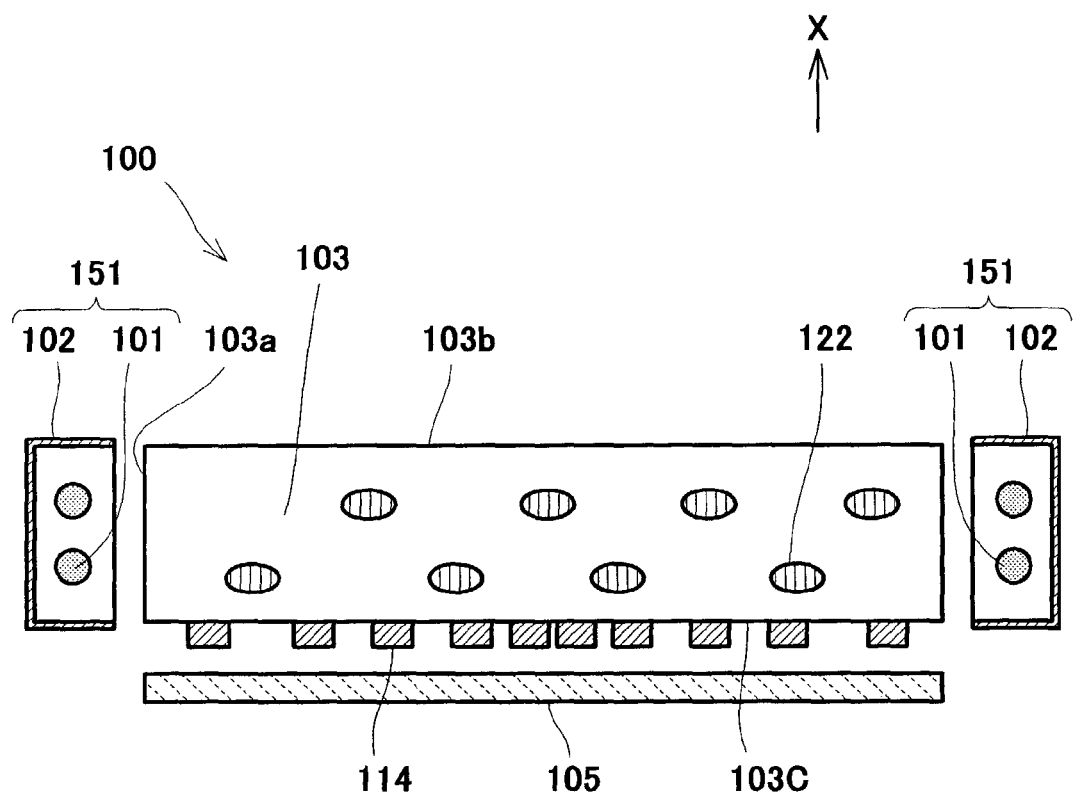
FIG. 12 is a cross-sectional view that schematically shows a configuration of a lighting device according to the Embodiment 13 of the present invention.

FIG. 12 is a cross-sectional view that schematically shows a configuration of a lighting device according to the Embodiment 13 of the present invention. In FIG. 12, the same reference numeral depicts the same or equivalent part as or to those in FIG. 10.

As shown in FIG. 12, in this embodiment, the lower surface 103c of the light guiding plate 103 does not have the semi-transmissive layer 121 formed thereon in contrast to the Embodiment 10. Instead, scattering members 122 are dispersed in the light guiding plate 103. Other components and parts are similar to those described in the Embodiment 10.

The light guiding plate 103 is formed of, for example, an acrylic material into which many scattering members (scattering members) 122 are mixed. Gas bubbles such as air, argon (Ar), oxygen ($O_2$), and nitrogen ($N_2$) or vacuous gas bubbles are sufficient as the scattering member 122. It may be a resin containing materials, such as glass and white pigments having a different refractive index from that of the light guiding plate 103.

According to the above configuration, the beams of light that enter the light guiding plate 103 from the light source 151 are diffused (scattered) from scattering members 122 in the light guiding plate 103. Some beams of the scattered light leave the light guiding plate 103 through the upper surface 103b of it. This reduces the amount of light penetrating through from the light source 151 on one side to the light source 151 on the other side. The beams of light can be traveled efficiently to the light exit surface 103b of the light guiding plate 103, providing a bright lighting device.

In addition, the scattering member 122 dispersed in the light guiding plate 103 does not adhere to the above materials as long as has the diffusion function. Moreover, dispersion of the scattering members 122 may be either uniform or nonuniform.

Embodiment 14

Figure 13:
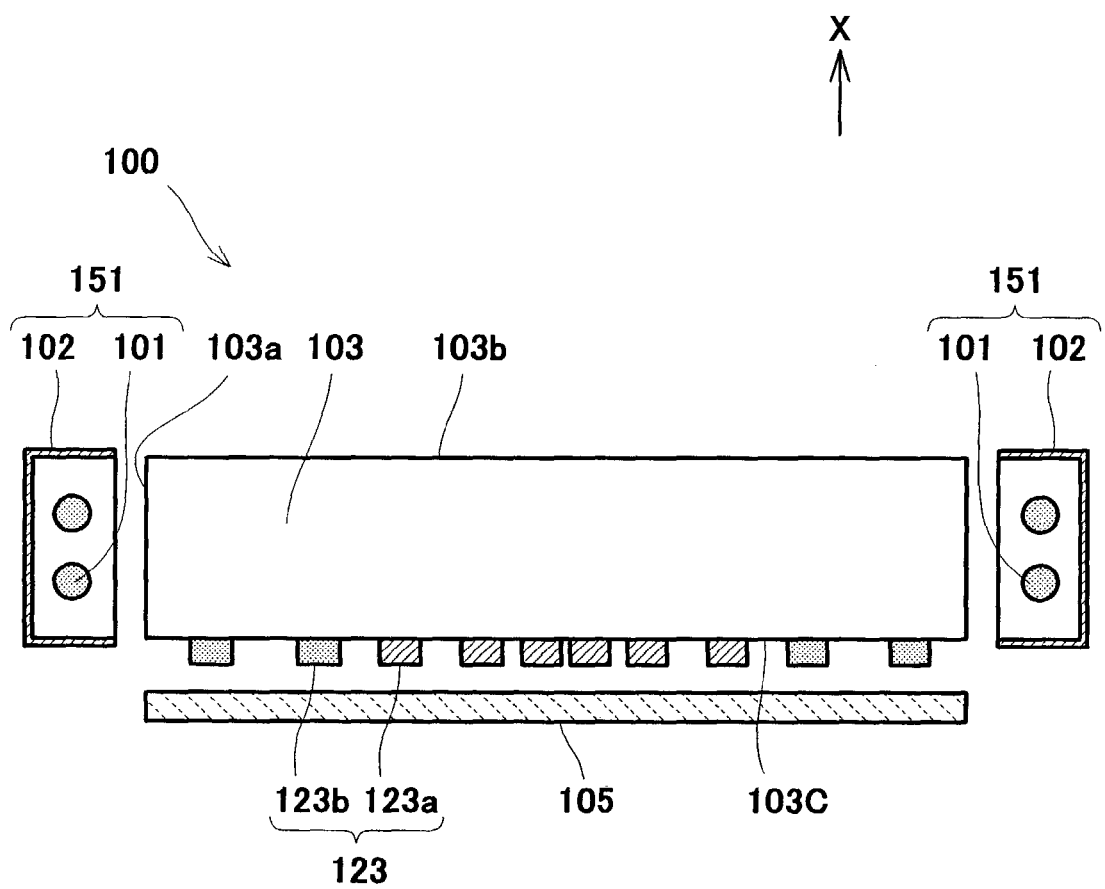
FIG. 13 is a cross-sectional view that schematically shows a configuration of a lighting device according to the Embodiment 14 of the present invention.

FIG. 13 is a cross-sectional view that schematically shows a configuration of a lighting device according to the Embodiment 14 of the present invention. In FIG. 13, the same reference numeral depicts the same or equivalent part as or to those in FIG. 10.

As shown in FIG. 13, in this embodiment, the lower surface 103c of the light guiding plate 103 does not have the semi-transmissive layer 121 formed thereon in contrast to the Embodiment 10. Instead, scattering dots 123 formed on the lower surface 103c of the light guiding plate 103, which comprise two kinds of the scattering dots 123a and 123b. Other components and parts are similar to those described in the Embodiment 10.

The scattering dots 123 has a similar pattern to the one described in the Embodiment 1. That is, the dots are dense at the central portion and are sparser towards the periphery. The scattering dots 123 comprise first scattering dots 123a provided at the central portion and second scattering dots 123b provided at the peripheral portion, that is, closer portion to the light source 151. The first 123a scattering dots comprise $SiO_2$ fine particles. The second scattering dots 123b comprise $TiO_2$ fine particles. The first scattering dots 123a have the higher scattering capacity than the second scattering dots 123b. The reason why such a configuration is used is to reconcile the scattering capacity and the uniformity of the light that propagates through the light guiding plate 103. Although the use of the scattering dots with higher scattering capacity is advantageous in order to make the lighting device 100 bright, the size of the scattering dots for printing has a lower limit with an excessively high scattering capacity. The scattering capacity cannot be kept constant even though the portion requires a low scattering capacity. Consequently the uniformity of the luminance distribution on the light exit surface may be lost. Then, in such a case, the scattering capacity is improved by combining at least two kinds of the scattering dots of a different scattering capacity, while maintaining the uniformity of the luminance distribution on the light exit surface.

The first and second scattering dots 123a and 123b may be formed easily by preparing the ink containing the $SiO_2$ fine particles and the $TiO_2$ fine particles, respectively, both of which are mixed with a resin; printing the ink containing the $SiO_2$ fine particles first on the lower surface 103b of the light guiding plate 103; and then printing the ink containing the $TiO_2$ fine particles. Alternatively, the ink containing the $TiO_2$ fine particles may be printed first and the ink containing the $SiO_2$ fine particles may be printed later.

In the lighting device 100 configured as mentioned above, when the beams of light enter the light guiding plate 103 from the light source 151, some beams of the incident light that are entered the scattering dots 123 are scattered, and the others that are not entered the scattering dots 123 are subjected to total reflection from the lower surface 103c of the light guiding plate 103 for propagation. Under such circumstances, the second scattering dots 123b with a relatively low scattering capacity are formed sparsely at the location closer to the light source on the lower surface 103c of the light guiding plate 103. The first scattering dots 123a with a relatively high scattering capacity are formed densely at the central portion. Accordingly, the light propagating through the central portion of the light guiding plate are scattered much more than those through closer to the light source 151. Consequently, the light exit surface 103b of the light guiding plate 103 has a uniform luminance distribution. In this case, a relative scattering capacity of the scattering dots formed at the central portion to that of those formed at the position closer to the light source 151 may be increased as compared with the case where the scattering dots 123 are formed from one kind of material. Therefore, the brighter lighting device 100 can be obtained.

Embodiment 15

Figure 14:
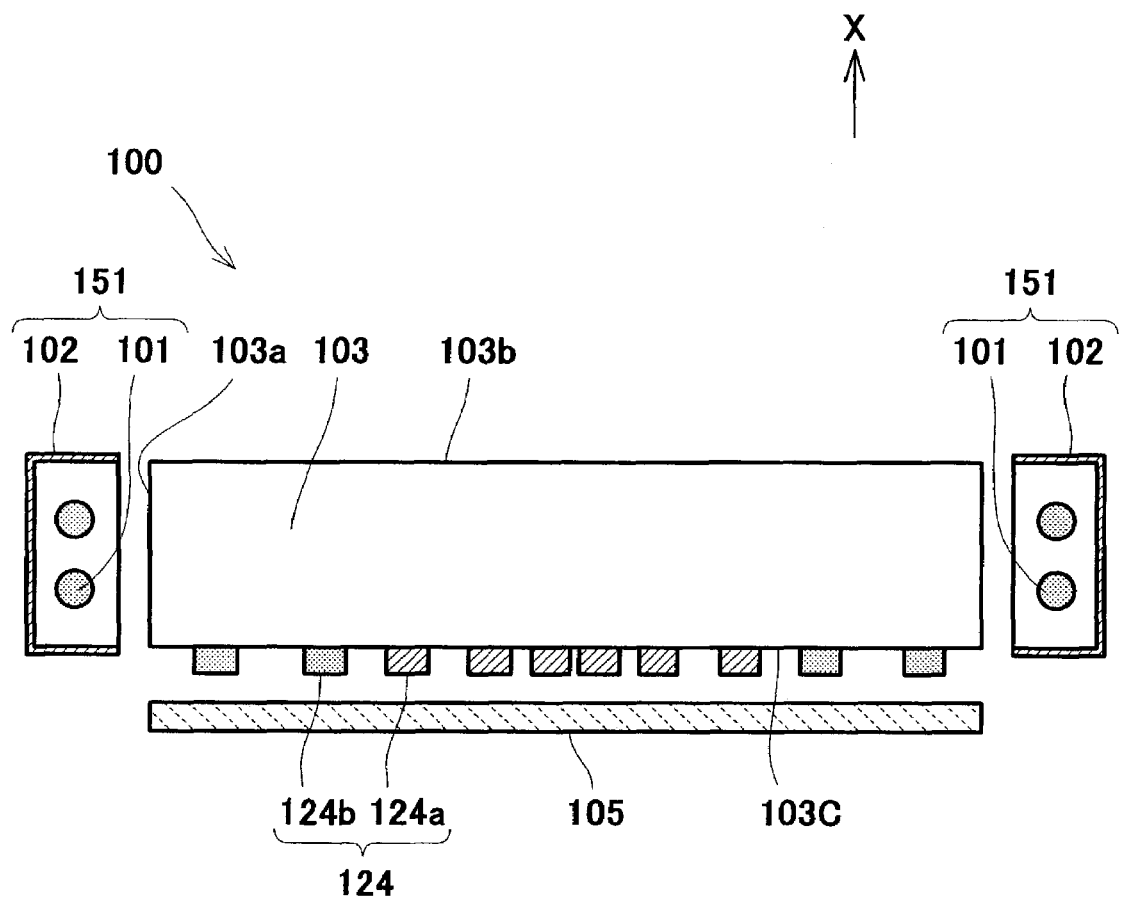
FIG. 14 is a cross-sectional view that schematically shows a configuration of a lighting device according to the Embodiment 15 of the present invention.

FIG. 14 is across-sectional view that schematically shows a configuration of a lighting device according to the Embodiment 15 of the present invention. In FIG. 14, the same reference numeral depicts the same or equivalent part as or to those in FIG. 13.

As shown in FIG. 14, in this embodiment, the scattering capacity of two kinds of the scattering dots 123a and 123b is not made to change with materials in contrast to the Embodiment 14. Instead, the scattering capacity of two kinds of the scattering dots 124a and 124b is made to change using distribution densities of scattering materials in the scattering dots 124a and 124b. That is, the first scattering dots 124a contains the $SiO_2$ fine particles densely, and the second scattering dots 124b contains the $SiO_2$ fine particle sparsely. The first scattering dots 124a have a higher scattering capacity as compared with the second scattering dots 124b. Other components and parts are similar to those described in the Embodiment 14.

The first and second scattering dots 124a and 124b are formed by printing the ink obtained by mixing the $SiO_2$ fine particles with resins at a different mixing ratio, on the lower surface 103c of the light guiding plate 103.

According to the above configuration, the scattering capacity can be improved by using the same material for the two kinds of the scattering dots 124a and 124b, while maintaining the uniformity of the luminance distribution on the light exit surface 103c. Consequently, the brighter lighting device can be obtained.

Embodiment 16

Figure 15:
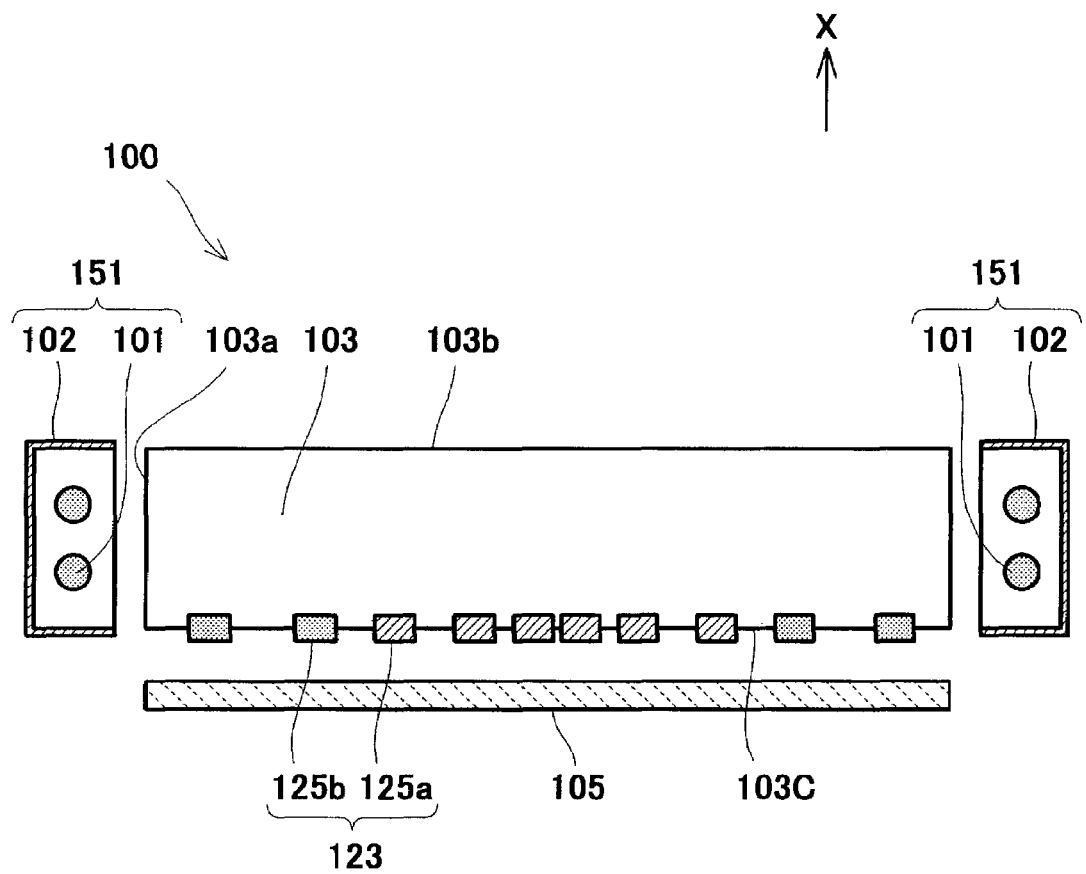
FIG. 15 is a cross-sectional view that schematically shows a configuration of a lighting device according to the Embodiment 16 of the present invention.

FIG. 15 is a cross-sectional view that schematically shows a configuration of a lighting device according to the Embodiment 16 of the present invention. In FIG. 15, the same reference numeral depicts the same or equivalent part as or to those in FIG. 13.

As shown in FIG. 13, in this embodiment, scattering regions 125 are formed in place of the scattering dots 123 used in the Embodiment 14. The scattering regions 125 are formed by providing many minute concave/convex portions in/on the lower surface 103c of the light guiding plate 103. First scattering regions 125a and second scattering regions 125b are different in scattering capacity by varying, for example, the density of the concave/convex portions. The scattering regions 125 are formed by performing mechanical processing and chemical processing to predetermined areas of the lower surface of the light guiding plate 103, and forming the concave/convex portions in/on it. Other components and parts are similar to those described in the Embodiment 10.

Such a configuration can provide similar effects to those obtained in the Embodiment 14.

It goes without saying that the scattering regions of this embodiment may be formed in place of the scattering dots in the Embodiments 12 to 15.

In the Embodiments 12 to 16, although the lower surface 103c of the light guiding plate 103 is illustrated to be flat, it may have concave/convex portions.

Moreover, the light emitter 101 may be located anywhere as long as it is in the reflector 102. The number of the light emitters 101 has no limit.

Furthermore, the number of the light source 151 may be one, and it may have the luminance distribution.

Embodiment 17

The Embodiment 17 of the present invention is an image display obtained by using the lighting devices described in conjunction with the Embodiments 12 to 16. In order to obtain the image display according to this embodiment, the liquid crystal display panel 106 is placed above the lighting device 100 of FIG. 10, FIG. 12, FIG. 13, FIG. 14, or FIG. 15, as shown in FIG. 1. The liquid crystal display panel 106 is driven by the driving circuit 36 shown in FIG. 2.

This configuration provides an image display having similar effects to those of the Embodiments 12 to 16.

Embodiment 18

The Embodiment 18 of the present invention is illustrating a configuration example of a lighting device in which the light that penetrates through the light guiding plate is reduced and the luminance distribution on the light exit surface can be controlled.

Figure 16:
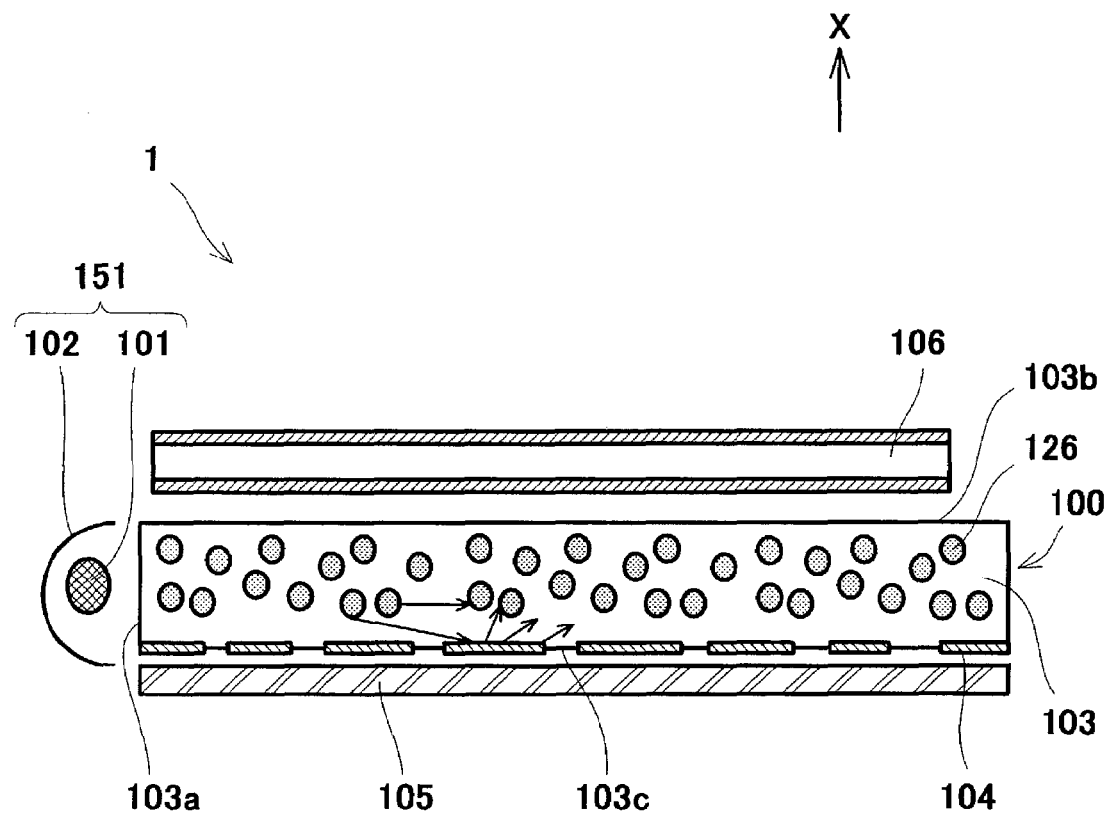
FIG. 16 is a cross-sectional view that schematically shows configurations of a lighting device and of an image display in which it is used, according to the Embodiment 18 of the present invention.

FIG. 16 is a cross-sectional view that schematically shows configurations of a lighting device and of an image display in which it is used, according to this embodiment. In FIG. 16, the same reference numeral depicts the same or equivalent part as or to those in FIG. 1.

As shown in FIG. 16, the backlight 100 as the lighting device according to this embodiment comprises multiple scattering members 126 that are dispersed in the light guiding plate 103. The lower surface 103b of the light guiding plate 103 has a predetermined pattern of scattering dots (distribution and scattering structure) 104.

The scattering members 126 are made of a material having reflective or refractive effects to the incident light, in the material constituting the light guiding plate 103. The scattering dots 104 has a similar pattern to the pattern shown in FIG. 1(b). The area ratio becomes higher from a position closer to the light source towards the central portion on the light guiding plate 103.

The scattering rate of the light guiding plate 103 and the total scattering rate of the scattering dots 104, is determined in such a manner that the scattering effect caused by the scattering dots 104 contributes more than the scattering effect caused by the light guiding plate 103 to the amount of light leaving the light guiding plate 103 through the upper surface 103b of it. More specifically, it is preferably that the scattering effect caused by the scattering dots 104 is about more than twice the scattering effect caused by the light guiding plate 103 in said contribution. The larger the scattering effect by the light guiding plate 103, the more the light that penetrates through the light guiding plate is reduced. However, this leads a relative reduction of the scattering effect by the scattering dots 104. The capacity to control the luminance distribution in the light exit surface 103b is reduced accordingly.

Next, operations of the lighting device having the above-mentioned configuration are described. The light that comes out of the light source 151 and enters the light guiding plate 103 is scattered effectively by the scattering members 126 dispersed in said light guiding plate 103. Almost no light which passes through the light guiding plate and leavs it through the other end face is lost, which otherwise occurs in prior arts.

Some beams of light propagating through the light guiding plate 103 that enters the scattering dots 104 are scattered by them. They then leave the light guiding plate 103 through the upper surface 103b of it. On the other hand, other beams of light that do not meet the scattering dots 104 propagate through said light guiding plate 103 with a series of total reflection in said light guiding plate 103. Accordingly, when the beams of light enter the light guiding plate 103, a smaller amount of beams reaches their destination as they approaches to the central portion from a position near the light source 151. Thus, the intensity of the light propagating through the light guiding plate 103 is high at a position near the light source 151 and it becomes lower as it approaches the central portion.

On the other hand, the scattering dots 104 has a low area ratio at a position near the light source 151 on the light guiding plate 103 and the area ratio becomes high as it approaches the central portion. Accordingly, a ratio of the beams of light penetrating through the light guiding plate 103 that leave the light guiding plate 103 through the upper surface 103b of it is low at a position near the light source 151, and the ratio becomes higher as it approaches the central portion. Thus, the intensity of the light that is scattered by the scattering dots 104 and leaves the light guiding plate 103 through the upper surface 103b becomes uniform over the entire light guiding plate 103.

By forming the scattering dots 104 of which the area ratio around the light source 151 is lower than the area ratio at the central portion, it becomes possible to collect more light in the central portion and increase the central luminance. More specifically, the area ratio of the scattering dots 104 for example may be determined in such a manner that it varies according to an exponential function, a gauss function, or a sinusoidal function in terms of the distance from the light source 151.

As apparent from the above, according to this embodiment, the scattering members 126 are dispersed in the light guiding plate 103. This improves the light scattering efficiency of the light that comes out of the light source 151 and enters the light guiding plate 103. Consequently, the light that penetrates through the light guiding plate can be reduced further. In addition, the luminance distribution on the light exit surface 103b of the light guiding plate 103 can be controlled arbitrarily by using the scattering dots 104 that are formed on the lower surface 103c of the light guiding plate 103. That is, it becomes possible to use the light from the light source 151 without any loss in the light guiding plate 103 and to improve the light utilization rate, as well as to set the luminance distribution of the light exit surface to a desired one.

EXAMPLE 10

In this example, a light guiding plate made of an acrylic resin with a size of 7 inches and a thickness of 10 mm was used as the light guiding plate 103. Scattering members as the scattering members 126 were mixed with the light guiding plate 103 using a method described below. The scattering dots 104 were formed on the lower surface of it. The scattering members to be mixed with the light guiding plate 103 made of an acrylic resin are preferably those having reflective or refractive effects to the incident light and having less or no absorption property. Specifically, for example, metal powder or glass beads may be used. In this embodiment, visible light having a wavelength of about 0.5 □m is subjected to scattering. In order for the scattering members 126 to cause scattering, said scattering members 126 are required to be larger than the wavelength of the visible light. The size of the scattering members 126 cannot exceed the thickness of the light guiding plate 103. It should be from several millimeters to dozens of millimeters at maximum. Considering the uniformity in mixing, the size is preferably from several micrometers to about dozens of micrometers.

With gas bubbles dispersed in the acrylic plate, the scattering effect is produced because of the difference in refractive index between the bubbles and said acrylic plate. The acrylic plate and the gas bubbles may be used as the light guiding plate 103 and the scattering members 126, respectively. Furthermore, the acrylic plate typically used for the light guiding plate 103 has a refractive index of about 1.5. Thus, in order for the scattering member 126 to give the diffusion characteristic by the difference in refractive index to this member, it is desirable to have a refractive index difference by about 0.1 or more. In this example, the scattering members 126 used were beads having a size of about 10 □m and a refractive index of about 1.7. While the scattering members 126 are dispersed randomly in FIG. 16, they may be dispersed regularly. In addition, while the scattering members 126 in FIG. 16 each has a spherical shape, they may have any other shape including an elliptical, rectangular, or triangular shape, or a combination of them.

The pattern of the scattering dots 104 was formed as follows. The scattering dots 104 were arranged into an array at a pitch of about 1.5 mm to 3 mm. The diameter thereof was about 0.5 mm to 2 mm. A cold cathode tube that is designed to provide approximately 100 W output was used as the light emitter 101.

As a Comparative Example (prior art), a light guiding plate formed of an acrylic plate having the same size as this example was used, and scattering dots were formed on the lower surface of it in the same pattern as this example to form a lighting device.

The intensities of light leaving the light guiding plates through their respective upper surface were compared between them. The comparison was made by measuring the luminance on the upper surface of the light guiding plate at nine sites in said surface. As a result, the luminance (output light intensity) was increased about 5 to 10% by the nine averages in this example as compared with the Comparative Example. The distribution of the luminance over these nine sites was generally identical for them. This example can be considered as being similar to the prior art in terms of the distribution of the luminance.

As apparent from the above, according to this example, the scattering members are dispersed in the light guiding plate 103 and are used in combination with the scattering dots. It was revealed that this improves the scattering efficiency to increase the luminance on the light exit surface of the light guiding plate and to achieve a desired luminance distribution.

Embodiment 19

Figure 17:
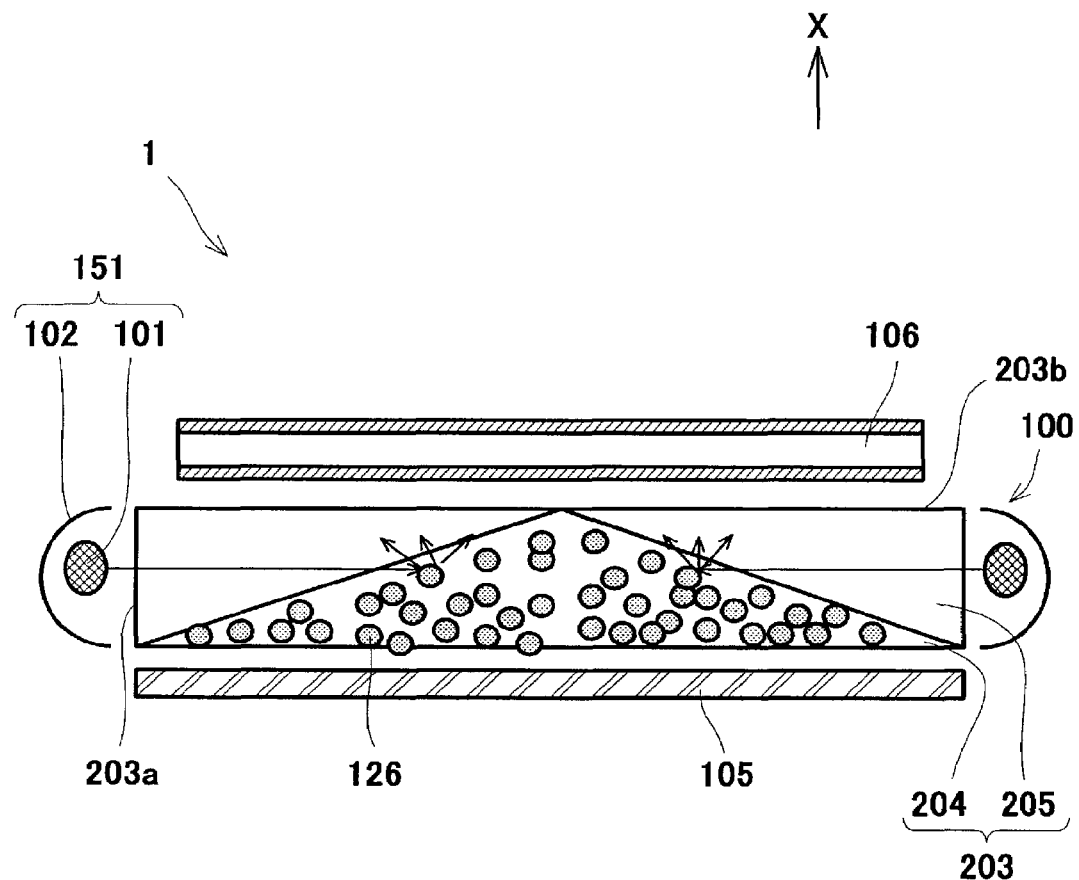
FIG. 17 is a cross-sectional view that schematically shows configurations of a lighting device and of an image display in which it is used, according to the Embodiment 19 of the present invention.

FIG. 17 is a cross-sectional view that schematically shows configurations of a lighting device and of an image display in which it is used, according to the Embodiment 19 of the present invention. In FIG. 17, the same reference numeral depicts the same or equivalent part as or to those in FIG. 16.

As shown in FIG. 17, unlike the Embodiment 18, a light guiding plate 203 in this embodiment has no scattering dot formed on the lower surface of it. The light guiding plate 203 is a complex light guiding plate (hereinafter, merely referred to as a "light guiding plate") which comprises a first unit light guiding member 204 where the scattering members 126 are dispersed and a second unit light guiding member 205 where no scattering member is dispersed. Other components and parts are similar to those described in the Embodiment 18.

The first unit light guiding member 204 and the second unit light guiding member 205 are combined to form the light guiding plate 203 of the shape of a rectangular board. That is, in the section perpendicular to the end face of the light guiding plate 203 of the shape of a rectangular board where the light source 151 is placed, the first unit light guiding member and the second unit light guiding member are formed to provide, respectively, the first and the second regions 204 and 205 are defined by dividing said section into halves along the straight line which connects the middle point of the upper side and the corners on right and left lower sides. The first unit light guiding member 204 and the second unit light guiding member 205 are joined together to form the light guiding plate 203. An optical processing to match the refractive index is made on the junction between the first unit light guiding member 204 and the second unit light guiding member 205 in a manner described below. Therefore, no light is allowed to reflect at that junction. In addition, while the boundary between both the unit light guiding members 204 and 205 is illustrated in FIG. 17, this is given as a matter of convenience to facilitate the understanding of the structure. This boundary is actually invisible. The first and second unit light guiding members 204 and 305 may be formed by cutting out a single rectangular light guiding plate into a shape as shown in FIG. 17.

The first unit light guiding member 204 has the scattering members 126 dispersed therein, as in the light guiding plate described in conjunction with the Embodiment 18. On the other hand, the second unit light guiding member 205 has no scattering member dispersed.

In the lighting device 100 configured as mentioned above, the light that comes out of the light source 151 enters the light guiding plate 203 through the end face 203a. The incident light is transmitted through the second unit light guiding member 205 where no scattering member is dispersed. On the other hand, it is scattered by the surface of said scattering members 126 when the incident light hits the scattering members 126 disperesed in the first unit light guiding member 204. The beams of the scattered light leave the light guiding plate 203 through the upper surface 203b. On the other hand, the beams of light that do not hit the scattering members 126 propagate through said light guiding plate 203 with a series of total reflection between the upper and lower inside surfaces (boundary with the air) of said light guiding plate 203. The boundary between the second unit light guiding member 204 and the first unit light guiding member 205 is tilted relative to the direction of propagation of the light in the light guiding plate 203. A volume ratio of the first unit light guiding member 204 to the light guiding plate 203 is low at a position near a light source 102. The ratio becomes higher as it approaches the central portion. Thus, the light entering the light guiding plate 203 is scattered by the scattering members 126 at a low percentage near the light source. It is scattered at a higher percentage as it approaches the central portion. On the other hand, the light entering the light guiding plate 203 has a high ratio of reaching the place at a position near the light source. The ratio of reaching the place becomes lower as it approaches the central portion. Consequently, the intensity of the light that leaves the light guiding plate 203 through the upper surface 203b becomes generally uniform over the entire light guiding plate 203.

EXAMPLE 11

In this example, as in the Embodiment 18, an acrylic plate of a 7-inch size with a thickness of approximately 10 mm was used as the light guiding plate 203. The scattering members 126 in the first unit light guiding member 204 used were beads having a size of about 10 □m and a refractive index of about 1.7. A cold cathode tube that is designed to provide approximately 100 W output was used as the light emitter 101.

The luminance was measured at nine sites on the line which connects the four corners to the center of the upper surface 203b of the light guiding plate 203, and the degree of balance of the luminance within said plane was determined. Consequently, the luminance of other portions was distributed in a range of about 85% to 95% relative to the 100% luminance obtained near the center of the upper surface 203b of the light guiding plate 203. Moreover, the total luminance in all portions was the same as that of the lighting device in the case of the Example 10 of the Embodiment 18. Thus, according to this example, it was indicated that the degree of balance of the luminance may be improved while improving the light utilization rate.

Embodiment 20

Figure 18:
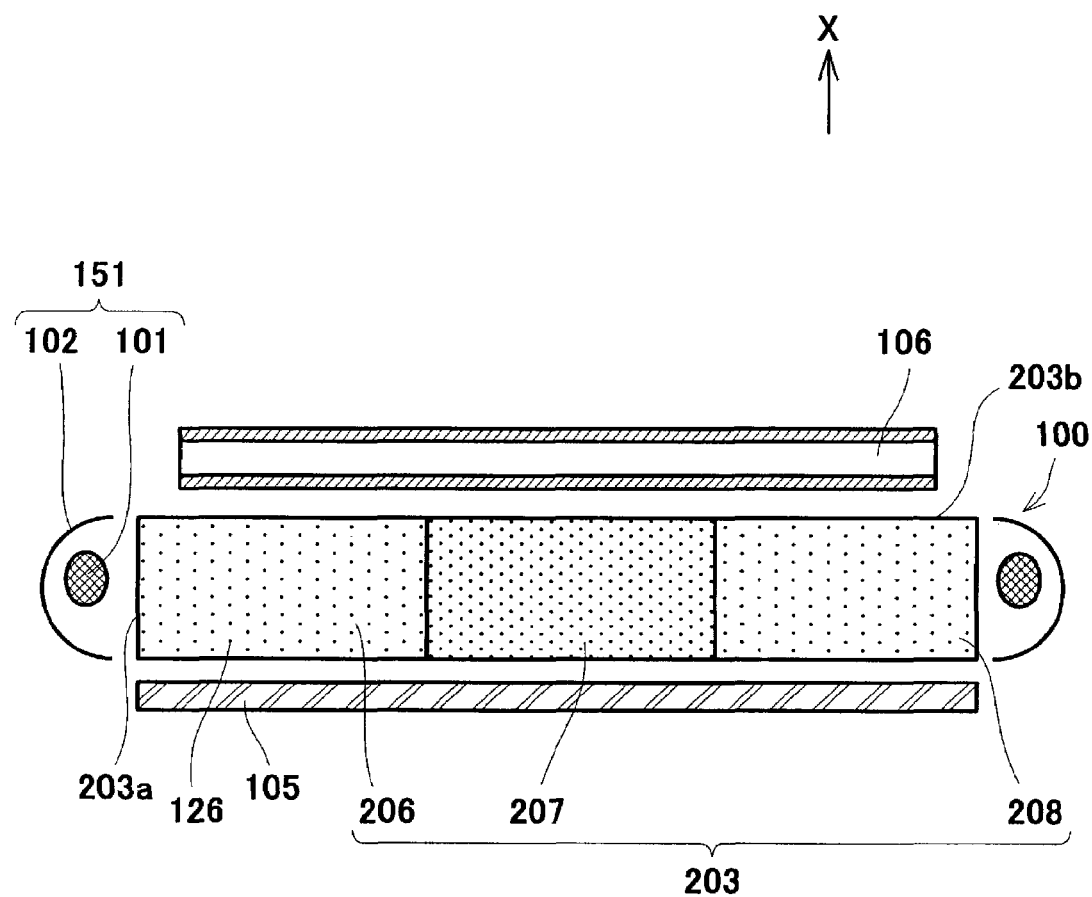
FIG. 18 is a cross-sectional view that schematically shows configurations of a lighting device and of an image display in which it is used, according to the Embodiment 20 of the present invention.

FIG. 18 is a cross-sectional view that schematically shows configurations of a lighting device and of an image display in which it is used, according to the Embodiment 20 of the present invention. In FIG. 18, the same reference numeral depicts the same or equivalent part as or to those in FIG. 17.

As shown in FIG. 18, unlike the Embodiment 19, the light guiding plate 203 of this embodiment is formed of a complex light guiding plate having the first, second, and third unit light guiding members 206, 207, and 208 having different distribution densities of the scattering members 126. Other components and parts are similar to those described in the Embodiment 19.

The first, the second, and the third unit light guiding members are formed in such a manner that the first, the second, and the third regions 206, 207, 208 are formed by dividing the section perpendicular to the end face of the light guiding plate 203 of the shape of a rectangular board, where the light source 151 is placed, into three sections in the right and left directions. The first and third light guiding plates 206 and 208 have the same distribution density of the scattering members 126. The second unit light guiding member 207 has the higher distribution density of the scattering members 126 than that of the first and third light guiding plates 206 and 208. The scattering members 126 are dispersed uniformly and regularly in the unit light guiding members 206, 207, and 208.

In the lighting device 100 configured as mentioned above, the light entering the light guiding plate 203 is scattered by the scattering members 126 when the light hits them. The light then leaves the light guiding plate 203 through the upper surface 203b. When it does not hit the scattering members 126, the light propagates through said light guiding plate 203 with a series of total reflection between the upper and lower inside surfaces of the light guiding plate 203. The distribution density of the scattering members 126 is lower in the first and third unit light guiding members 206 and 208 that are closer to the light source 151. The second unit light guiding member 207, which is located at the central portion, has the higher distribution density. The percentage for the light propagating through the light guiding plate 203 to be scattered is lower in the first and third unit light guiding members 206 and 208 that are closer to the light source 151. The percentage becomes high is the second unit light guiding member 208 located at the central portion. The percentage for the light entering the light guiding plate 203 to reach is higher for the first and third unit light guiding members 206 and 208 that are closer to the light source 151. It becomes smaller for the second unit light guiding member 208 located at the central portion. Consequently, the intensity of the light leaving the light guiding plate 203 through the upper surface 203b becomes generally identical over the entire light guiding plate 203.

Although the light guiding plate 203 is divided into the three parts having different distribution densities of the scattering members in the above-mentioned configuration example, it may be divided into several parts with different distribution densities of the scattering members. The increase in the number of the parts allows to determine the scattering rate at each position in the light guiding plate 203 more sensitively according to the distance from the light source 102. The luminance distribution on the light exit surface may be controlled with high accuracy accordingly.

While the scattering members 126 are dispersed regularly in the above-mentioned configuration example, they may be dispersed randomly.

EXAMPLE 12

In this example, as in the Example 11 in the Embodiment 19, an acrylic plate of a 7-inch size with a thickness of approximately 10 mm was used as the light guiding plate 203. The scattering members 126 used were beads having a size of about 10 □m and a refractive index of about 1.7. The amount of beads added to the second unit light guiding member 207 was twice as much as the amount of them added to the first and third unit light guiding members 206 and 208. A cold cathode tube that is designed to provide approximately 100 W output was used as the light emitter 101.

The luminance of the upper surface 203b of the light guiding plate 203 was measured at three sites for each and nine sites in total, for the unit light guiding members 206, 207, and 208. The degree of balance of the luminance of said upper surface 203b was determined. Consequently, the luminance of the unit light guiding members 206 and 208 on both sides was distributed in a range of about 70 to 85% relative to the 100% luminance obtained near the center of the unit light guiding member 207 located at the central portion. Moreover, the total luminance of the measured sites was the same as that of the lighting device in the Example 10 in the Embodiment 18. Thus, according to this example, it was indicated that the distribution of the luminance may be controlled while improving the light utilization rate.

Embodiment 21

Figure 19:
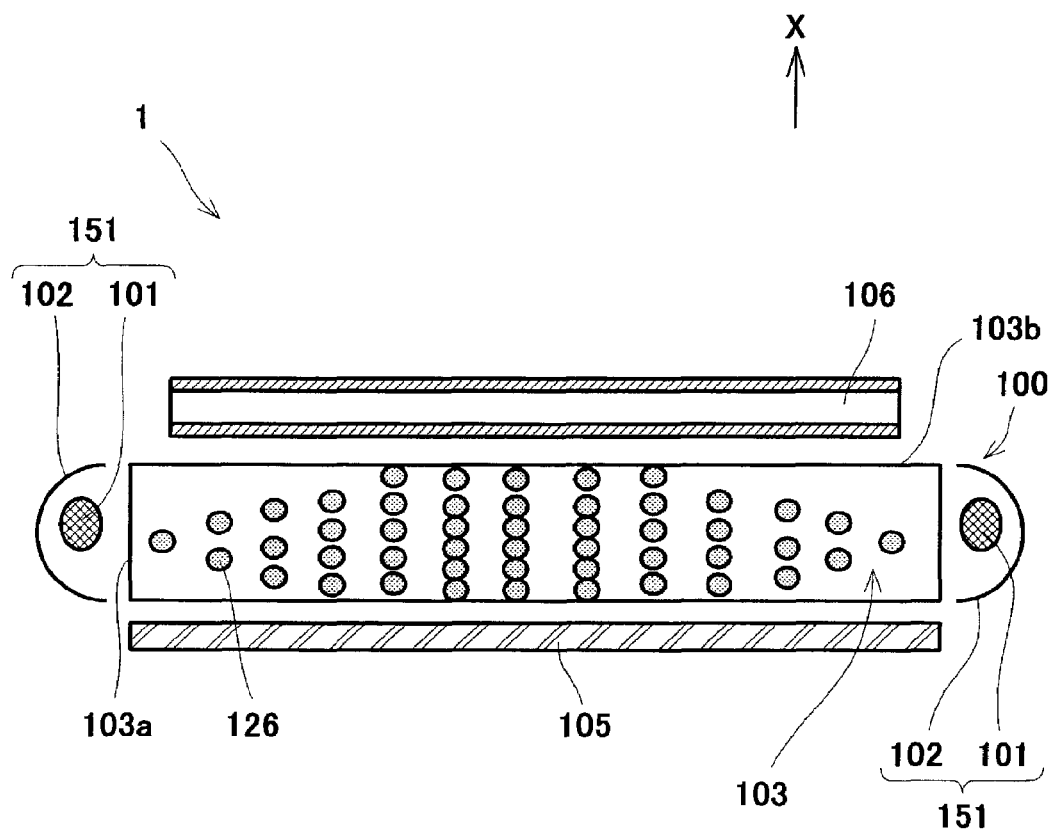
FIG. 19 is a cross-sectional view that schematically shows configurations of a lighting device and of an image display in which it is used, according to the Embodiment 21 of the present invention.

FIG. 19 is a cross-sectional view that schematically shows configurations of a lighting device and of an image display in which it is used, according to the Embodiment 21 of the present invention. In FIG. 19, the same reference numeral depicts the same or equivalent part as or to those in FIG. 16.

As shown in FIG. 19, unlike the Embodiment 18, this embodiment disperses the scattering members 126 in the light guiding plate 103 in such a manner that the density thereof is low at a position near the light source 151 and becomes higher as it approaches the central portion. No scattering dots are printed on the lower surface of the light guiding plate 103. Other components and parts are similar to those described in the Embodiment 18.

In the lighting device 100 configured as mentioned above, the light entering the light guiding plate 103 is scattered by the scattering members 126 when the light hits them. The light then leaves the light guiding plate 103 through the upper surface 103b. When it does not hit the scattering members 126, the light propagates through said light guiding plate 103 with a series of total reflection between the upper and lower inside surfaces of the light guiding plate 103. The distribution density of the scattering members 126 is lower in the portion closer to the light source 151. The central portion has the higher distribution density. The percentage for the light propagating through the light guiding plate 103 to be scattered is lower for the portion closer to the light source 151. The percentage becomes high for the central portion. The percentage for the light entering the light guiding plate 103 to reach is higher in the portion closer to the light source 151. It becomes smaller in the central portion. Consequently, the intensity of the light leaving the light guiding plate 103 through the upper surface 103b becomes generally identical over the entire light guiding plate 103.

While the scattering members 126 are dispersed regularly in the above-mentioned configuration example, they may be dispersed randomly.

EXAMPLE 13

In this example, as in the Example 10 in the Embodiment 18, an acrylic plate of a 7-inch size with a thickness of approximately 10 mm was used as the light guiding plate 103. The scattering members 126 used were beads having a size of about 10 □m and a refractive index of about 1.7. The scattering members 126 were dispersed in such a manner that the density of them increases generally linearly along the distance from the end face of the light guiding plate 103 to the central portion, by means of a manufacturing method described below. A cold cathode tube that is designed to provide approximately 100 W output was used as the light emitter 101.

The luminance was measured at nine sites on the line which connects the four corners to the center of the upper surface 103b of the light guiding plate 103, and the degree of balance of the luminance within said plane was determined. Consequently, the luminance of other portions was distributed in a range of about 85% to 95% relative to the 100% luminance obtained near the center of the upper surface 103b of the light guiding plate 103. Moreover, the total luminance in all portions was the same as that of the lighting device in the case of the Example 10 of the Embodiment 18. Thus, according to this example, it was indicated that the degree of balance of the luminance may be improved while improving the light utilization rate.

Embodiment 22

Figure 20:
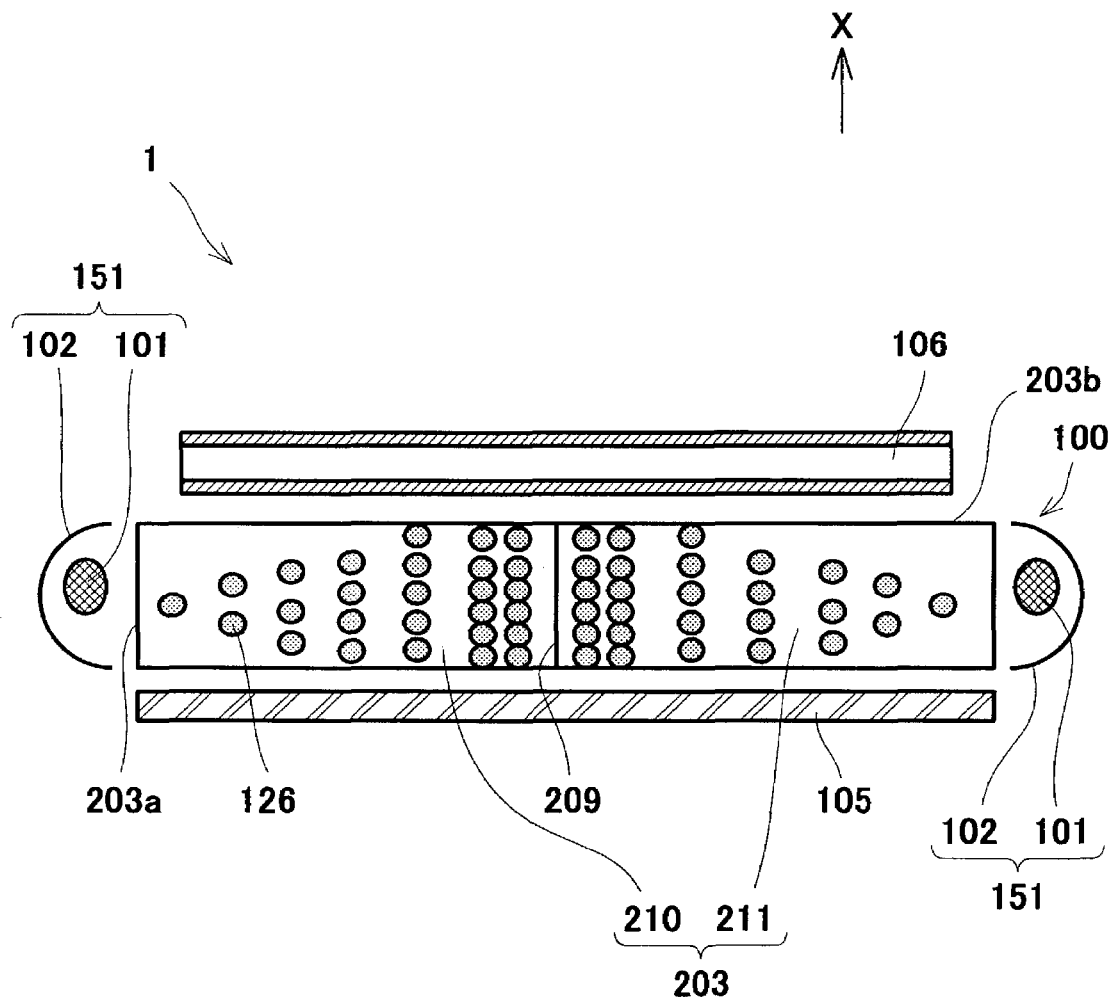
FIG. 20 is a cross-sectional view that schematically shows configurations of a lighting device and of an image display in which it is used, according to the Embodiment 22 of the present invention.

FIG. 20 is a cross-sectional view that schematically shows configurations of a lighting device and of an image display in which it is used, according to the Embodiment 22 of the present invention. In FIG. 20, the same reference numeral depicts the same or equivalent part as or to those in FIG. 19.

As shown in FIG. 20, in this embodiment 22 the light guiding plate 203 is made of a complex light guiding plate obtained by joining the first and second unit light guiding members 210 and 211. The first and second unit light guiding members comprise parts 210 and 211, respectively, formed by dividing the 19th (Embodiment 21) light guiding plate 103 at the center of the right and left direction into two halves. Joining surfaces 209 of them are each formed as a reflecting surface. This reflecting surface 209 is formed by means of attaching a reflection tape or depositing a reflective material such as aluminum Al onto the joining surfaces of the unit light guiding members 210 and 211. The reflecting surface 209 has the function of reflecting or scattering the incident light, and has the function of performing the scattering reflection here. Other components and parts are similar to those described in the Embodiment 21.

In the lighting device 100 having the configuration as described above, the intensity of light leaving the light guiding plate 203 through the upper surface 203b becomes generally uniform over the entire light guiding plate 203 because of the effect by the scattering members 126, as in the Embodiment 21.

In addition, since the reflecting surfaces 209 are provided at the joining surface of the two unit light guiding members 210 and 211, it is possible to reduce the amount of light that is lost via the opposite end face after coming out of the light source 151 and entering the light guiding plate 203 without being scattered well within it. That is, the reflecting surface 209 disposed at the central portion of the light guiding plate 203 scatters and reflects a part or all of the incident light. The light scattered and reflected is again scattered by the scattering members 126 that are dispersed in the unit light guiding members 210 and 211. This further reduces the light that is not scattered well in the light guiding plate 203 and penetrates through it as a loss. When the reflecting surface 209 has the function of scattering transmission, the light that passes through said reflecting surface 209 and is scattered is further scattered by the scattering members 126 that are dispersed in the other unit light guiding members 210 and 211. Accordingly, the light entering the light guiding plate 203 is well scattered, reducing the loss of light penetrating to the other end face.

EXAMPLE 14

In this example, as in the Example 10 in the Embodiment 18, an acrylic plate of a 7-inch size with a thickness of approximately 10 mm was used as the light guiding plate 203. The scattering members 126 used were beads having a size of about 10 □m and a refractive index of about 1.7. The scattering members 126 were dispersed in such a manner that the density of them increases generally linearly along the distance from the end face of the light guiding plate 203 to the central portion, by means of a manufacturing method described below. A cold cathode tube that is designed to provide approximately 100 W output was used as the light emitter 101. The reflecting surface 209 was obtained by attaching a reflection tape to the joining surfaces of the unit light guiding members 210 and 211 to provide the scattering reflection function.

The luminance was measured at nine sites on the line which connects the four corners to the center of the upper surface 203b of the light guiding plate 203, and the degree of balance of the luminance within said plane was determined. Consequently, the luminance of other portions was similar to the luminance obtained in the Embodiment 21, i.e., about 80% to 95% relative to the 100% luminance obtained near the center of the upper surface 203b of the light guiding plate 203. Moreover, the total luminance in all portions was increased by about 5% from the Embodiment 21. Thus, according to this example, it was indicated that the degree of balance of the luminance may be improved while improving the light utilization rate.

Embodiment 23

The Embodiment 23 of the present invention uses the joining surfaces of the first unit light guiding member 210 and the second unit light guiding member 211 in FIG. 20 (Embodiment 22) as refractive index matching surfaces. Other components and parts are similar to those described in the Embodiment 22. In this embodiment, the first and second unit light guiding members 210 and 211 were each formed of an acrylic plate. The joining surfaces of them were bonded together using an adhesive having a refractive index that is generally identical to the refractive index of them. Since the acrylics had a refractive index of about 1.5, an epoxy based adhesive having a refractive index of about 1.5 was used.

With this configuration, the above-mentioned joining surfaces do not work as a boundary plane at which light is reflected, but they function as same as being subjected to optical matching.

Moreover, in the Embodiment 19 or 20, it is expected that the joining surfaces can be prevented from appearing as, for example, a boundary line due to the difference in transmittance or reflectivity, even without the use of, for example, a scattering sheet by means of applying the refractive index matching processing to the joining surfaces of the unit light guiding members. While an adhesive is used for the above-mentioned configuration example, similar effects can be obtained only by applying a liquid having the same refractive index as the unit light guiding members 210 and 211 to the joining surfaces of them and contacting the joining surfaces with each other.

Actually, in the above-mentioned configuration, as a result of measuring the luminance of the light exit surface 203a of the light guiding plate 203, results obtained were generally identical to the measurement results in the Embodiment 22. Moreover, even when the light exit surface 203b of the light guiding plate 203 was observed without using the scattering sheet, no unnatural boundary like a line was observed. Thus, it was revealed that this embodiment improves the light utilization rate and identity of the luminance.

Embodiment 24

Figure 21:
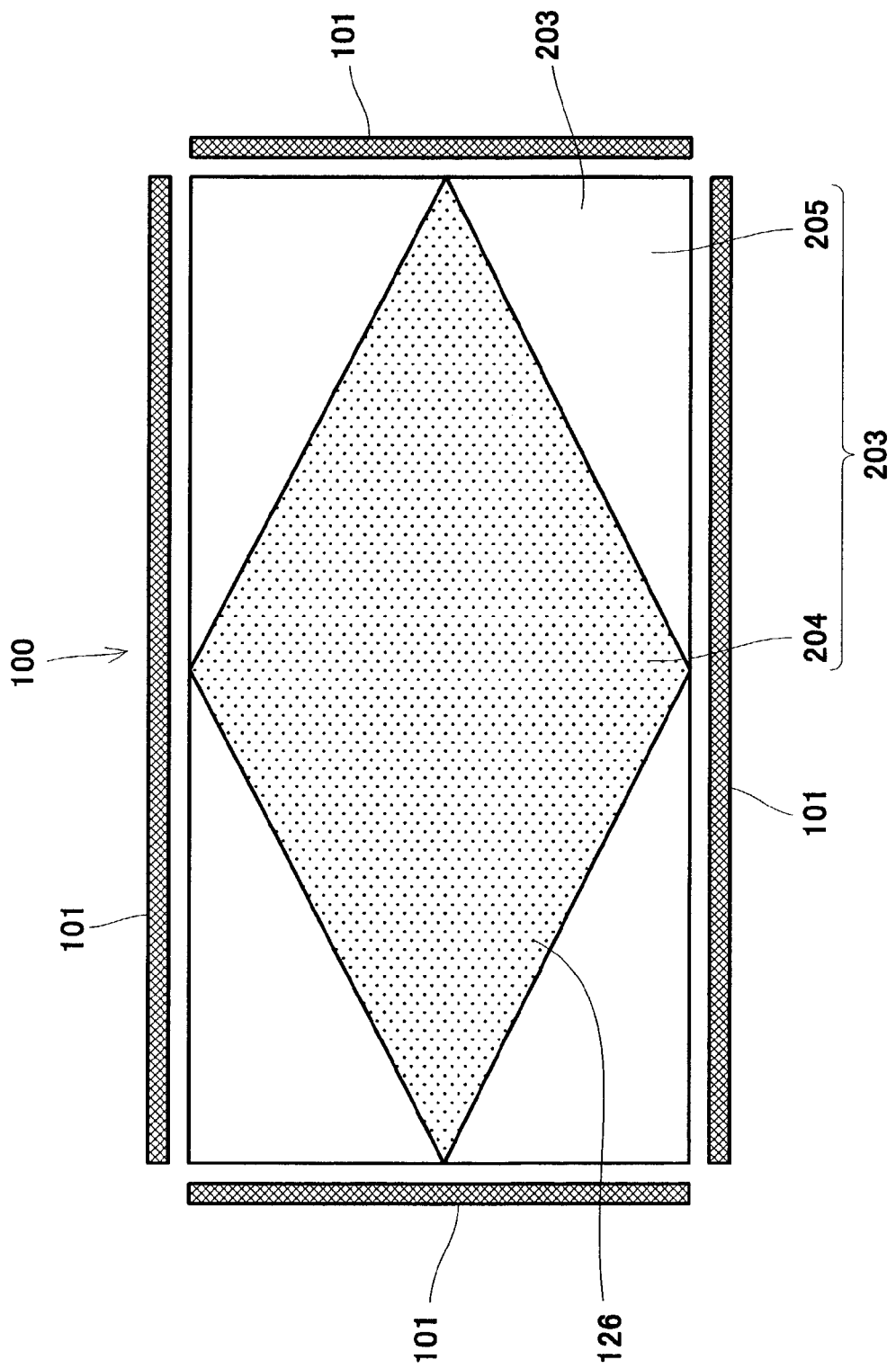
FIG. 21 is a cross-sectional view that schematically shows a configuration of a lighting device according to the Embodiment 24 of the present invention.

FIG. 21 is a plan view that schematically shows a configuration of a lighting device according to the Embodiment 24 of the present invention. In FIG. 21, the same reference numeral depicts the same or equivalent part as or to those in FIG. 17.

FIG. 21 is a view seen from the side of the light exit surface of the light guiding plate. As shown in FIG. 21, unlike the Embodiment 19, the light guiding plate 203 of this embodiment consists of the first and second unit light guiding members 204 and 205 that are two parts obtained by dividing a planar surface into halves. The light emitters 101 are placed on the four end faces of the light guiding plate 203. Other components and parts are similar to those described in the Embodiment 19. It is noted that the reflector is omitted in FIG. 21.

The first unit light guiding member having the scattering members 126 dispersed therein is formed of a diamond-shaped part 204 defined by the straight lines connecting the middle points of each side of the rectangular light guiding plate 203. The second unit light guiding member having no dispersed scattering member occupies the remaining part 205 of the rectangular light guiding plate 203. The coverage of the first unit light guiding member 204 having the scattering members 126 dispersed therein relative to the light guiding plate 203 becomes higher as it approaches from the portion of said light guiding plate 203 that is close to the light emitters 101 to the central portion. The first and second unit light guiding members 204 and 205 are bonded together by the refractive index matching processing described in the Embodiment 23. An aspect of the scattering members 126 is similar to the aspect in the embodiment 19.

The shape of the first unit light guiding member 204 is not limited to a diamond, as long as the coverage of the first unit light guiding member 204 relative to the light guiding plate 203 becomes higher as it approaches to the central portion from the portion near the light emitter 101. The configuration of the light emitter 101 may be as follows. Two L-shaped light emitters 101 may be placed at the four end faces of the light guiding plate 203. Alternatively, a U-shaped light emitter 101 and a linear light emitter 101 may be placed at the four end faces of the light guiding plate 203.

EXAMPLE 15

In this example, the material and shape of the light guiding plate as well as the light emitter were similar to those described in the Example 10 in the Embodiment 18. A diamond portion as shown in FIG. 21 was cut from a rectangular acrylic plate into which the scattering members 126 had previously been dispersed, which was used as the first unit light guiding member 204. In addition, four right-angled triangles as shown in FIG. 21 were cut from an acrylic plate having the same shape as the acrylic plate for the first unit light guiding member 204 but not including the scattering members, which was used as the second unit light guiding member 205. The joining surfaces of the first and second unit light guiding members 204 and 205 were bonded together using an epoxy adhesive.

As a result of measuring the luminance in the light exit surface 203b of the light guiding plate 203 as in the case of the Example 10 in the Embodiment 18, the luminance of other portions was about 80% to 95% relative to the 100% luminance obtained near the center of said light exit surface 203b. Thus, it was revealed that the luminance distribution on the light exit surface can be controlled using this example.

Embodiment 25

The Embodiment 25 of the present invention uses the lighting device according to the Embodiments 18 to 24 to form an image display. More specifically, by using the backlight 100 in FIG. 16 (Embodiment 18), the backlight 100 in FIG. 17 (Embodiment 19), the backlight 100 in FIG. 18 (Embodiment 20), the backlight 100 in FIG. 19 (Embodiment 21), the backlight 100 in FIG. 20 (Embodiments 22 and 23), of the backlight 100 in FIG. 21 (Embodiment 24), in place of the backlight 100 of the Embodiment 1 in the configuration of the image display described in the Embodiment 6, the liquid crystal display 1 as an image display can be configured. A twist nematic type liquid crystal element of about 7-inch size was used as the liquid crystal panel 106. Furthermore, polarizers (not shown) were arranged in crossed nicols on both sides of the liquid crystal panel 106.

When the luminance distribution on the display screen was measured through the liquid crystal element 106, the measurement corresponded to a result obtained by multiplying the luminance measured only with the lighting device 100 by about 5 to 7% of the transmittances of the liquid crystal element 106. Therefore, it was revealed that the light utilization rate can be improved and the luminance distribution can be controlled even when the image display was made using the lighting device according to the Embodiments 18 to 24.

Embodiment 26

The Embodiment 26 of the present invention illustrates a method for manufacturing a light guiding plate having scattering members dispersed therein.

Figure 22:
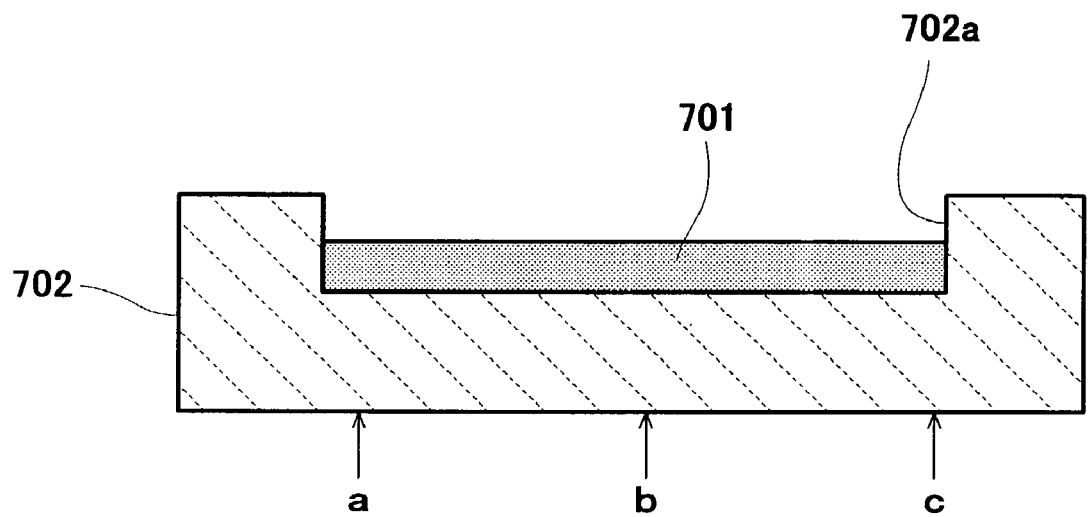
FIG. 22 is a cross-sectional view illustrating a method for manufacturing a light guiding plate according to the Embodiment 26 of the present invention.

FIG. 22 is a cross-sectional view illustrating a method for manufacturing a light guiding plate according to this embodiment. In FIG. 22, the reference numeral 702a represents a mold for forming the light guiding plate by heat fusion. The surface of the mold 702 has a concave portion 702 formed therein that has a planar shape, which is generally identical to a planar shape of a desired light guiding plate, and has a desired depth. The mold 702 is made of a metal such as aluminum (Al).

In this embodiment, the product is a light guiding plate having scattering members dispersed in an acrylic resin. The scattering members are preferably those having reflective or refractive effects to the incident light and having less or no absorption property. Specifically, for example, metal powder or glass beads may be used as the scattering members. An object of scattering is to be scattered is visible light having a wavelength of about 0.5 $\mu$m. Therefore, in order to cause scattering, the scattering members are required to be larger than that wavelength. Since the size of the scattering members cannot exceed the thickness of the light guiding plate, it should be from several millimeters to dozens of millimeters at maximum. Taking the uniformity in mixing into consideration, the size of each scattering member is preferably from several micrometers to about dozens of micrometers.

In order to manufacture the light guiding plate, the acrylic resin is heated and fused, to which beads having a refractive index of about 1.7 are added. Then, the mixture of the beads and the acrylic resin (hereinafter, merely referred to as a "mixture") 701 is injected into the concave portion 702a in the mold 702. Subsequently, the temperature at both ends "a" and "c" of the mold 702 is set to be higher by 50 to 100° C. than the temperature of the central portion "b". The mixture 701 will have a low viscosity at the portion corresponding to the high temperature region, the added beads diffuse to a larger extent. Accordingly, the distribution density of the beads is low in both ends "a" and "c" having a higher temperature. The distribution density increases as it approaches the central portion. In this state, the mixture 701 is quenched. This produces a light guiding plate of which distribution density of the beads is low at both ends and becomes higher as it approaches to the central portion.

A photocuring agent may be added previously to the mixture 701 and said mixture 701 may be cured by irradiation.

The heating temperature applied to the mold 702 may be constant. This results in a light guiding plate having a uniform distribution density of the scattering members.

The light guiding plate, which was produced by above mentioned method, with the distribution density varied at different places was used as the light guiding plate 103 of the Embodiment 21. For the optical characteristics of the lighting device 100 using this light guiding plate 103, as described in the Embodiment 21, it is possible to improve the light utilization rate and control the luminance distribution. The validity of the light guiding plate 103 produced according to this embodiment could be confirmed.

Embodiment 27

Figure 23:
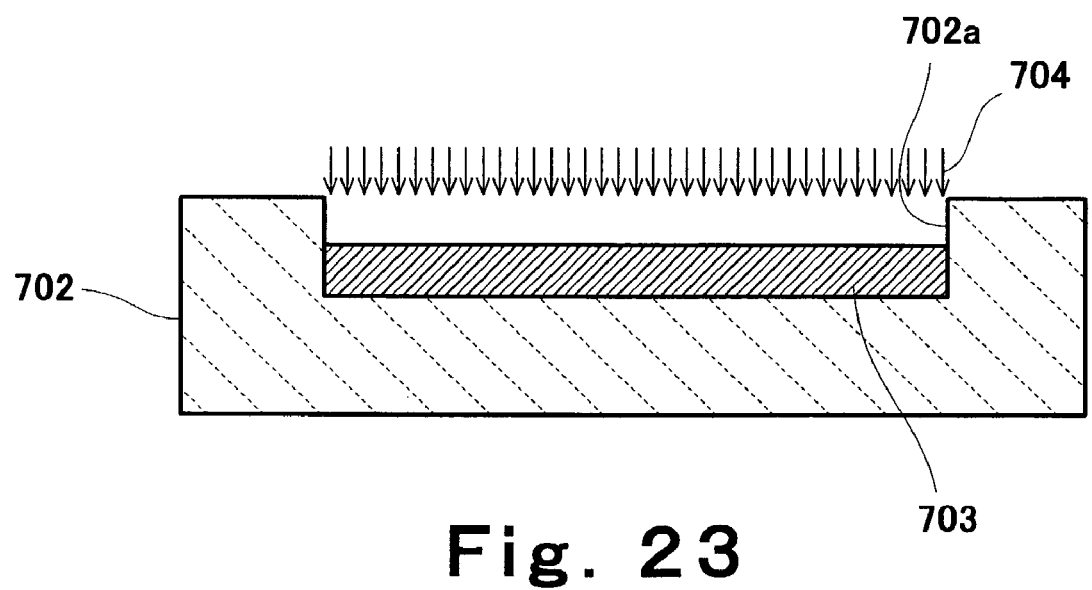
FIG. 23 is a cross-sectional view illustrating a method for manufacturing a light guiding plate according to the Embodiment 27 of the present invention.

FIG. 23 is a cross-sectional view illustrating a method for manufacturing a light guiding plate according to the Embodiment 27 of the present invention. In FIG. 23, the same reference numeral depicts the same or equivalent part as or to those in FIG. 22.

In this embodiment, the product is a light guiding plate having gas bubbles dispersed in an acrylic resin as the scattering members. The gas bubbles are bubbles of air having a refractive index of 1.0. On the other hand, the acrylic resin has a refractive index of about 1.5. Thus, the gas bubbles of the air dispersed in the base member made of the acrylic resin scatter the incident light due to the difference in refractive index, and serve as the scattering members.

In order to manufacture the light guiding plate, the acrylate resin is heated and fused, to which a foaming agent is added. Next, as shown in FIG. 23, the fused acrylic resin 703 with the added foaming agent is injected into the concave portion 702a in the mold 702. Subsequently, the fused acrylic resin 703 is exposed to light 704 in this state.

The foaming agent is capable of generating gas bubbles according to the intensity of the irradiated light. Therefore, the distribution density of the gas bubbles in the fused acrylate resin 703 can be varied by setting the intensity of the light 704 to be irradiated in such a manner that it is distributed on the irradiation surface. Then, in this embodiment, for example, the intensity of the irradiated light 704 is low at both ends of the surface of the fused acrylic resin 703 and becomes higher as it approaches the central portion of it.

Thus, the irradiation generates the gas bubbles in the fused acrylic resin 703 of which distribution density is low at both ends, and becomes higher as it approaches the central portion.

Next, in this state, the fused acrylic resin 703 is quenched. This produces a light guiding plate of which distribution density of the gas bubbles is low at both ends, and becomes higher as it approaches the central portion.

A curing agent sensitive to ultraviolet rays may be added previously to the fused acrylic resin 703 and said fused acrylic resin 703 may be cured by ultraviolet irradiation.

Moreover, if the irradiated light 704 is made to have a uniform distribution of intensity within an illuminated plane, the resulting light guiding plate has a uniform distribution density of the gas bubbles. Furthermore, by selecting the distribution of intensity in the illuminated plane for the irradiated light 704, the distribution density of the gas bubbles in the light guiding plate can be controlled arbitrarily.

The light guiding plate which was produced by above mentioned method was used as the light guiding plate 103 of the Embodiment 21. For the optical characteristics of the lighting device 100 using this light guiding plate 103, as described in the Embodiment 21, it is possible to improve the light utilization rate and control the luminance distribution. The validity of the light guiding plate 103 produced according to this embodiment could be confirmed.

Embodiment 28

The Embodiment 28 of the present invention illustrates a lighting device and an image display achieving higher light utilization rate and higher luminance using a reflective polarizer.

Figure 24:
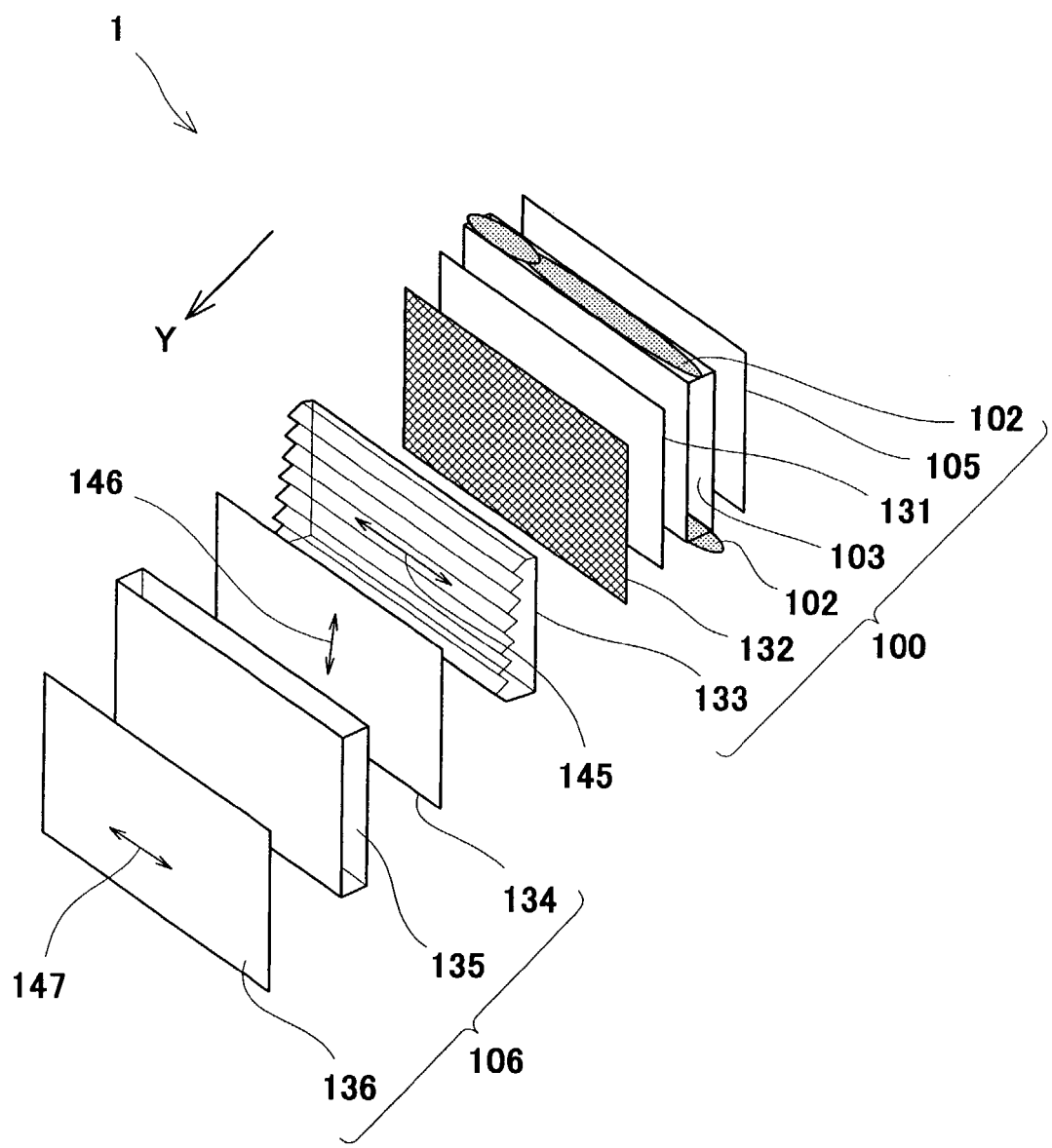
FIG. 24 is an exploded perspective view that schematically shows configurations of a lighting device and of an image display, according to the Embodiment 28 of the present invention.
Figure 25:
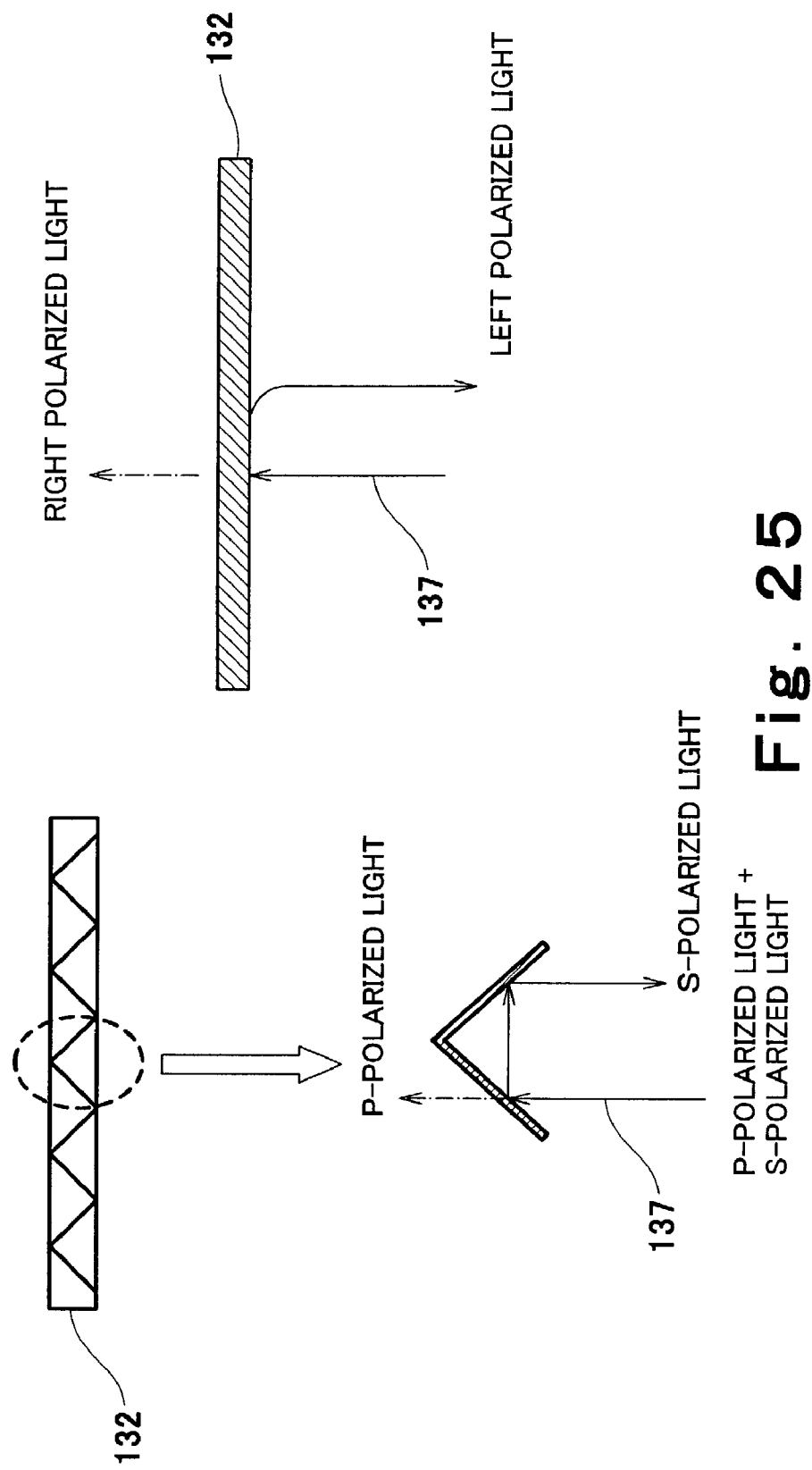
FIG. 25 is a simplified schematic view illustrating operation of a reflective polarizer shown in FIG. 24, wherein (a) is a cross-sectional view for a case where the reflective polarizer has a multi-layered film structure, and (b) is a view for a case where the reflective polarizer is formed of cholesteric liquid crystal.

FIG. 24 is an exploded perspective view that schematically shows configurations of a lighting device and of an image display, according to this embodiment. FIG. 25 is a simplified schematic view illustrating operation of a reflective polarizer shown in FIG. 24, wherein (a) is a cross-sectional view for a case where the reflective polarizer has a multi-layered film structure, and (b) is a view for a case where the reflective polarizer is formed of cholesteric liquid crystal. FIG. 26 is a graphical representation of change in transmittance relative to the viewing angle of a prism sheet shown in FIG. 24, wherein (a) is a view illustrating the change in the direction perpendicular to the edge line direction of the prism sheet, and (b) is a view illustrating the change in the edge line direction of the prism sheet. In FIG. 24, the same reference numeral depicts the same or equivalent part as or to those in FIG. 1. In FIG. 24, the front direction is considered as a Y-direction, as a matter of convenience.

(Lighting Device)

As shown in FIG. 24, in the lighting device 100 according to this embodiment, the light sources 102, 102 are placed on upper and lower end faces, respectively, of the rectangular light guiding plate 103. Moreover, the reflecting sheet 105 is placed behind the light guiding plate 103. A diffusing sheet 131, a reflective polarizer 132, and a prism sheet 133 are arranged in this order in front of the light guiding plate 103. The prism sheet 133 is configured in such a manner that the edge line direction 145 thereof laid in the horizontal direction.

As shown in FIG. 25(a), the reflective polarizer 132 has an interface that it extends to right and left direction in the shape of a triangular wave in the section of it. A multilayer film made up of many films with different refractive indices from each other is formed in said interface. Such an interface has a similar function to polarization beam splitters. Thus, in this interface, the p-polarized beams of the incident light 137 are transmitted through it. The s-polarized beams of light are reflected. The reflected s-polarized beams of light are returned to the incidence side, i.e., the light guiding plate 103. The reflective polarizer 132 is configured in such a manner that the leaving polarized light (here, "p-polarized light in the reflective polarizer 132") enters said prism sheet 133 as "p-polarized light in the prism sheet 133". In other words, the polarizing axis (plane of polarization) of the p-polarized light in the prism sheet 133 lies in the vertical direction that is perpendicular to the edge line direction 145. Thus, the reflective polarizer 132 is arranged along the vertical polarizing axis of the outgoing p-polarized light. More specifically, the above-mentioned interface is placed in vertical direction.

Next, operations of the lighting device 100 configured as mentioned above are described. The light that comes out of the light source 102 enters the light guiding plate 103. It travels with a series of internal reflections. Then, it is scattered by the scattering dots (not shown) formed on the back surface of said light guiding plate 103 and leaves pass through the front surface of the light guiding plate 103. In this event, some beams of light leaked from the back surface of the light guiding plate 103 are returned to the light guiding plate 103 by the reflecting sheet 105. The beams of light leaving the light guiding plate 103 pass through the scattering sheet 131 while being scattered. Then, they enter the reflective polarizer 132. The p-polarized beams of said incident light are transmitted through the reflective polarizer 132. The s-polarized beams of light are reflected by the reflective polarizer 132. The reflected s-polarized beams of light are then reflected by the scattering dots on the light guiding plate 103 or the reflecting sheet 105 and again enter the reflective polarizer 132. In this event, the polarization direction is modulated during the above-mentioned reflection process. Thus, some beams of the re-entered light are allowed to pass through the reflective polarizer 132. By repeating this procedure, the polarization direction of the light that comes out of the light source 102 is aligned to the p-polarized light by the reflective polarizer 132.

The p-polarized light enters the prism sheet 133 as the p-polarized light in said prism sheet 133 and is collected at the center of the viewing angle.

Figure 26A:
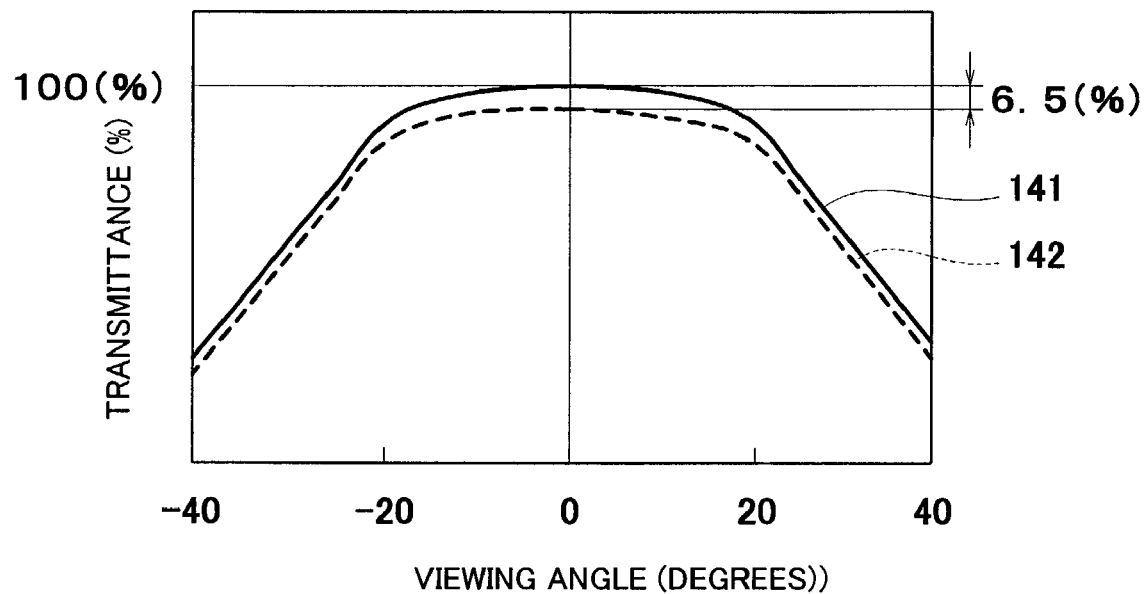
FIG. 26 is a graphical representation of change in transmittance as a function of the viewing angle of a prism sheet shown in FIG. 24, wherein (a) is a view illustrating the change in the direction perpendicular to the edge line direction of the prism sheet, and (b) is a view illustrating the change in the edge line direction of the prism sheet.
Figure 26B:
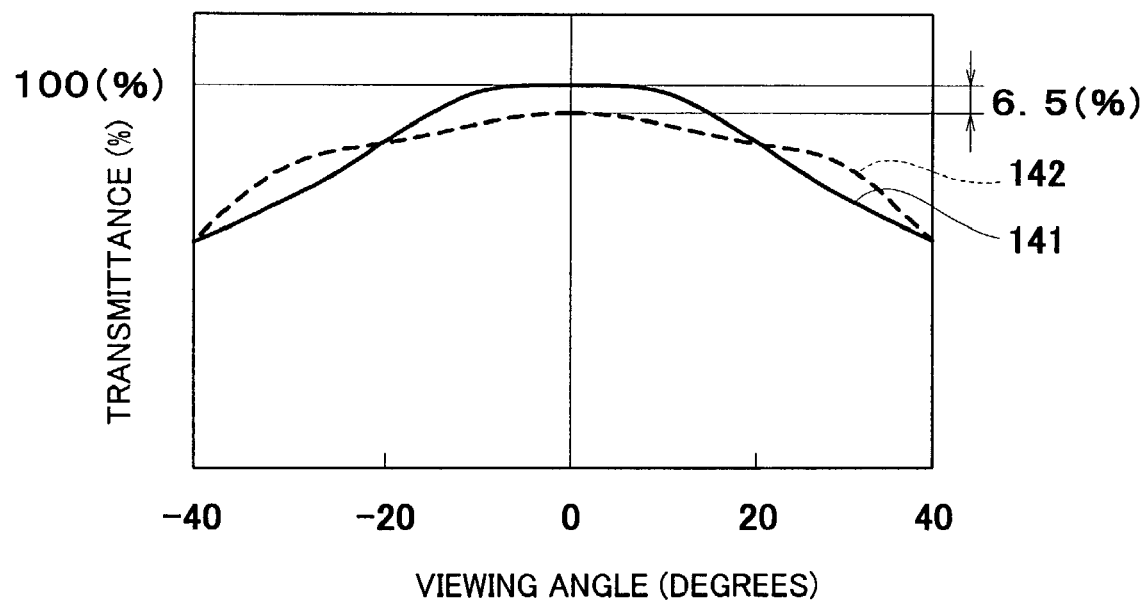

As shown in FIGS. 26(a) and (b), in the prism sheet 133, the transmittance 141 of the p-polarized light is higher than the transmittance 142 of the s-polarized light with respect to the light leaving at an angle close to the right angle. More specifically, the transmittance 141 of the p-polarized light is higher by about 6.5% than the transmittance 142 of the s-polarized light in a viewing angle range of generally between −10 and +10 degrees. On the other hand, the light entering the prism sheet 133 is aligned to p-polarized light by the reflective polarizer 132. Therefore, the transmittance of the incident light is improved as compared with the case where the s-polarized light is also passed, as in the prior art. As a result, the light can be utilized effectively.

Next, as a modification of this embodiment, a phase plate such as a quarter-wave plate may be placed on the light incident side of the reflective polarizer 132 in FIG. 24. In this case, the s-polarized light reflected by the reflective polarizer 132 may be passed to and from twice. The polarization direction of the reflected s-polarized light is twisted 90 degrees accordingly, and the reflective polarizer 132 transmits that light. The polarization direction can be aligned much more as compared with the above-mentioned configuration example.

The reflective polarizer 132 may be configured that has a film structure including the cholesteric liquid crystal, as shown in FIG. 25(b). In such reflective polarizer 132, the right polarization of the incident light 137 passes through it and the left polarization is reflected, depending on the helix pich, for example, in cholesteric liquid crystal arrangement. In this case, the light that has passed through the reflective polarizer 132 is not linearly polarized. Thus, a phase plate such as a quarter-wave plate should be combined.

(Image Display)

Figure 27A:
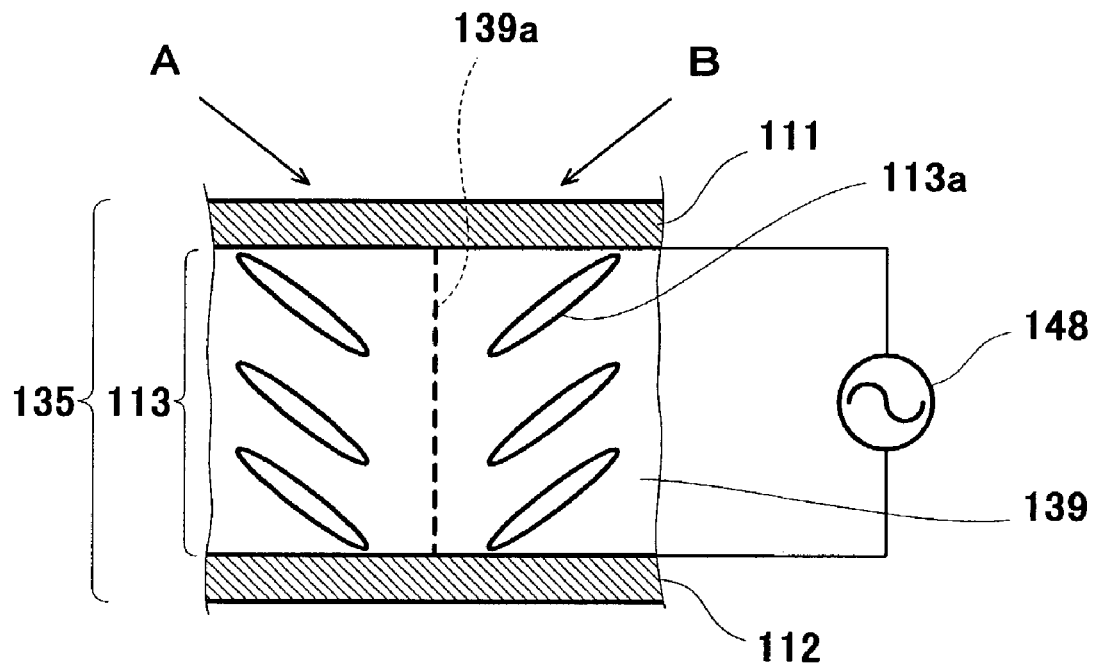
FIG. 27 is a cross-sectional view showing a configuration of the liquid crystal element shown in FIG. 24, wherein (a) is a view for the state with no voltage applied, and (b) is a view for a state with voltage applied.

FIG. 27 is a cross-sectional view showing a configuration of the liquid crystal cell shown in FIG. 24, wherein (a) is a view for the state with no voltage applied, and (b) is a view for a state with voltage applied. In FIG. 27, the same reference numeral depicts the same or equivalent part as or to those in FIG. 1. FIGS. 27(a) and (b) shows a single pixel.

As shown in FIG. 24, the image display 1 according to this embodiment comprises the liquid crystal display panel 106 that is placed in front of the lighting device 100. A driving circuit (not shown) that drives said liquid crystal display panel 106 is also provided. The driving circuit is similar in configuration and operations to the one described in Embodiment 1. Therefore, description thereof will be omitted.

The liquid crystal display panel 106 comprises a liquid crystal cell 135, a polarizer on the incident side 134 that is placed on the back surface side of the liquid crystal cell 135, and a polarizer on the outgoing side 136 that is placed on the front surface side of the liquid crystal cell 135. The polarizing axis (transmission axis) 146 of the polarizer on the incident side 134 is perpendicular to the polarizing axis of the P wave that passes through the reflective polarizer 132. The polarizing axis 147 of the polarizer on the outgoing side 136 is crossed at right angles to the polarizing axis 146 of the polarizer on the incident side 134.

Figure 27B:
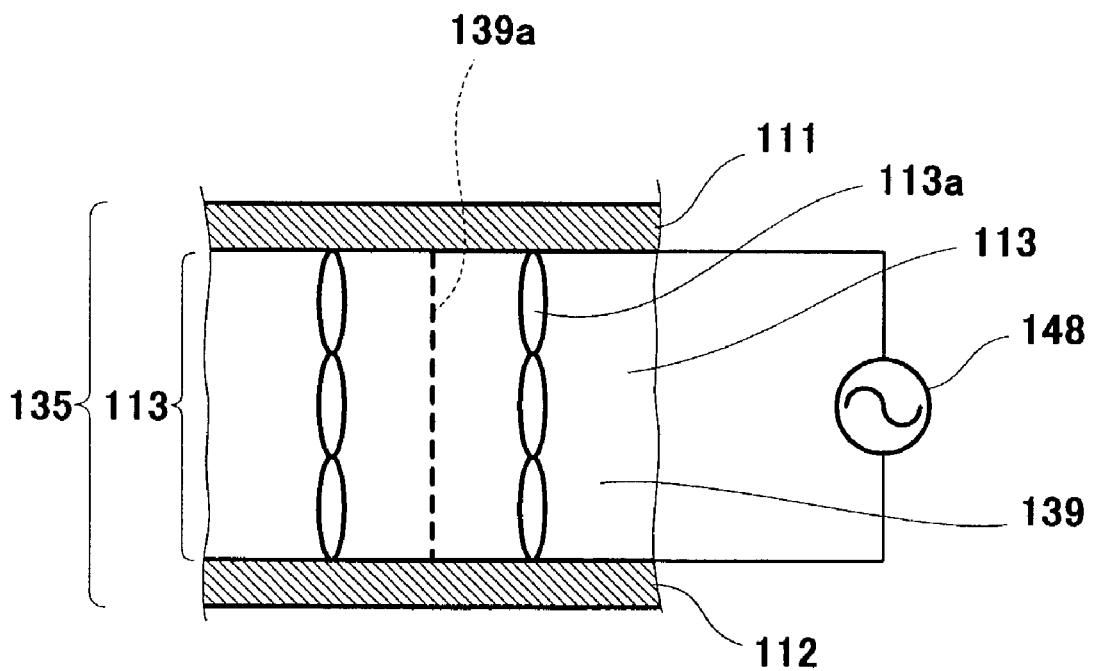

The liquid crystal cell 135 has a liquid crystal mode in which the liquid crystal molecules 113a in each pixel 139 has different pretilt angles on both sides of a center plane 139a of the pixel when no voltage is applied thereto, as shown in FIG. 27(a). The pretilt angle is generally symmetrical with respect to the center plane 139a of the pixel. In this liquid crystal mode, when voltage is applied using a power supply 148, the liquid crystal molecules 113a rearrange themselves vertically at right angles to the substrates 111 and 112, as shown in FIG. 27(b). In such a liquid crystal mode, when the liquid crystal cell 135 is seen from the two directions (indicated by the arrows A and B in FIG. 27(a)) that is inclined symmetrically with respect to the normal line to the substrates 111 and 112, the apparent refractive index is identical for both directions, as apparent from FIG. 27(a). The contrast is identical regardless of whichever direction it is seen, providing wide viewing angle characteristics.

Such liquid crystal mode is achieved by rubbing one of the regions which are obtained by dividing the substrates 111 and 112 into the two halves separated by the center plane 139a of the pixel 139 shown in FIG. 27(a), with the other of the region being masked, in each opposite directions,. A partition wall made of a polymer material may be placed in the space between the substrates 111 and 112 where the liquid crystal layer is disposed, in order to divide the pixel 139 into a plurality of regions. The liquid crystal molecules may be moved along the partition wall when the voltage is applied and removed. This partition can be formed by exposing a mixture of the liquid crystal and a photocurable polymeric material to light with using a photomask having a predetermined pattern. It is possible to achieve the above-mentioned liquid crystal mode with such configuration as well. Furthermore, it is possible to achieve the above-mentioned liquid crystal mode by using the following configuration in addition to this. That is, the concave/convex portions may be formed in the inner surface of one substrate of substrate 111 and 112 with a pattern of the comb form for example to line up the liquid crystal molecules in different directions along the concave/convex portions. In addition, the switching of the liquid crystal arrangement may be made not by means of the application of voltage between the opposing substrates. Instead, it may be performed by providing the above-mentioned switching electrodes on one substrate. With this, the liquid crystal molecules line up parallel along the substrate. In this case, the above-mentioned switching electrodes may be arranged into a comb-shaped pattern.

Next, as mentioned above, since the liquid crystal cell 135 is identical in contrast regardless of whichever direction it is seen, good viewing angle characteristics can be given even without tilting the axial direction of the polarizer 134 at 45 degrees to the longitudinal direction of the panel, which is required in the prior arts. Thus, in this embodiment, the polarizing axis 146 of the polarizer on the incident side 134 is laid on the same perpendicular direction as the polarizing axis of the P wave that passes through the reflective polarizer 132. In accordance with this, the polarizing axis 147 of the polarizer on the outgoing side 136 is laid horizontal.

In the image display 1 having the above-mentioned configuration, the light that comes out of the prism sheet 133 of the lighting device 100 passes through the polarizer on the incident side 134, the liquid crystal panel 106, and the polarizer on the outgoing side 136 in this order. This produces, on the display screen, an image corresponding to the video signal supplied to the driving circuit. In this event, the polarizing axis of the polarizer on the incident side 134 matches with the polarizing axis of the above-mentioned p-polarized light. Therefore, most part of the incident light passes through said the polarizer on the incident side 134, without any absorption losses. Development of heat due to absorption of light in the polarizer on the incident side 134 can be avoided even with a high-power light source. In addition, as described above, the development of heat on the prism sheet 133 is reduced. This eliminates defects and degradations such as thermal contraction of the polarizer on the incident side 134 and the prism sheet 133 as well as nonuniform optical characteristics. Thus, this embodiment provides an image display with an improved light utilization rate and higher luminance.

In the above-mentioned configuration example, description is made in conjunction with the case where the image display is adapted to display monochromic images. However, when the image display is used for color images, the picture elements (dots) forming the pixels are made similarly to the above-mentioned pixels.

In the above-mentioned configuration example, the prism sheet is used as the condensing means. However, it may be other means that can collect incident light in a predetermined direction using the refraction or reflection at an interface. For example, a plurality of edge portions may be aligned side by side on a major surface of a flat member such as a prism sheet. The edge portions may have a shape other than a triangle in cross section.

Embodiment 29

Figure 28:
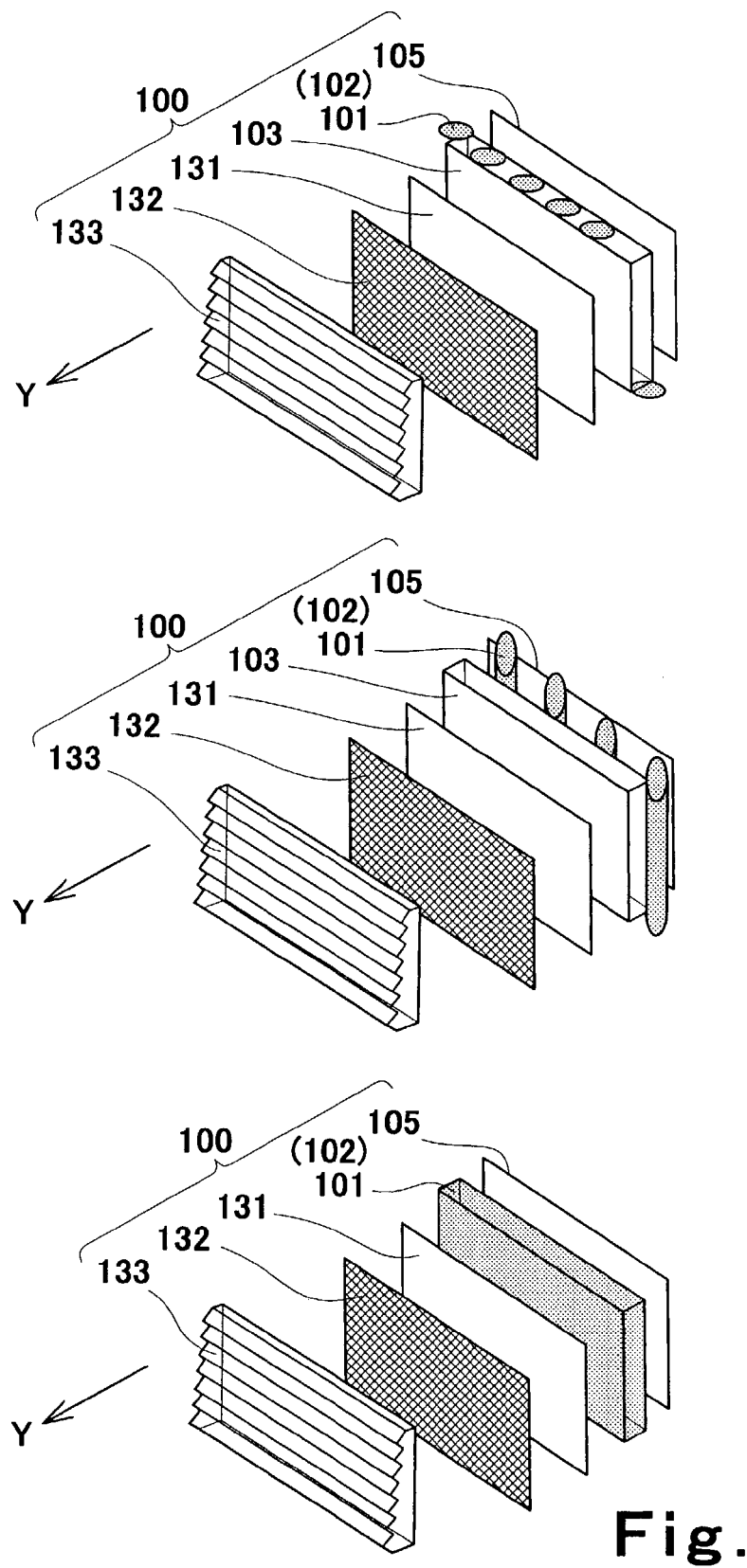
FIG. 28 is an exploded perspective view that schematically shows a configuration of a lighting device according to the Embodiment 29 of the present invention, wherein (a) is a view showing a case where a dot-shaped light emitter is used as a light source, (b) is a view showing a case where a linear light emitter is used as an array-type light source, and (c) is a view showing a case where a planar light emitter is used as a light source.

FIG. 28 is an exploded perspective view that schematically shows a configuration of a lighting device according to the Embodiment 29 of the present invention, wherein (a) is a view showing a case where a dot-shaped light emitter is used as a light source, (b) is a view showing a case where a linear light emitter is used as an array-type light source, and (c) is a view showing a case where a planar light emitter is used as a light source. In FIG. 28, the same reference numeral depicts the same or equivalent part as or to those in FIG. 27.

This embodiment shows a specific configuration example of the light source 102 of the Embodiment 28.

In a first configuration example, as shown in FIG. 28(a), dot-shaped light emitters 101, such as LEDs (lighte emitting diode), are placed on the upper and lower end surfaces of the light guiding plate 103.

In a second configuration example, as shown in FIG. 28(b) the multiple numbers of linear light emitters 101, such as cold cathode tubes, are placed behind the light guiding plate 103. That is, it is configured as an array-type lighting device.

In a third configuration example, as shown in FIG. 28(c), a planar light emitter 10 is placed instead of the light guiding plate.

In addition, it is also possible to obtain a new configuration by combining the above-mentioned configurations. For example, the luminance can further be increased by means of providing a plurality of cold cathode tubes behind the light guiding plate 103 into an array and providing LEDs which emit light in various colors on the upper and lower end faces of the light guiding plate 103. Moreover, it is possible to improve color balance by using a configuration in which LEDs are used to compensate low luminescence of the emission spectra of the cold cathode tubes.

EXAMPLE 16

In this example, an array-type lighting device was used as in the above-mentioned second configuration example. A cold cathode tube that is designed to provide approximately 100 W output was used. A light guiding plate of about 10 inches in size was used.

The luminance was measured on the light exit surface of the prism sheet 133, which was as high as about 10000 cd/mm$^2$. The luminance distribution did not undergo nonuniformization by, for example, thermal deformation of the prism sheet 132, even after continuous illumination of 100 hours or longer in this state. This indicated that the lighting device of this example can provide stable performance even when operated with higher luminance.

It goes without saying that the lighting device according to this embodiment may be combined with a liquid crystal display panel and a driving circuit as in the Embodiment 28 to provide an image display.

Embodiment 30

Figure 29:
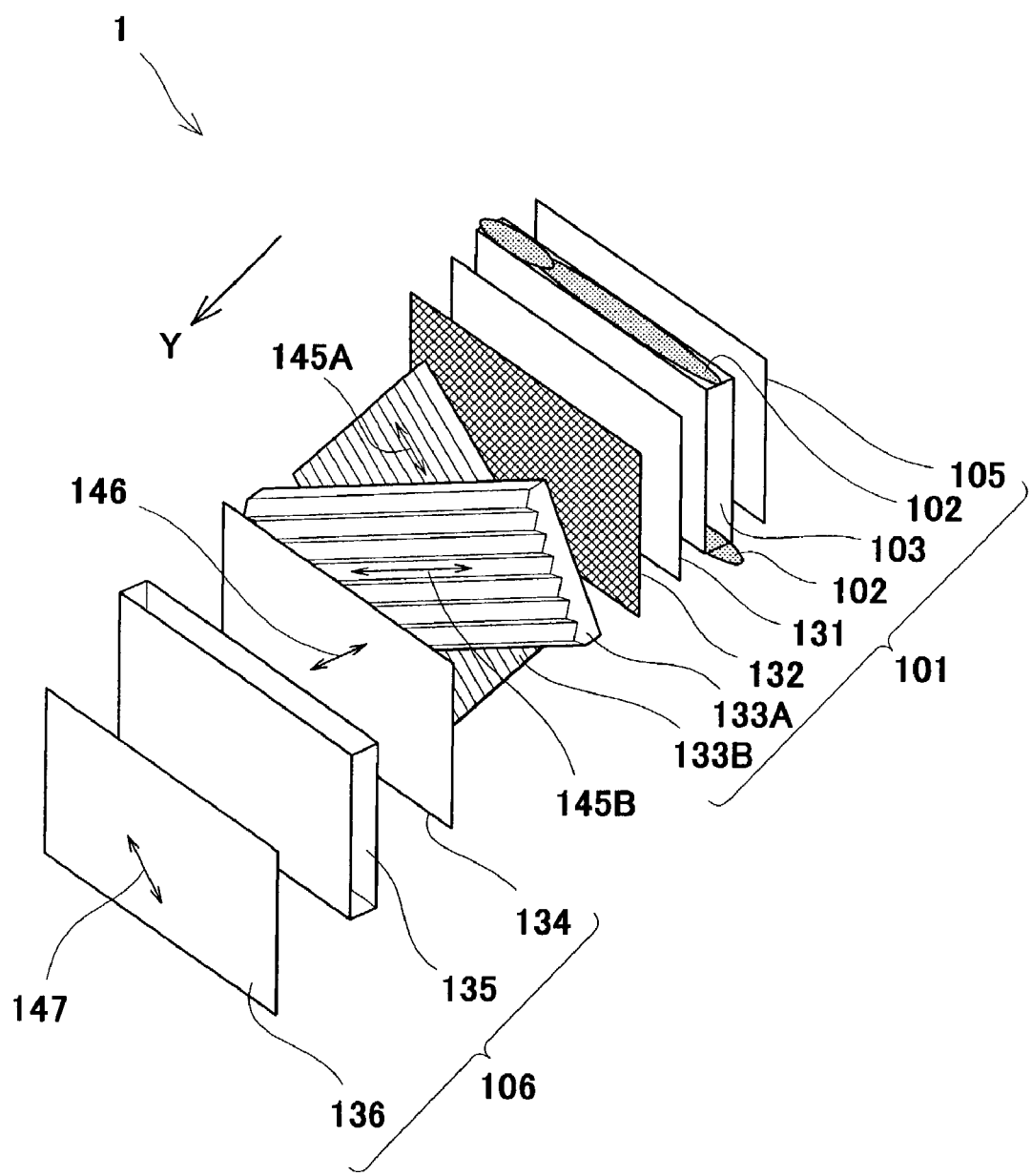
FIG. 29 is an exploded perspective view that schematically shows configurations of a lighting device and of an image display, according to the Embodiment 30 of the present invention.

FIG. 29 is an exploded perspective view that schematically shows configurations of a lighting device and of an image display, according to the Embodiment 30 of the present invention. In FIG. 29, the same reference numeral depicts the same or equivalent part as or to those in FIG. 24.

As shown in FIG. 29, in this embodiment, the polarizing axis 146 of the polarizer on the incident side 134 is tilted 45 degrees relative to the horizontal direction. The polarizing axis 147 of the polarizer on the outgoing side 136 is perpendicular to the polarizing axis 146 of the polarizer on the incident side 134. Edge line directions 145A and 145B of prism sheets 133A and 133B as well as the polarizing axis of the P wave are defined in proper directions corresponding to the above. The liquid crystal cell 135 is of a TN-type liquid crystal mode. Other components and parts are similar to those described in the Embodiment 28.

EXAMPLE 17

In this example, in FIG. 29, only the prism sheet 133A is provided, and said prism sheet 133A is tilted so that the edge line direction 145A is perpendicular to the polarizing axis 146 of the incidence side polarizer 134. Moreover, the reflective polarizer 132 is configured so that the polarizing axis of the P wave which is the transmission axis is aligned with the polarizing axis 146 of the incidence side polarizer 134. Cold cathode tubes that are designed to provide approximately 100 W output were placed as the light emitters on the upper and lower end faces of the light guiding plate 103. As a Comparative Example (prior art), the configuration of this example was modified: the edge line direction 133A of the prism sheet 133A was laid horizontally and the reflective polarizer 132 was eliminated.

The face-up luminance was measured on the display screen. As a result, the face-up luminance was improved 5 to 10% in this example as compared with the Comparative Example.

The above results indicated that the face-up luminance can be improved even when the polarizers are adapted to TN-type liquid crystals that have been widely used presently, by means of arranging the prism sheet(s) and the reflective polarizer(s) in place which is suitable for the particular configuration.

EXAMPLE 18

While the face-up luminance was improved in the Example 17 as described above, the prism sheet 133A was tilted. This caused nonuniformity of the viewing angle characteristics (contrast viewing angle characteristics) in the horizontal direction. Thus, in order to this, in this example, the prism sheet 133B was added in front of the prism sheet 133A. It was positioned in such a manner that the edge line direction 145B is aligned with the polarizing axis 146 of the polarizer on the incident side 134.

Then the luminance on the display screen was measured. As a result, the viewing angle characteristics were almost symmetrical on either side. For the face-up luminance, when the edge line direction 145B of the one 133B of the two prism sheets that is closer to the liquid crystal cell 135 is set to be perpendicular to the polarizing axis 146 of the polarizer on the incident side 134, the luminance was shown to be increased several percent as compared with the opposite case (configuration shown in FIG. 29). By using two prism sheets with their edge line directions being crossed at right angles, the transmittance due to the polarization should be identical. However, the medium of the prism sheet itself has a more or less anisotropic refractive index. The combination of the position of it and the polarizer on the incident side 134 would affect the transmittance of the liquid crystal cell 135.

As apparent from the above, according to this example, two prism sheets 133A and 133B are used. The edge line directions of them are crossed at right angles. One edge line direction is parallel to the polarizing axis 146 of the polarizer on the incident side 134. This resulted in symmetrical viewing angle characteristics while improving the face-up luminance.

Embodiment 31

The inventions according to the above-mentioned Embodiments 28 and 30 are essentially based on the configuration in which the reflective polarizers are inserted on the optical path of the lighting device and the edge line direction of the prism sheet and the polarizing axes of the polarizers in the liquid crystal display panel are properly associated with the polarizing axis of the P wave that is the transmission axis. Therefore, the present invention may be applied to various types of lighting devices by adding this essential configuration. Thus, this embodiment corresponds to the configuration of the lighting device 100 except for the reflective polarizer 132 and the prism sheet 133 of the Embodiments 28 and 30 is replaced with each of the lighting devices of the Embodiments 1 to 27. This configuration produces the effects of the Embodiments 1 to 27 in addition to the effects of the Embodiments 28 and 30.

It goes without saying that the lighting device according to this embodiment may be combined with a liquid crystal display panel and a driving circuit as in the Embodiment 28 to provide an image display.

Embodiment 32

The Embodiment 32 of the present invention illustrates a liquid crystal monitor, a liquid crystal television, and a liquid crystal information terminal device, all of which use the image display (liquid crystal display) of the Embodiments 6 to 11, 17, 25 and 28 to 31 as a display unit.

Figure 30:
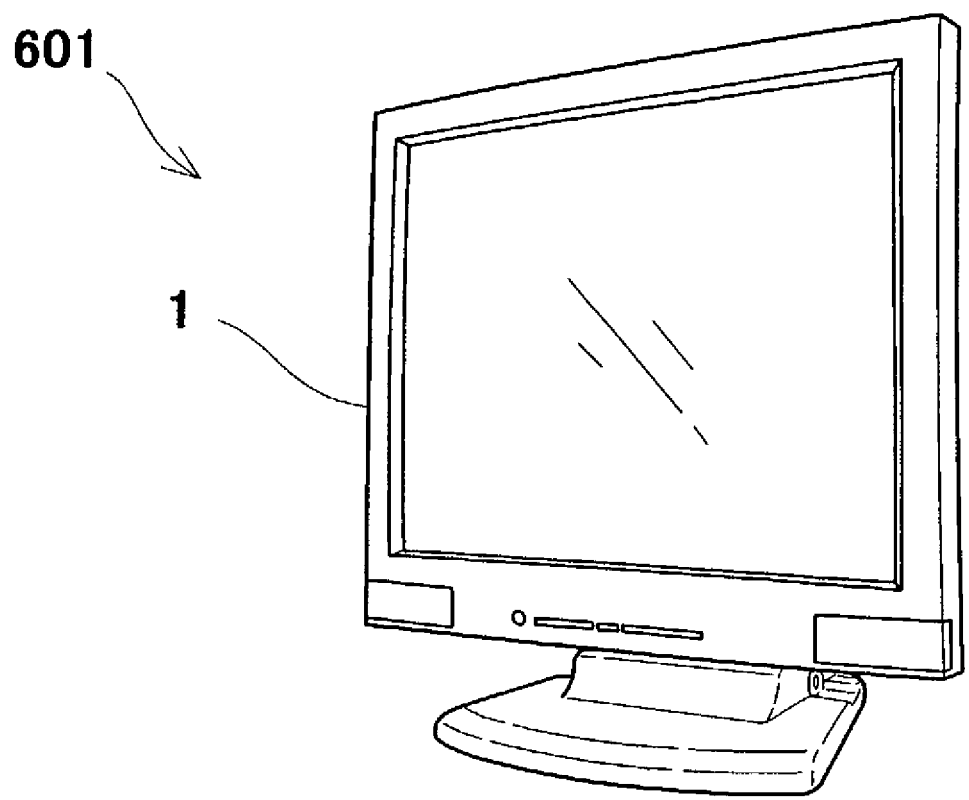
FIG. 30 is an outside view showing a configuration of a display monitor device according to the Embodiment 31 of the present invention.

FIG. 30 is an outside view showing a configuration of a liquid crystal monitor device according to this embodiment. Referring also to FIG. 2, a liquid crystal monitor 601 comprises a display unit formed of the liquid crystal display 1 using the lighting device 100 of the Embodiment 1; and a signal processing unit (not shown) for processing display monitor signals that are supplied from the outside. A display monitor video signal supplied from said signal processing unit is transmitted to the driving circuit 36 of the liquid crystal display 1 as the video signal 25. This configuration makes it possible to provide a liquid crystal monitor of which luminance distribution can be controlled.

Here, other liquid crystal displays of the Embodiment 6, and the liquid crystal displays of the Embodiments 7 to 11, 17, and 25 may be used as the liquid crystal display to provide a liquid crystal monitor having an effect corresponding to each embodiment.

Figure 31:
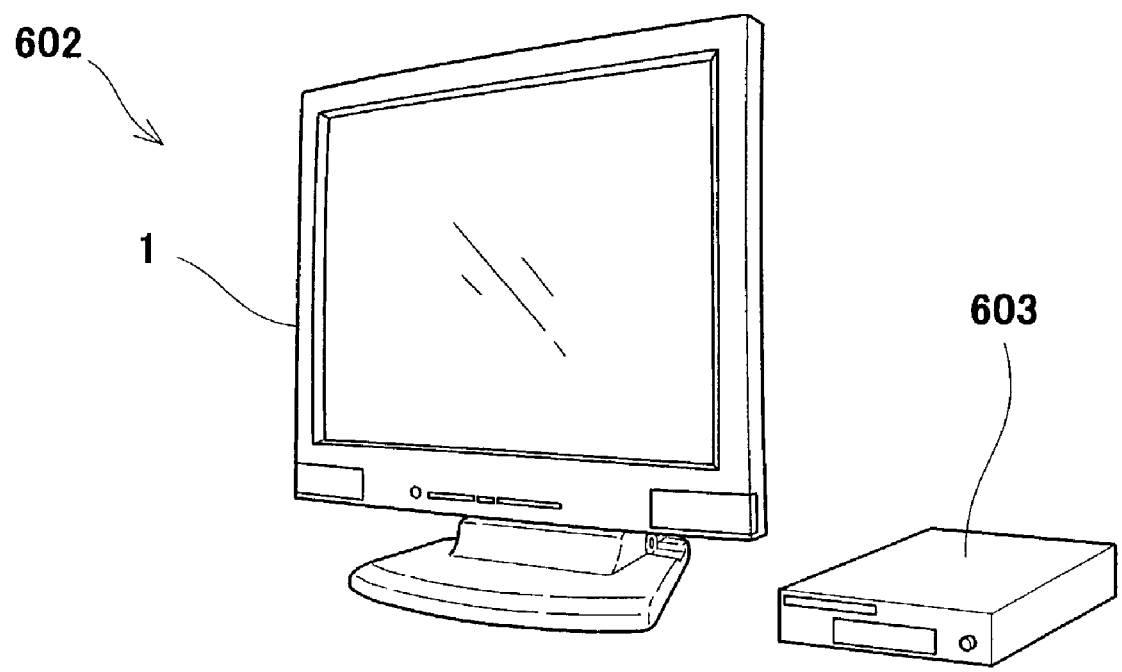
FIG. 31 is an outside view showing a configuration of a television set according to the Embodiment 31 of the present invention.
Figure 32:
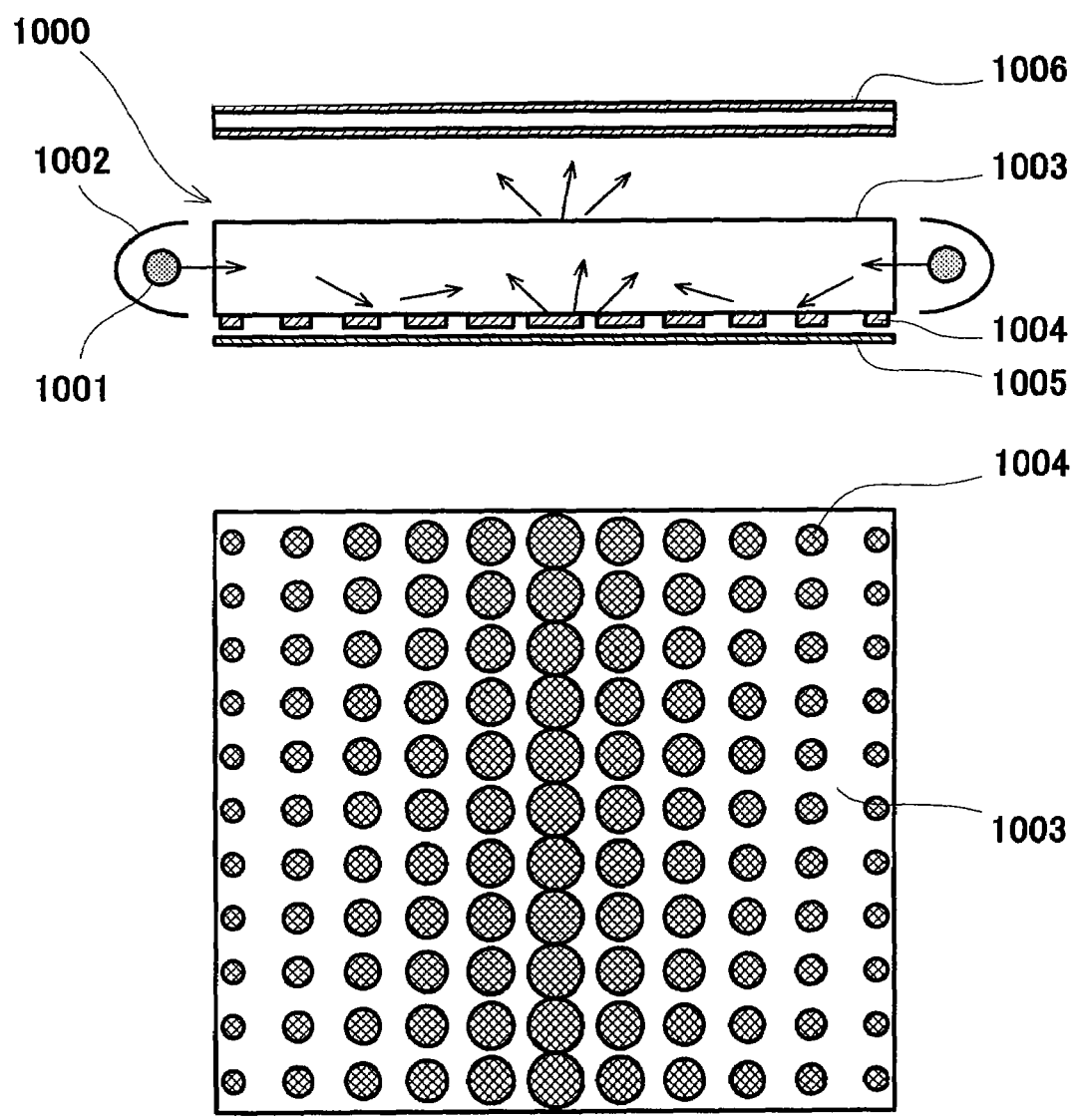
FIG. 32 is a view that schematically shows a conventional lighting device and an image display in which it is used, wherein (a) is a cross-sectional view, and (b) is a plan view showing a dot pattern of a dispersed liquid crystal element shown in (a)
Figure 33:
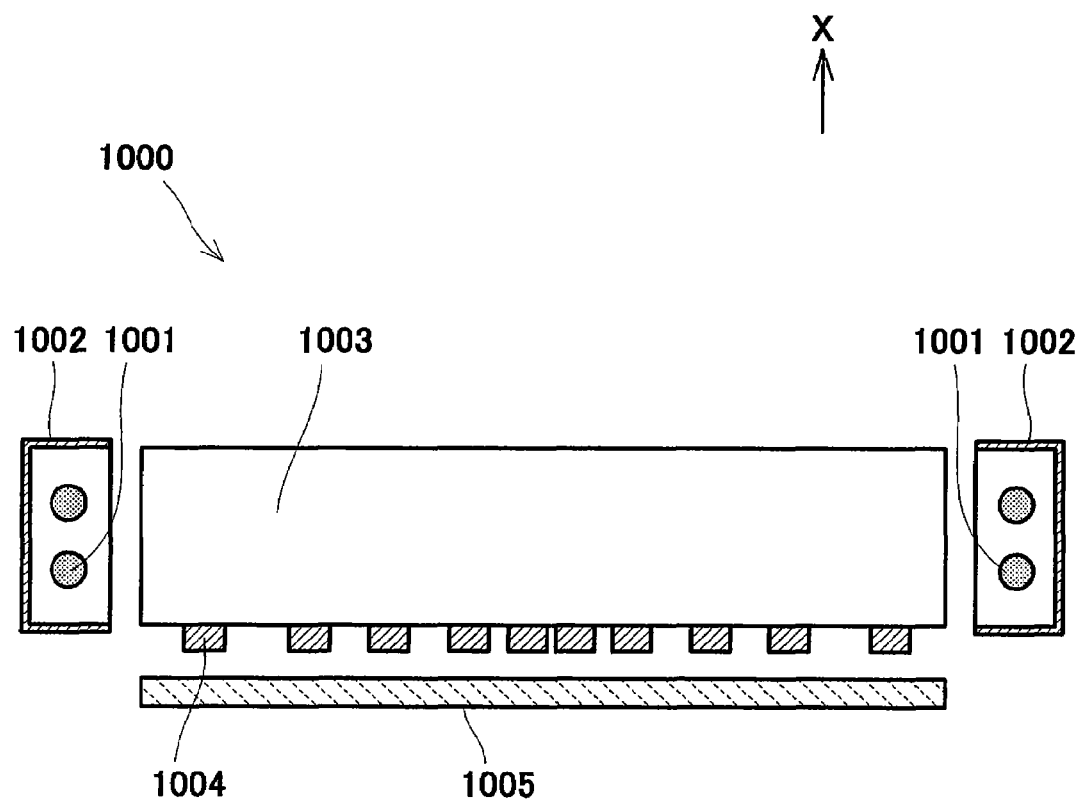
FIG. 33 is a cross-sectional view that schematically shows a configuration of a conventional lighting device.
Figure 34:
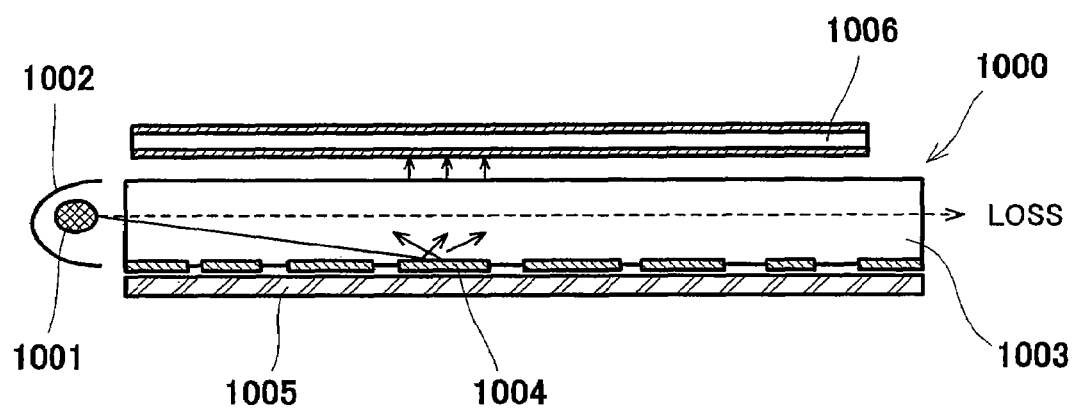
FIG. 34 is a cross-sectional view that schematically shows a configuration of a conventional lighting device.
Figure 35:
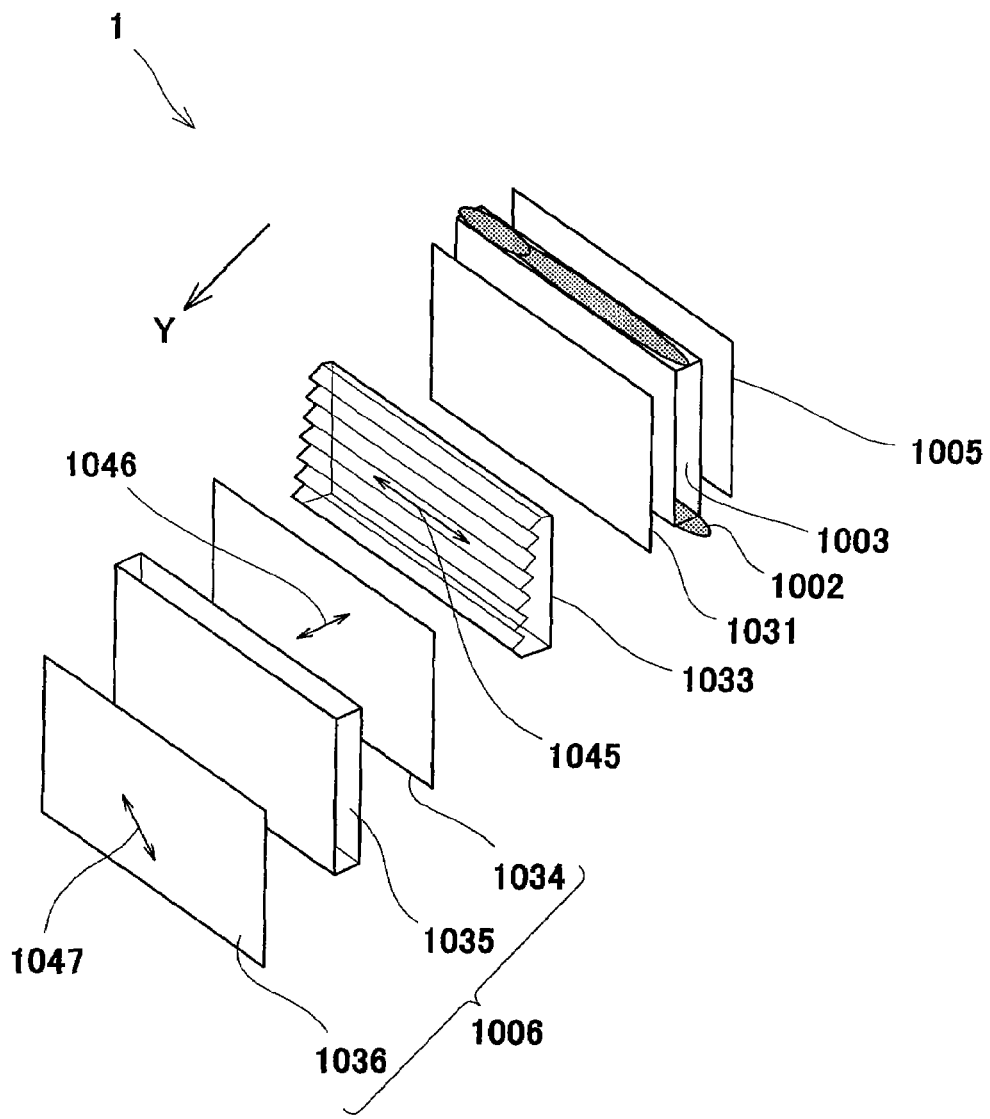
FIG. 35 is an exploded perspective view that schematically shows a configuration of a conventional image display.

FIG. 31 is an outside view showing a configuration of a liquid crystal television according to this embodiment. Referring also to FIG. 2, a liquid crystal television 602 comprises a display unit formed of the liquid crystal display 1 using the lighting device 100 of the Embodiment 1; and tuner unit 603 for selecting channels for TV signals that are supplied from the outside. A TV video signal for a channel selected by the tuner unit 603 is transmitted to the driving circuit 36 of the liquid crystal display 1 as the video signal 25. In FIG. 31, connections between the liquid crystal display 1 and the tuner unit 603 are omitted. This configuration makes it possible to provide a liquid crystal television of which luminance distribution can be controlled.

Here, other liquid crystal displays of the Embodiment 6, and the liquid crystal displays of the Embodiments 7 to 11, 17, and 25 may be used as the liquid crystal display to provide a liquid crystal television having an effect corresponding to each embodiment.

The liquid crystal information terminal device according to this embodiment comprises transmitter-receiver means for transmitting and receiving communication information, in place of the tuner unit 603 in the above-mentioned liquid crystal television 602. An image signal including desired information that is supplied from said transmitter-receiver means is supplied to the driving circuit 36 of the liquid crystal display 1 as the video signal 25. This configuration makes it possible to provide an information terminal device of which luminance distribution can be controlled.

Here, other liquid crystal displays of the Embodiment 6, and the liquid crystal displays of the Embodiments 7 to 11, 17, and 25 may be used as the liquid crystal display to provide an information terminal device having an effect corresponding to each embodiment.

It goes without saying that the embodiments of the present invention are not limited to the above-mentioned Embodiments 1 to 32, and modifications or alterations to them may be applied. In addition, while the above configuration examples use the liquid crystal display panel as the image display, the present invention is not limited to the cases with the liquid crystal display panel. Instead, backlight- or frontlight-type display elements may be applied.

Various modifications and other embodiments will be apparent to those skilled in the art upon reading the above description. The above description should be interpreted as illustrative and is intended to teach those skilled in the art the best mode for carrying out the present invention. Detailed structures and/or functions of it may be substantially modified without departing from the scope and spirit of the present invention.

INDUSTRIAL APPLICABILITY

The liquid crystal television according to the present invention is useful as noncommercial and industrial televisions for which high luminance is required.

The liquid crystal monitor according to the present invention is useful as noncommercial and industrial liquid crystal monitors for which high luminance is required.

The liquid crystal information terminal according to the present invention is useful as noncommercial and industrial liquid crystal information terminals for which high luminance is required.

The image display according to the present invention is useful as an image display for a liquid crystal television, a liquid crystal monitor, and a liquid crystal display terminal, for which high luminance is required.

The lighting device according to the present invention is useful as a lighting device for an image display for which high luminance is required.

The method for manufacturing a light guiding plate according to the present invention is useful as a method for manufacturing a light guiding plate for a lighting device that is used in an image display.

The invention claimed is:
1. An image display comprising:
a lighting device;
a liquid crystal display panel that is adapted to cause the light that comes out of said light device to travel through a liquid crystal layer forming a display screen with varied transmittance to display an image; and
a driving means that is adapted to alter the transmittance of said liquid crystal display panel to display an image corresponding to a video signal, characterized in that the lighting device includes:
a light source;
a light exit surface through which the light from said light source comes out; and
a luminance distribution setting alteration means that alters the setting of the luminance distribution on the light exit surface, the luminance distribution setting alteration means being adapted to determine a luminance histo- gram of a pixel in the video signal and alters the luminance distribution on the light exit surface according to said determined histogram, wherein said luminance distribution setting alteration means is arranged between said light source and said light exit surface and said luminance distribution setting alteration means directly alters the distribution setting of the luminance from said light source.

2. A liquid crystal monitor characterized by using an image display as claimed in claim 1, as a display unit.

3. A liquid crystal television characterized by using an image display as claimed in claim 1, as a display unit.

4. A liquid crystal information terminal characterized by using an image display as claimed in claim 1, as a display unit.

* * * * *